United States Patent
Yamashita

(10) Patent No.: US 9,609,367 B2
(45) Date of Patent: Mar. 28, 2017

(54) SIGNAL PROCESSING DEVICE, SIGNAL PROCESSING METHOD, PROGRAM, AND SIGNAL TRANSMISSION SYSTEM

(71) Applicant: SONY CORPORATION, Tokyo (JP)

(72) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/905,122

(22) PCT Filed: Aug. 8, 2014

(86) PCT No.: PCT/JP2014/071034
§ 371 (c)(1),
(2) Date: Jan. 14, 2016

(87) PCT Pub. No.: WO2015/025741
PCT Pub. Date: Feb. 26, 2015

(65) Prior Publication Data
US 2016/0165275 A1    Jun. 9, 2016

(30) Foreign Application Priority Data
Aug. 22, 2013  (JP) ................................ 2013-171967

(51) Int. Cl.
*H04N 7/01*  (2006.01)
*H04N 21/2343*  (2011.01)
(Continued)

(52) U.S. Cl.
CPC ... *H04N 21/234363* (2013.01); *G06T 3/4023* (2013.01); *H04N 7/0155* (2013.01);
(Continued)

(58) Field of Classification Search
CPC ........ H04N 7/015; H04N 7/01; H04N 7/0155; H04N 21/234363; H04N 21/23439; H04N 21/4363; H04N 21/2343
(Continued)

(56) References Cited

U.S. PATENT DOCUMENTS

| 5,680,175 A | * | 10/1997 | Yanai | G06T 1/20 |
| | | | | 348/441 |
| 6,788,347 B1 | * | 9/2004 | Kim | G06T 1/60 |
| | | | | 348/441 |
| 2012/0293710 A1 | | 11/2012 | Yamashita | |

FOREIGN PATENT DOCUMENTS

| JP | 2012244419 | 12/2012 |
| JP | 2012248984 | 12/2012 |

(Continued)

OTHER PUBLICATIONS

Extended European Search Report for EP Patent Application No. 14838721.0, issued on Jan. 19, 2017, 7 pages.

*Primary Examiner* — Sherrie Hsia
(74) *Attorney, Agent, or Firm* — Chip Law Group

(57) ABSTRACT

The present disclosure relates to a signal processing device, a signal processing method, a program, and a signal transmission system, capable of enabling video switching in frame units of an original video signal. A pixel thinning control unit thin out every other pair of two neighboring samples of each line from N consecutive frames of a video signal including an m*n(48P-60P)*N/r:g:b/10-bit or 12-bit signal in which the number of pixels per frame exceeds the number of pixels specified in an HD format at intervals of 2N lines, map the thinned every other pair of two neighboring pixel samples to first to 4N-th sub images including an m'*n'/48P-60P/r':g':b'/10-bit or 12-bit signal, and arrange a vertical blanking region between two of N regions in which pixel samples of respective frames of the first video signal are mapped in each sub image.

14 Claims, 27 Drawing Sheets

(51) Int. Cl.
  *H04N 21/4363* (2011.01)
  *G06T 3/40* (2006.01)
  *H04N 19/59* (2014.01)
  *H04N 7/015* (2006.01)

(52) U.S. Cl.
  CPC ....... *H04N 19/59* (2014.11); *H04N 21/23439* (2013.01); *H04N 21/4363* (2013.01); *H04N 7/01* (2013.01)

(58) Field of Classification Search
  USPC ........ 348/441, 443, 446, 448, 455, 458, 459
  IPC ....................................................... H04N 7/01
  See application file for complete search history.

(56) References Cited

FOREIGN PATENT DOCUMENTS

| | | |
|---|---|---|
| JP | 2012253689 | 12/2012 |
| JP | 2013021408 | 1/2013 |
| JP | 2013055395 | 3/2013 |

\* cited by examiner

FIG. 1

| SYSTEM CATEGORY | SYSTEM NAME | ILLUMINANCE OR NUMBER OF R'G'B' SAMPLES PER EFFECTIVE LINE | NUMBER OF EFFECTIVE LINES PER FRAME | FRAME RATE(Hz) |
|---|---|---|---|---|
| UHDTV1 | 3840 × 2160/23.98/P | 3840 | 2160 | 24/1.001 |
|  | 3840 × 2160/24/P | 3840 | 2160 | 24 |
|  | 3840 × 2160/25/P | 3840 | 2160 | 25 |
|  | 3840 × 2160/29.97/P | 3840 | 2160 | 30/1.001 |
|  | 3840 × 2160/30/P | 3840 | 2160 | 30 |
|  | 3840 × 2160/50/P | 3840 | 2160 | 50 |
|  | 3840 × 2160/59.94/P | 3840 | 2160 | 60/1.001 |
|  | 3840 × 2160/60/P | 3840 | 2160 | 60 |
| UHDTV2 | 7680 × 4320/23.98/P | 7680 | 4320 | 24/1.001 |
|  | 7680 × 4320/24/P | 7680 | 4320 | 24 |
|  | 7680 × 4320/25/P | 7680 | 4320 | 25 |
|  | 7680 × 4320/29.97/P | 7680 | 4320 | 30/1.001 |
|  | 7680 × 4320/30/P | 7680 | 4320 | 30 |
|  | 7680 × 4320/50/P | 7680 | 4320 | 50 |
|  | 7680 × 4320/59.94/P | 7680 | 4320 | 60/1.001 |
|  | 7680 × 4320/60/P | 7680 | 4320 | 60 |

FIG. 2

| SYSTEM NO. | SYSTEM NAME | FRAME RATE(Hz) |
|---|---|---|
| 1 | 2048×1080/60/P | 60 |
| 2 | 2048×1080/59.94/P | 60/1.001 |
| 3 | 2048×1080/50/P | 50 |
| 4 | 2048×1080/48/P | 48 |
| 5 | 2048×1080/47.95/P | 48/1.001 |
| 6 | 2048×1080/30/P | 30 |
| 7 | 2048×1080/29.97/P | 30/1.001 |
| 8 | 2048×1080/25/P | 25 |
| 9 | 2048×1080/24/P | 24 |
| 10 | 2048×1080/23.98/P | 24/1.001 |

FIG. 3

| SYSTEM NO. | SYSTEM NAME | FRAME RATE(Hz) |
|---|---|---|
| 1 | 4096×2160/60/P | 60 |
| 2 | 4096×2160/59.94/P | 60/1.001 |
| 3 | 4096×2160/50/P | 50 |
| 4 | 4096×2160/48/P | 48 |
| 5 | 4096×2160/47.95/P | 48/1.001 |
| 6 | 4096×2160/30/P | 30 |
| 7 | 4096×2160/29.97/P | 30/1.001 |
| 8 | 4096×2160/25/P | 25 |
| 9 | 4096×2160/24/P | 24 |
| 10 | 4096×2160/23.98/P | 24/1.001 |

EXAMPLE OF MODE D

SIGNAL PROCESSING DEVICE, SIGNAL PROCESSING METHOD, PROGRAM, AND SIGNAL TRANSMISSION SYSTEM

TECHNICAL FIELD

The present disclosure relates to a signal processing device, a signal processing method, a program, and a signal transmission system, and more particularly, to a signal processing device, a signal processing method, a program, and a signal transmission system, which are suitably applied when a high-definition video signal having a high frame rate is serially transmitted.

BACKGROUND ART

In the past, a receiving system and an imaging system of an ultra high-definition (HD) video signal exceeding a current HD video signal in which one frame includes 1920 samples×1080 lines have been developed. For example, standardization of an Ultra High Definition TV (UHDTV) standard serving as a next generation broadcasting scheme having four or sixteen times the number of pixels specified in the current HD has been conducted by international associations. Such international associations include the International Telecommunication Union (ITU) and the Society of Motion Picture and Television Engineers (SMPTE).

Further, in the past, a technique of serially transmitting a UHDTV video signal in which a frame rate exceeds 50P to 60P using an HD-SDI interface or a 10 Gbps serial interface has been disclosed (for example, see Patent Literature 1).

CITATION LIST

Patent Literature

Patent Literature 1: JP 2012-244419A

SUMMARY OF INVENTION

Technical Problem

However, in the technique disclosed in Patent Literature 1, the UHDTV video signal is thinned out in units of two consecutive frames for every two pixel samples and mapped to a plurality of sub images, but it is difficult to perform video switching between frames mapped to the same sub image. In other words, it is difficult to perform video switching in units of frames of an original video signal.

The present disclosure was made in light of the foregoing, and enables video switching in units of frames of an original video signal when a high-definition video signal having a high frame rate is serially transmitted through a serial digital interface (SDI).

Solution to Problem

A signal processing device according to a first aspect of the present disclosure includes: a first pixel thinning control unit configured to thin out every other pair of two neighboring pixel samples of each line from N consecutive frames of a first video signal including an m×n (m indicating m samples and n indicating a lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines, map the thinned every other pair of two neighboring pixel samples to first to 4N-th sub images including an m'×n' (m' indicating m' samples and n' indicating n' lines are positive integers)/48P-60P/r':g':b' (r', g', and b' are a signal ratio in the case of a predetermined signal transmission scheme)/10-bit or 12-bit signal, and arrange a vertical blanking region between two of N regions in which pixel samples of respective frames of the first video signal are mapped in each sub image.

The first video signal can be a 3840×2160/(50P-60P)×N/ 4:4:4, 4:2:2, or 4:2:0/10-bit or 12-bit signal.

N can be 2. The first pixel thinning control unit can arrange the vertical blanking region of 21 lines in a head of the sub image, the vertical blanking region of 2 lines in a tail of the sub image, and the vertical blanking region of 22 lines between a region in which pixel samples of a first frame of the video signal are mapped and a region in which pixel samples of a second frame are mapped.

The signal processing device can further include: a second pixel thinning control unit configured to thin out every other pair of two neighboring pixel samples of each line from a second video signal including a 7680×4320/(50P-60P)×N/ 4:4:4, 4:2:2, or 4:2:0/10-bit or 12-bit signal for every other line and map the thinned every other pair of two neighboring pixel samples to the four first video signals.

The signal processing device can further include: a line thinning control unit configured to perform conversion into an interlace signal by performing line thinning of the first to 4N-th sub images; and a word thinning control unit configured to generate serial digital data specified in a format of HD-SDIs of 16N channels by performing word thinning of the interlace signal.

The signal processing device can further include: a multiplexing unit configured to generate serial digital data specified in a format of a 10.692 Gbps SDI of 2N channels by multiplexing the serial digital data of the 16N channels.

The signal processing device can further include: a multiplexing unit configured to generate serial digital data specified in a format of a 3 Gbps SDI of 8N channels by multiplexing the serial digital data of the 16N channels.

The signal processing device can further include: an output control unit configured to control an output of the serial digital data.

A signal processing method according to the first aspect of the present disclosure includes: a pixel thinning control step of thinning out every other pair of two neighboring pixel samples of each line from N consecutive frames of a video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/ 10-bit or 12-bit signal in which the number of pixels per frame exceeds the number of pixels specified in an HD format at intervals of 2N lines, mapping the thinned every other pair of two neighboring pixel samples to first to 4N-th sub images including an m'×n' (m' indicating m' samples and n' indicating n' lines are positive integers)/48P-60P/r':g':b' (r', g', and b' are a signal ratio in the case of a predetermined signal transmission scheme)/10-bit or 12-bit signal, and arranging a vertical blanking region between two of N regions in which pixel samples of respective frames of the video signal are mapped in each sub image.

A program according to the first aspect of the present disclosure causes a computer to execute a process including: a pixel thinning control step of thinning out every other pair of two neighboring pixel samples of each line from N consecutive frames of a video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines, mapping the thinned every other pair of two neighboring pixel samples to first to 4N-th sub images including an m'×n' (m' indicating m' samples and n' indicating n' lines are positive integers)/48P-60P/r':g':b' (r', g', and b' are a signal ratio in the case of a predetermined signal transmission scheme)/10-bit or 12-bit signal, and arranging a vertical blanking region between two of N regions in which pixel samples of respective frames of the video signal are mapped in each sub image.

A signal processing device according to a second aspect of the present disclosure includes: a pixel multiplexing unit configured to reproduce a video signal of N frames by extracting pixel samples from first to 4N-th sub images in which a vertical blanking region is arranged between two of N regions in which the pixel samples of respective frames of the video signal are mapped and multiplexing the extracted pixel samples, the first to 4N-th sub images being generated by thinning out every other pair of two neighboring pixel samples of each line from the N consecutive frames of the video signal including an m×n (m indicating m samples and n indicating n lines are positive integers)/(48P-60P)×N (N is an integer of 2 or more)/r:g:b (r, g and b are a signal ratio in the case of a predetermined signal transmission scheme)/10-bit or 12-bit signal in which the number of pixels per frame exceeds the number of pixels specified in an HD format at intervals of 2N lines and mapping the thinned every other pair of two neighboring pixel samples and including an m'×n' (m' indicating m' samples and n' indicating n' lines are positive integers)/48P-60P/r':g':b' (r', g', and b' are a signal ratio in the case of a predetermined signal transmission scheme)/10-bit or 12-bit signal.

A signal processing method according to the second aspect of the present disclosure includes: a pixel multiplexing step of reproducing a video signal of N frames by extracting pixel samples from first to 4N-th sub images in which a vertical blanking region is arranged between two of N regions in which the pixel samples of respective frames of the video signal are mapped and multiplexing the extracted pixel samples, the first to 4N-th sub images being generated by thinning out every other pair of two neighboring pixel samples of each line from the N consecutive frames of the video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines and mapping the thinned every other pair of two neighboring pixel samples and including an m'×n' (m' indicating m' samples and n' indicating n' lines are positive integers)/48P-60P/r':g':b' (r', g' and b' are a signal ratio in the case of a predetermined signal transmission scheme)/10-bit or 12-bit signal.

A program according to the second aspect of the present disclosure causes a computer to execute a process including: a pixel multiplexing step of reproducing a video signal of N frames by extracting pixel samples from first to 4N-th sub images in which a vertical blanking region is arranged between two of N regions in which the pixel samples of respective frames of the video signal are mapped and multiplexing the extracted pixel samples, the first to 4N-th sub images being generated by thinning out every other pair of two neighboring pixel samples of each line from the N consecutive frames of the video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines and mapping the thinned every other pair of two neighboring pixel samples and including an m'×n' (m' indicating m' samples and n' indicating n' lines are positive integers)/48P-60P/r':g':b' (r', g' and b' are a signal ratio in the case of a predetermined signal transmission scheme)/10-bit or 12-bit signal.

A signal transmission system according to the third aspect of the present disclosure includes: a signal transmitting device including a first pixel thinning control unit configured to thin out every other pair of two neighboring pixel samples of each line from N consecutive frames of a video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines, map the thinned every other pair of two neighboring pixel samples to first to 4N-th sub images including an m'×n' (m' indicating m' samples and n' indicating n' lines are positive integers)/48P-60P/r':g':b' (r', g', and b' are a signal ratio in the case of a predetermined signal transmission scheme)/10-bit or 12-bit signal, and arrange a vertical blanking region between two of N regions in which pixel samples of respective frames of the video signal are mapped in each sub image; and a signal transmitting device including a pixel multiplexing unit configured to reproduce the video signal of the N frames by extracting the pixel samples from the first to 4N-th sub images and multiplexing the extracted pixel samples.

According to the first aspect of the present disclosure, every other pair of two neighboring pixel samples of each line is thinned out from N consecutive frames of a first video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/ 10-bit or 12-bit signal in which the number of pixels per frame exceeds the number of pixels specified in an HD format at intervals of 2N lines, the thinned every other pair of two neighboring pixel samples are mapped to first to 4N-th sub images including an m'×n' (m' indicating m' samples and n indicating n' lines are positive integers)/48P-60P/r':g':b' (r', g', and b' are a signal ratio in the case of a predetermined signal transmission scheme)/10-bit or 12-bit signal, and a vertical blanking region is arranged between two of N regions in which pixel samples of respective frames of the first video signal are mapped in each sub image.

According to the second aspect of the present disclosure, a video signal of N frames is reproduced by extracting pixel samples from first to 4N-th sub images in which a vertical blanking region is arranged between two of N regions in which the pixel samples of respective frames of the video signal are mapped and multiplexing the extracted pixel samples, the first to 4N-th sub images being generated by thinning out every other pair of two neighboring pixel samples of each line from the N consecutive frames of the video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines and mapping the thinned every other pair of two neighboring pixel samples and including an m'×n' (m' indicating m' samples and n' indicating n' lines are positive integers)/48P-60P/r':g':b' (r', g', and b' are a signal ratio in the case of a predetermined signal transmission scheme)/10-bit or 12-bit signal.

According to the third aspect of the present disclosure, every other pair of two neighboring pixel samples of each line is thinned out from N consecutive frames of a video signal including an m×n (m indicating m samples and n indicating n lines are positive integers)/(48P-60P)×N (N is an integer of 2 or more)/r:g:b (r, b, and b are a signal ratio in the case of a predetermined signal transmission scheme)/10-bit or 12-bit signal in which the number of pixels per frame exceeds the number of pixels specified in an HD format at intervals of 2N lines, the thinned every other pair of two neighboring pixel samples is mapped to first to 4N-th sub images including an m'×n' (m' indicating m' samples and n' indicating n' lines are positive integers)/48P-60P/r':g':b' (r', g', and b' are a signal ratio in the case of a predetermined signal transmission scheme)/10-bit or 12-bit signal, and a vertical blanking region is arranged between two of N regions in which pixel samples of respective frames of the video signal are mapped in each sub image. The video signal of the N frames is reproduced by extracting the pixel samples from the first to 4N-th sub images and multiplexing the extracted pixel samples.

Advantageous Effects of Invention

According to the first to third aspects of the present disclosure, it is possible to perform video switching in units of frames of an original video signal when a high-definition video signal having a high frame rate is serially transmitted through an SDI.

BRIEF DESCRIPTION OF DRAWINGS

FIG. 1 is a table illustrating a video signal standard related to UHDTV.

FIG. 2 is a table illustrating a 2048×1080 signal standard standardized in SMPTE 2048-1, 2.

FIG. 3 is a table illustrating a 4096×2160 signal standard standardized in SMPTE 2048-1, 2.

DESCRIPTION OF EMBODIMENTS

Hereinafter, best modes (hereinafter referred to as "embodiments") for carrying out the present disclosure will be described. The description will proceed in the following order.

1. Next generation 2 k, 4 k, and 8 k video signals
2. First embodiment (example of transmitting UHDTV1 3840×2160/100P-120P/4:4:4, 4:2:2, or 4:2:0/10-bit or 12-bit signal)
3. Second embodiment (example of transmitting UHDTV2 7680×4320/100P-120P/4:4:4, 4:2:2, or 4:2:0/10 bit or 12-bit signal)
4. Third embodiment (example of transmitting UHDTV1 3840×2160/(50P-60P)×N/4:4:4, 4:2:2, or 4:2:0/10-bit or 12-bit signal)
5. Fourth embodiment (example of transmitting UHDTV2, 7680×4320/(50P-60P)×N/4:4:4, 4:2:2, or 4:2:0/10-bit or 12-bit signal)
6. Fifth embodiment (example of transmitting 4096×2160/96P-120P/4:4:4 or 4:2:2/10-bit or 12-bit signal)
7. Modified examples 1. Next Generation 2 k, 4 k, and 8 k Video Signals First, next generation 2 k, 4 k, and 8 k video signals will be described before embodiments of the present disclosure are described.

As an interface for transmitting and receiving video signals of various frame rates, a transmission standard known as a mode D (see FIG. 15 which will be described later) has been added to SMPTE 435-2 and standardized as SMPTE 435-2-2009. SMPTE 435-2 states that a multi-channel multiplexing process is performed on HD-SDI data obtained by serially converting a 10-bit parallel stream specified in SMPTE 292 into a 10.692 Gbps serial interface and scrambling the 10.692 Gbps serial interface. Typically, an HD-SDI field is configured in the order of an EAV, a horizontal auxiliary data space (HANC data; also referred to as a "horizontal blanking interval"), an SAV, and video data. In the UHDTV standard, a scheme in which 3840×2160/50P-60P is transmitted through a 2-channel 10 Gbps interface, and 7680×4320/50P-60P is transmitted through an 8-channel 10 Gbps interface has been proposed to SMPTE. This proposal has been standardized as SMPTE 2036-3.

A video standard related to video signals of 3840×2160 and 7680×4320 having two or four times the number of samples and the number of lines of 1920×1080 has been proposed to ITU and SMPTE. Of these, the video standard standardized in ITU is called large screen digital imagery (LSDI), and the video standard standardized in SMPTE is called UHDTV. With regard to UHDTV, a video signal illustrated in FIG. 1 is specified.

As a standard employed for a digital camera in the film industry, signal standards of 2048×1080 and 4096×2160 have been standardized as SMPTE 2048-1 and SMPTE 2048-2 as illustrated in FIGS. 2 and 3.

[Exemplary Sample Structure of a UHDTV Signal Standard]

Here, an exemplary sample structure of a UHDTV signal standard will be described with reference to FIG. 4.

Figure 4:
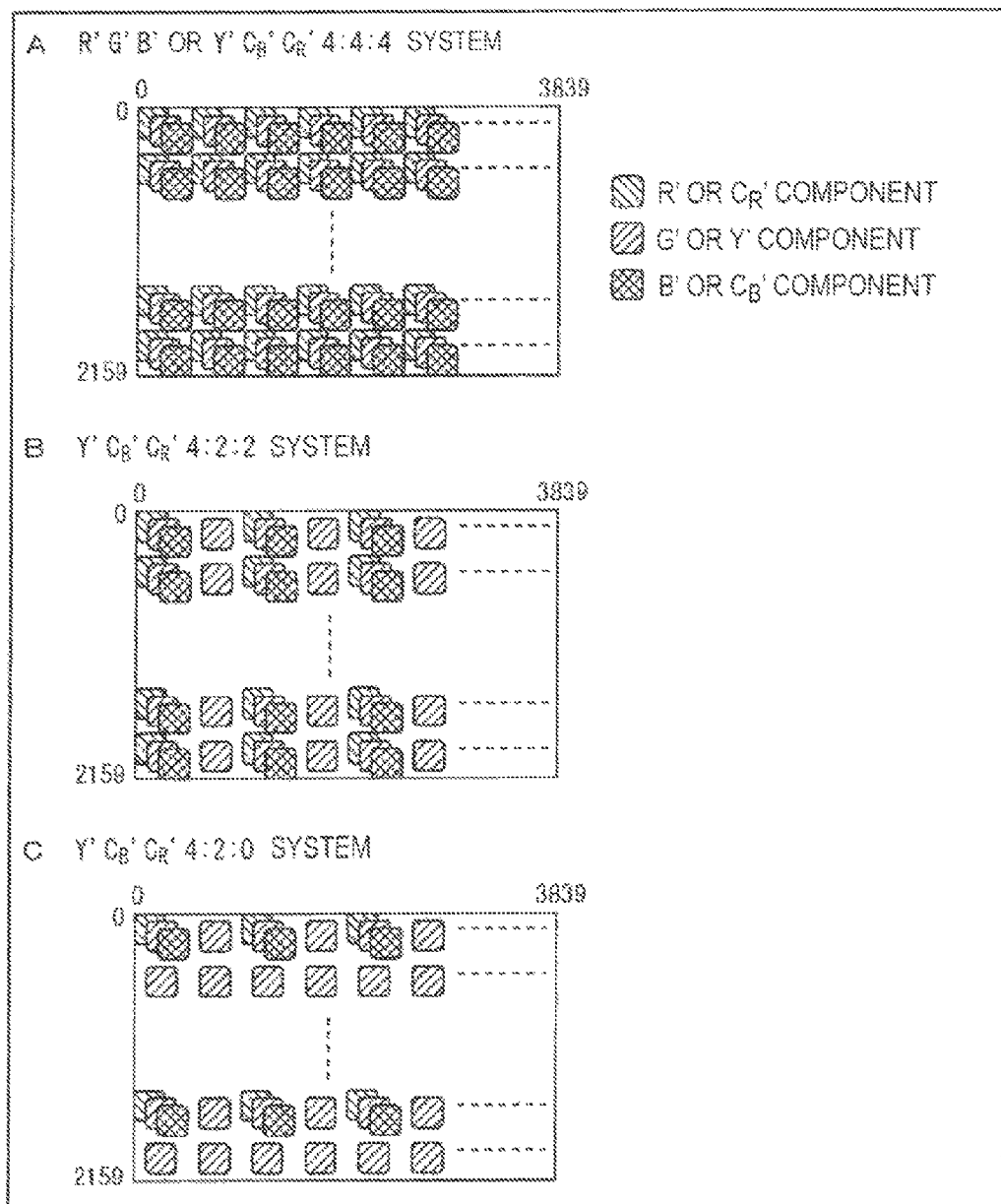
FIG. 4 is an explanatory diagram illustrating an exemplary sample structure of a UHDTV standard in 3840×2160.

FIG. 4 is an explanatory diagram illustrating an exemplary sample structure of a UHDTV signal standard in 3840×2160. A frame used for description of A and B of FIG. 4 configures one frame in 3840×2160.

As a sample structure of a signal standard in 3840×2160, there are the following three types. In the SMPTE standard, a signal with a prime symbol "'" indicates a signal that has undergone gamma correction or the like such as R', G', and B'.

A of FIG. 4 illustrates an example of an R'G'B' or Y'Cb'Cr' 4:4:4 system. In this system, a component of RGB or YCbCr is included in all samples.

B of FIG. 4 illustrates an example of a Y'Cb'Cr' 4:2:2 system. In this system, a component of YCbCr is included in even-numbered samples, and a component of Y is included in odd-numbered samples.

C of FIG. 4 illustrates an example of a Y'Cb'Cr' 4:2:0 system. In this system, a component of YCbCr is included in even-numbered samples of even-numbered lines, and a component of Y is included in odd-numbered samples of even-numbered lines and all samples of odd-numbered lines.

Hereinafter, a format of a video signal is indicated by an m×n/a-b/r:g:b/10-bit or 12-bit signal. m×n indicates the number of samples (the number of pixels) in a horizontal direction×the number of lines in a vertical direction. a-b indicates the number of frames (frame rate) per second. r, g, and b indicate a signal ratio in the case of a predetermined signal transmission scheme, indicate a ratio of a red signal R:a green signal G:a blue signal B in the case of a primary color signal transmission scheme, and indicate a ratio of a luminance signal Y:a first chrominance signal Cb:a second chrominance signal Cr in the case of a chrominance signal transmission scheme. Hereinafter, a format of a video signal is also abbreviated as an "m×n/a-b signal."

Further, hereinafter, 50P, 59.94P, and 60P indicating a frame rate of a progressive signal are abbreviated as "50P-60P," and 47.95P, 48P, 50P, 59.94P, and 60P are abbreviated as "48P-60P." 100P, 119.88P, and 120P are abbreviated as "100P-120P," and 95.9P, 96P, 100P, 119.88P, and 120P are abbreviated as "96P-120P." 50I, 59.94I, and 60I indicating a frame rate of an interlace signal are abbreviated as "50I-60I," and 47.95I, 48I, 50I, 59.94I, and 60I are abbreviated as "48I-60I."

2. First Embodiment

Example of Transmitting 3840×2160/100P-120P/4:4:4, 4:2:2, or 4:2:0/10-Bit or 12-Bit Signal Next, a first embodiment of the present disclosure will be described with reference to FIGS. 5 to 18.

In the first embodiment, transmission of a 3840×2160/100P-120P/4:4:4, 4:2:2, or 4:2:0/10-bit or 12-bit signal is performed. In other words, transmission of a video signal in which m×n is 3840×2160, a-b is 100P-120P, and r:g:b is 4:4:4, 4:2:2, or 4:2:0 is performed. A frame rate of this signal is twice that of the 3840×2160/50P-60P/4:4:4, 4:2:2, or 4:2:0/10-bit or 12-bit signal of UHDTV1 specified in SMPTE 2036-1.

For example, in the case of a 4:4:4 signal, one pixel sample is a 36-bit signal including a G data series, a B data series, and an R data series, each of which includes a word length of 12 bits. A frame period of this signal is 1/100, 1/119.88, or 1/120 seconds, and an effective line period of 2160 is included within a frame period. Thus, this signal is a video signal in which the number of pixels of one frame exceeds the number of pixels specified in an HD format. An audio signal is input in synchronization with a video signal.

Compared with a video signal of UHDTV1 specified in SMPTE 2036-1, this signal differs in a color gamut (colorimetry) but is the same in a digital signal format such as an inhibition code.

Hereinafter, the 3840×2160/100P-120P/4:4:4, 4:2:2, or 4:2:0/10-bit or 12-bit signal is also referred to as a "UHDTV1 class image (100P-120P)."

Figure 5:
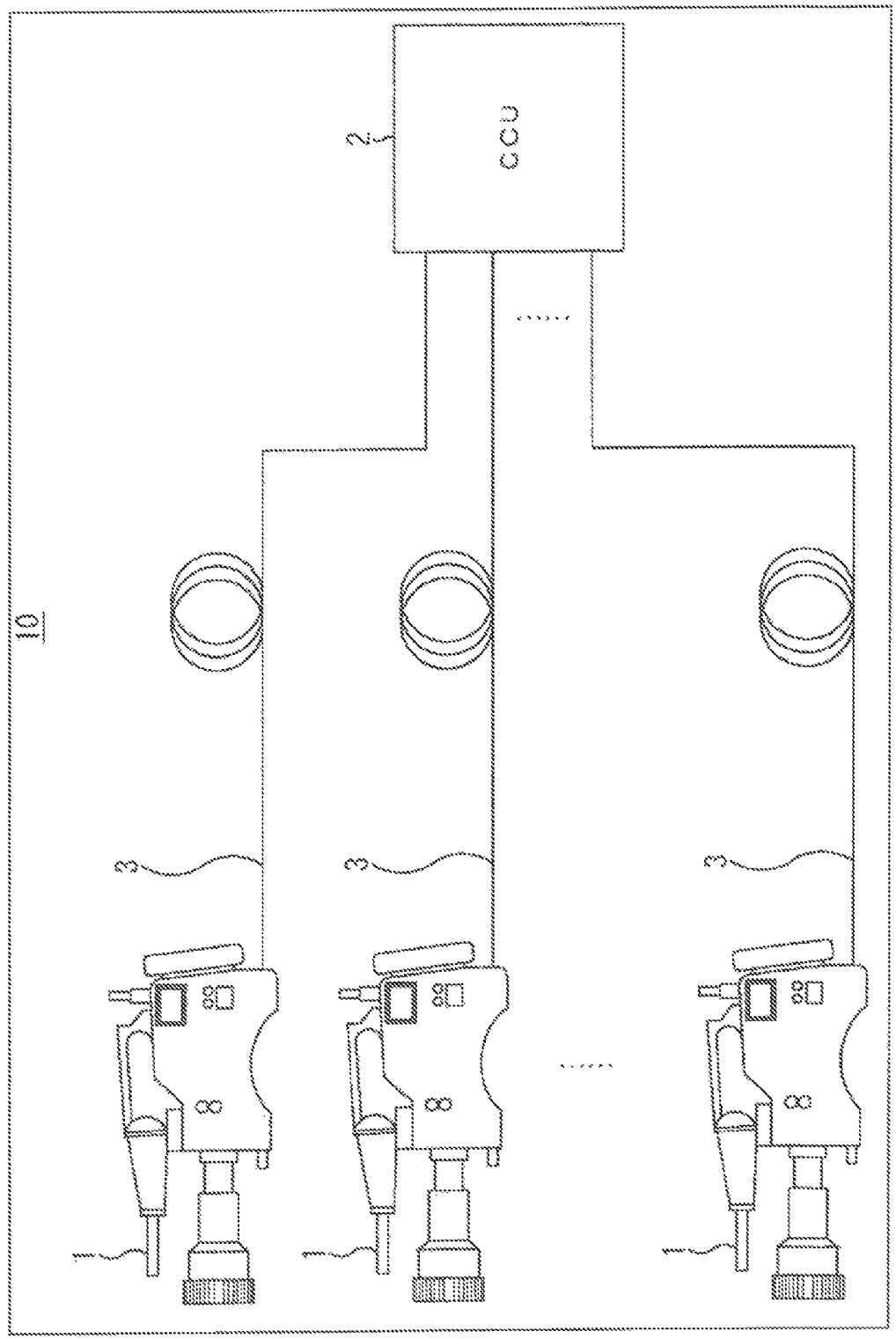
FIG. 5 a diagram illustrating an overall configuration of a camera transmission system for a television broadcasting station to which a first embodiment is applied.

FIG. 5 is a diagram illustrating an overall configuration of a signal transmission system 10 for a television broadcasting station to which the present embodiment is applied. The signal transmission system 10 includes a plurality of broadcasting cameras 1 having the same configuration and a camera control unit (CCU) 2, and the broadcasting cameras 1 are connected to the CCU 2 via optical fiber cables 3. The broadcasting camera 1 is used as a signal transmitting device to which a signal transmission method of transmitting serial digital data (a video signal) is applied, and the CCU 2 is used as a signal receiving device to which a signal reception method of receiving the serial digital data is applied. The transmission system 10 in which the broadcasting camera 1 is combined with the CCU 2 is used as a signal transmission system in which the serial digital data is transmitted and received. Further, processes performed by these devices may be implemented by collaboration of hardware or by executing a program.

The broadcasting camera 1 generates the UHDTV1 class image (100P-120P) of 4 k×2 k, and transmits the UHDTV1 class image (100P-120P) to the CCU 2.

The CCU 2 controls the broadcasting cameras 1, receives the video signals from the broadcasting cameras 1, and transmits video signals (return videos) for displaying videos being captured by the other broadcasting cameras 1 to monitors of the broadcasting cameras 1. The CCU 2 functions as a signal receiving device that receives the video signals from the broadcasting cameras 1.

Figure 6:
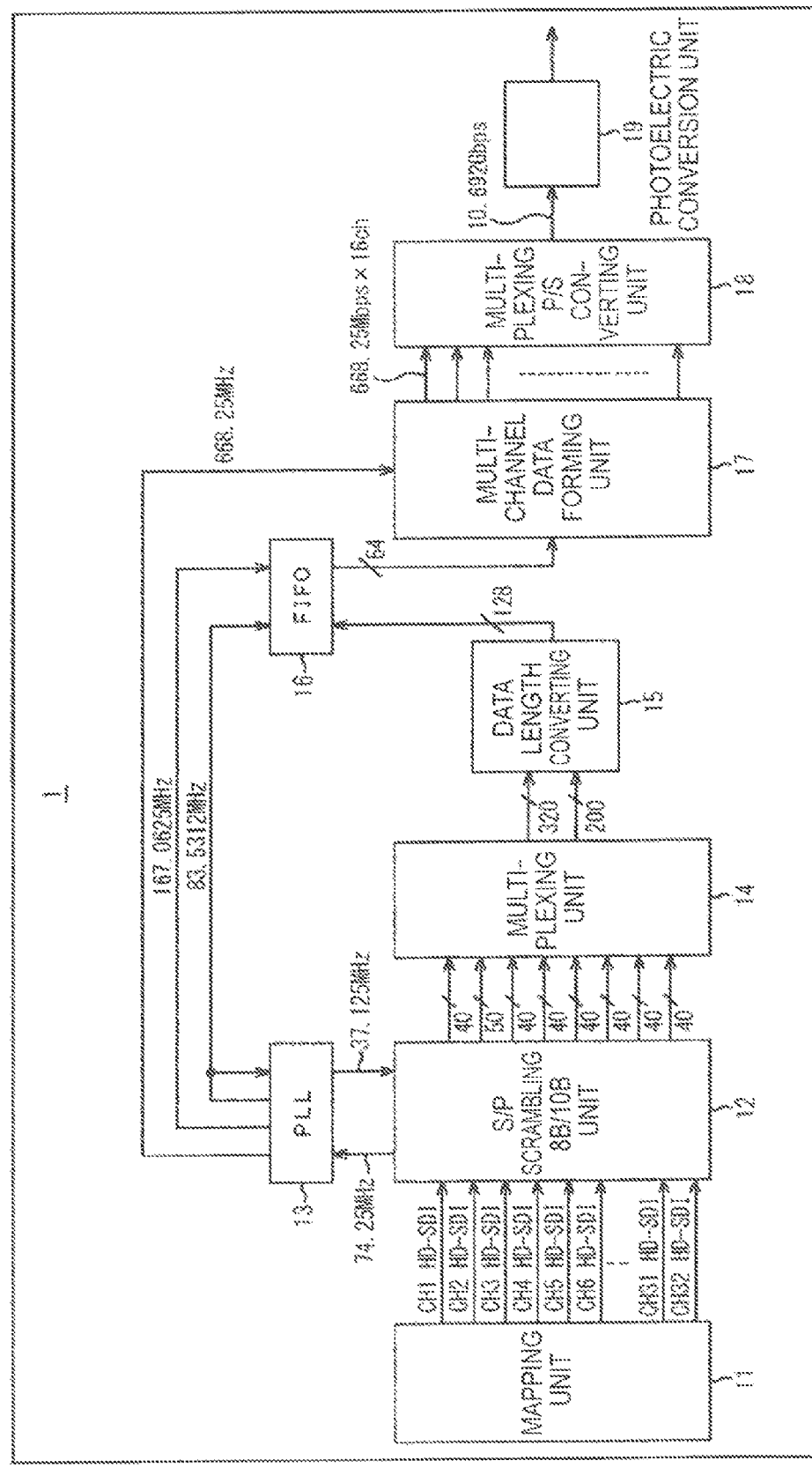
FIG. 6 is a block diagram illustrating an exemplary internal configuration of a signal transmitting device in a circuit configuration of a broadcasting camera according to the first embodiment of the present disclosure.

FIG. 6 is a block diagram illustrating a signal transmitting device related to the present embodiment in a circuit configuration of the broadcasting camera 1. A UHDTV1 class image (100P-120P) generated by an imaging unit and a video signal processing unit (not illustrated) in the broadcasting camera 1 is transferred to a mapping unit 11.

The mapping unit 11 maps the UHDTV1 class image (100P-120P) to data streams (hereinafter, also referred to simply as "HD-SDIs") of 32 channels specified in an HD-SDI format.

[Internal Configuration of Mapping Unit]

Here, an internal configuration of the mapping unit 11 will be described.

Figure 7:
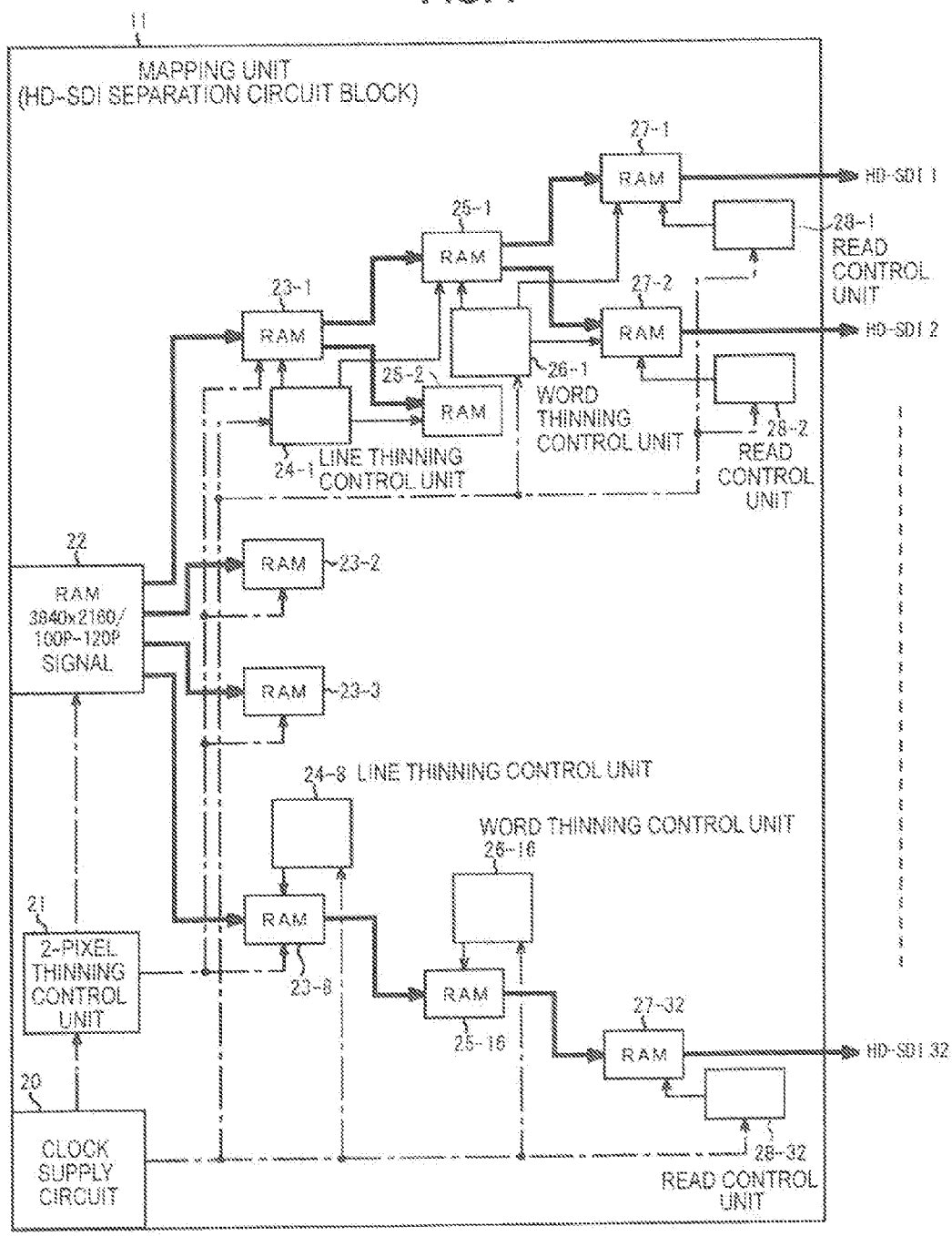
FIG. 7 is a block diagram illustrating an exemplary internal configuration of a mapping unit according to the first embodiment of the present disclosure.

FIG. 7 illustrates an exemplary internal configuration of the mapping unit 11.

The mapping unit 11 includes a clock supply circuit 20 that supplies a clock to respective units and a RAM 22 that stores a 3840×2160/100P-120P video signal (a UHDTV1 class image (100P-120P)). The mapping unit 11 further includes a 2-pixel thinning control unit 21 that controls 2-pixel thinning (interleaving) of the UHDTV1 class image (100P-120P) stored in the RAM 22. The mapping unit 11 further includes RAMs 23-1 to 23-8 that store a pixel sample thinned out from the UHDTV1 class image (100P-120P) as first to eighth sub images.

Each of the first to eighth sub images is configured with a 1920×1080/50P 60P/4:4:4, 4:2:2, or 4:2:0/10-bit or 12-bit signal specified in SMPTE 274. Thus, in the first to eighth sub images, m'×n' is 1920×1080, a'-b' is 50P-60P, and r':g':b' is 4:4:4, 4:2:2, or 4:2:0.

The mapping unit 11 further includes line thinning control units 24-1 to 24-8 that control line thinning of the first to eighth sub images stored in the RAMs 23-4 to 23-8. The mapping unit 11 further includes RAMs 25-1 to 25-16 that store lines thinned out by the line thinning control units 24-1 to 24-8.

The mapping unit 11 further includes word thinning control units 26-1 to 26-16 that control word thinning of data stored in the RAMs 25-1 to 25-16. The mapping unit 11 further includes RAMs 27-1 to 27-32 that store words thinned out by the word thinning control units 26-1 to 26-16.

The mapping unit 11 further includes read control units 28-1 to 28-32 that output the words read from the RAMs 27-1 to 27-32 as HD-SDIs of 32 channels.

In FIG. 7, processing blocks that generate HD-SDIs 1 and 2 are illustrated, but blocks that generate HD-SDIs 3 to 32 have the same exemplary configuration, and thus illustration and a detailed description thereof are omitted.

In FIG. 7, the example of performing the three-step thinning process of the 2-pixel thinning, the line thinning, and the word thinning using three types of memories (the RAMs 23-1 to 23-8, the RAMs 25-1 to 25-16, and the RAMs 27-1 to 27-32) is illustrated, but two or more of the three types of memories may be used in common.

[Exemplary Operation of Mapping Unit]

Next, an exemplary operation of the mapping unit 11 will be described. In the following description, a UHDTV1 class image (100P-120P) of a first frame is referred to as a "first class image," and a UHDTV1 class image (100P-120P) of a second frame is referred to as a "second class image."

First, the clock supply circuit 20 supplies clocks to the 2-pixel thinning control unit 21, the line thinning control units 24-1 to 24-8, the word thinning control units 26-1 to 26-16, and the read control units 28-1 to 28-32. The clocks are used for reading or writing of a pixel sample, and the respective units are synchronized by the clocks.

The UHDTV1 class image (100P-120P) input from an image sensor (not illustrated) is stored in the RAM 22.

Figure 8:
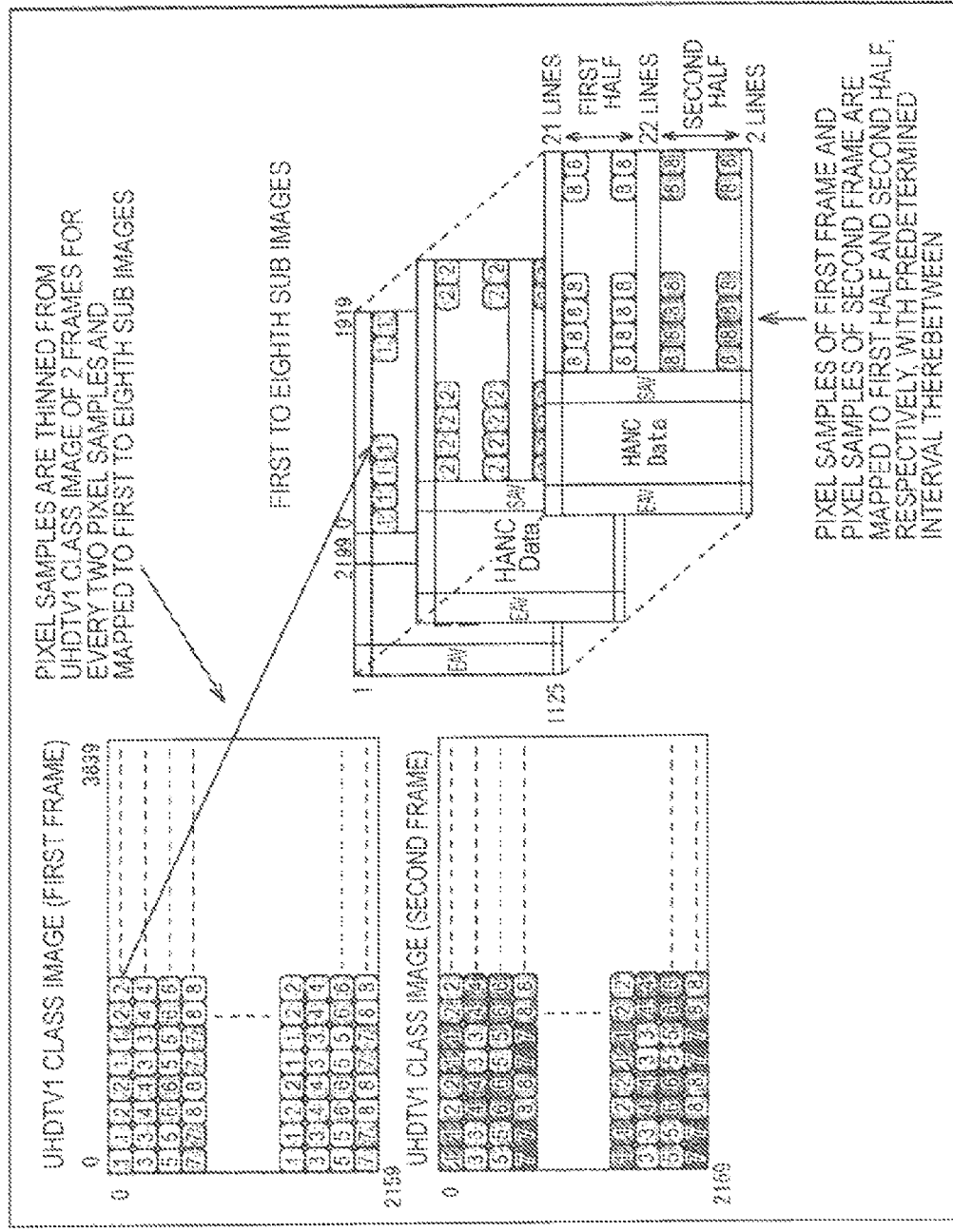
FIG. 8 is an explanatory diagram illustrating an exemplary process in which a 2-pixel thinning control unit according to the first embodiment of the present disclosure thins out pixel samples from first and second class images by two pixels and maps the thinned pixel samples to first to eighth sub images.

The 2-pixel thinning control unit 21 thins out every other pair of two neighboring pixel samples of each line from two consecutive frames of the UHDTV1 class image (100P-120P) (in units of two frames) at intervals of 4 lines, and maps every other pair of two neighboring pixel samples to the first to eighth sub images as illustrated in FIG. 8.

As illustrated in FIG. 8, a sample number and a line number of the UHDTV1 class image (100P-120P) start from 0. Thus, there are a total of 3840 samples from a 0th sample to a 3839th sample and a total of 2160 lines from a 0th line to a 2159th line in an effective region of the UHDTV1 class image (100P-120P). On the other hand, a sample number of a sub image starts from 0, and a line number starts from 1. Thus, there are a total of 2200 samples from a 0th sample to a 2199th sample and a total of 1125 lines from a 1st line to a 1125th line in a sub image. Here, the number of samples per line of a sub image is an example and changes according to a system of a video signal.

Here, a method of mapping pixel samples from the first and second class images to the first to eighth sub images will be described in detail with further reference to FIG. 9.

Figure 9:
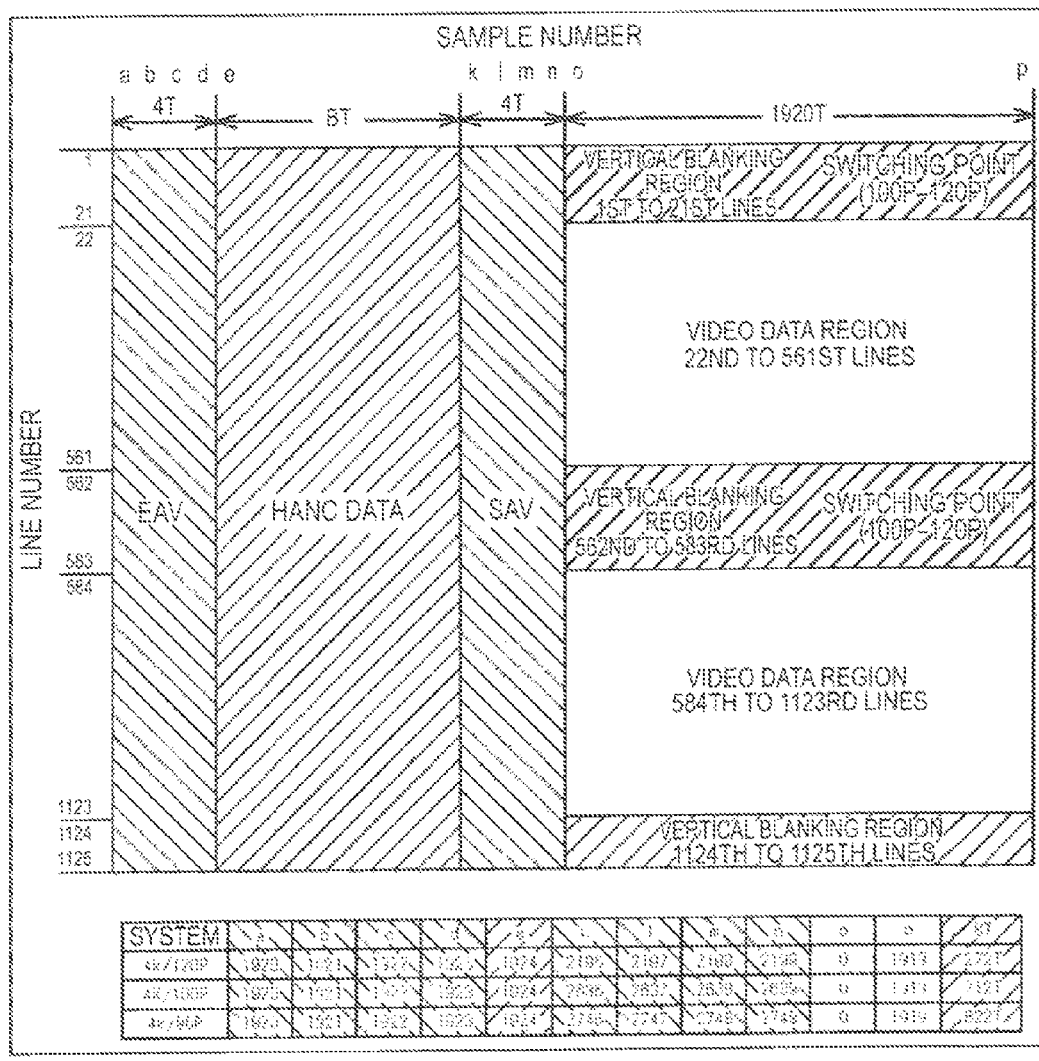
FIG. 9 is a diagram illustrating a first example of a sub image format.

FIG. 9 illustrates an exemplary format of each sub image. This format is substantially the same as a format of a 1920×1080/50P-60P signal specified in SMPTE 274M. However, an arrangement of a vertical blanking region and a video data region differs.

A sample number is illustrated in the upper portion of FIG. 9. A sample number at a position indicated by o is 0 (zero), and a sample number at a position indicated by p is 1919. The vertical blanking region and the video data region are arranged in regions of 1920 samples, and pixel samples of the first and second class images are mapped to the regions of the 1920 samples.

An EAV region is arranged in regions of 4 samples from a 1920th sample indicated by a to a 1923rd sample indicated by d. An HANC data region is arranged in regions of from a 1924th sample indicated by e up to a sample indicated by k. A value of k changes according to a system of the UHDTV1 class image serving as sub image mapping source. In other words, a value of k is 2196 when an original UHDTV1 class image is 120P of 4 k, 2636 when an original UHDTV1 class image is 100P of 4 k, and 2746 when an original class image is 96P of 4 k. An SAV region is arranged in regions of 4 samples from a sample indicated by k to a sample indicated by n.

Then, the 2-pixel thinning control unit 21 maps the pixel samples of the first and second class images to the first to eighth sub images as follows.

First, the vertical blanking region is arranged in regions of 21 lines from a 1st line to a 21st line in the head of the first to eighth sub images.

Then, pixel samples of a (4i+2j)-th sample and a (4i+2j+1)-th sample (i=0 to 959, j=0 to 1) of a (4g+h)-th line (g=0 to 539, h=0 to 3) of the first class image are mapped to a 2i-th sample and a (2i+1)-th sample of a (g+22)-th line of a (2h+j+1)-th sub image.

For example, a pair of two neighboring pixel samples in a line direction is extracted from the head of each line at intervals of 4 lines starting from a 0th line of the first class image and alternately mapped to the first sub image and the second sub image. In other words, a 0th sample, a 1st sample, a 4th sample, a 5th sample, an 8th sample, a 9th sample, . . . , a 3836th sample, and a 3837th sample of a 0th line, a 4th line, an 8th line, . . . , and a 2156th line of the first class image are mapped to regions of 0th to 1919th samples of 22nd to 561st lines of the first sub image. Further, a 2nd sample, a 3rd sample, a 6th sample, a 7th sample, a 10th sample, an 11th sample, . . . , a 3838th sample, and a 3839th sample of the 0th line, the 4th line, the 8th line, . . . , and the 2156th line of the first class image are mapped to the regions of the 0th to 1919th samples of the 22nd to 561st lines of the second sub image.

Similarly, a pair of two neighboring pixel samples in a line direction is extracted from the head of each line at intervals of 4 lines starting from a 1st line of the first class image and alternately mapped to the third sub image and the fourth sub image. In other words, a 0th sample, a 1st sample, a 4th sample, a 5th sample, an 8th sample, a 9th sample, . . . , a 3836th sample, and a 3837th sample of a 1st line, a 5th line, a 9th line, . . . , and a 2157th line of the first class image are mapped to regions of 0th to 1919th samples of 22nd to 561st lines of the third sub image. Further, a 2nd sample, a 3rd sample, a 6th sample, a 7th sample, a 10th sample, an 11th sample, . . . , a 3838th sample, and a 3839th sample of the 1st line, the 5th line, the 9th line, . . . , and the 2157th line of the first class image are mapped to the regions of the 0th to 1919th samples of the 22nd to 561st lines of the fourth sub image.

Further, a pair of two neighboring pixel samples in a line direction is extracted from the head of each line at intervals of 4 lines starting from a 2nd line of the first class image and alternately mapped to the fifth sub image and the sixth sub image. In other words, a 0th sample, a 1st sample, a 4th sample, a 5th sample, an 8th sample, a 9th sample, . . . , a 3836th sample, and a 3837th sample of a 2nd line, a 6th line, a 10th line, . . . , and a 2158th line of the first class image are mapped to regions of 0th to 1919th samples of 22nd to 561st lines of the fifth sub image. Further, a 2nd sample, a 3rd sample, a 6th sample, a 7th sample, a 10th sample, an 11th sample, . . . , a 3838th sample, and a 3839th sample of the 2nd line, the 6th line, the 10th line, . . . , and the 2158th line of the first class image are mapped to the regions of the 0th to 1919th samples of the 22nd to 561st lines of the sixth sub image.

Further, a pair of two neighboring pixel samples in a line direction is extracted from the head of each line at intervals of 4 lines starting from a 3rd line of the first class image and alternately mapped to the seventh sub image and the eighth sub image. In other words, a 0th sample, a 1st sample, a 4th sample, a 5th sample, an 8th sample, a 9th sample, . . . , a 3836th sample, and a 3837th sample of a 3rd line, a 7th line, a 11th line, . . . , and a 2159th line of the first class image are mapped to regions of 0th to 1919th samples of 22nd to 561st lines of the seventh sub image. Further, a 2nd sample, a 3rd sample, a 6th sample, a 7th sample, a 10th sample, an 11th sample, . . . , a 3838th sample, and a 3839th sample of the 3rd line, the 7th line, the 11th line, . . . , and the 2159th line of the first class image are mapped to the regions of the 0th to 1919th samples of the 22nd to 561st lines of the eighth sub image.

Then, the vertical blanking region is arranged in regions of 22 lines from a 562nd line to a 583rd line of the first to eighth sub images.

Then, pixel samples of a (4i+2j)-th sample and a (4i+2j+1)-th sample (i=0 to 959, j=0 to 1) of a (4g+h)-th line (g=0 to 539, h=0 to 3) of the second class image are mapped to a 2i-th sample and a (2i+1)-th sample of a (g+584)-th line of the (2h+j+1)-th sub image.

For example, a pair of two neighboring pixel samples in a line direction is extracted from the head of each line at intervals of 4 lines starting from a 0th line of the second class image and alternately mapped to the first sub image and the second sub image. In other words, a 0th sample, a 1st sample, a 4th sample, a 5th sample, an 8th sample, a 9th sample, . . . , a 3836th sample, and a 3837th sample of a 0th line, a 4th line, an 8th line, . . . , and a 2156th line of the second class image are mapped to regions of 0th to 1919th samples of 584th to 1123rd lines of the first sub image. Further, a 2nd sample, a 3rd sample, a 6th sample, a 7th sample, a 10th sample, an 11th sample, . . . , a 3838th sample, and a 3839th sample of the 0th line, the 4th line, the 8th line, . . . , and the 2156th line of the second class image are mapped to the regions of the 0th to 1919th samples of the 584th to 1123rd lines of the second sub image.

Similar, a pair of two neighboring pixel samples in a line direction is extracted from the head of each line at intervals of 4 lines starting from a 1st line of the second class image and alternately mapped to the third sub image and the fourth sub image. In other words, a 0th sample, a 1st sample, a 4th sample, a 5th sample, an 8th sample, a 9th sample, . . . , a 3836th sample, and a 3837th sample of a 1st line, a 5th line, a 9th line, . . . , and a 2157th line of the second class image are mapped to regions of 0th to 1919th samples of 584th to 1123rd lines of the and sub image. Further, a 2nd sample, a 3rd sample, a 6th sample, a 7th sample, a 10th sample, an 11th sample, . . . , a 3838th sample, and a 3839th sample of the 1st line, the 5th line, the 9th line, . . . , and the 2157th line of the second class image are mapped to the regions of the 0th to 1919th samples of the 584th to 1123rd lines of the fourth sub image.

Further, a pair of two neighboring pixel samples in a line direction is extracted from the head of each line at intervals of 4 lines starting from a 2nd line of the second class image and alternately mapped to the fifth sub image and the sixth sub image. In other words, a 0th sample, a 1st sample, a 4th sample, a 5th sample, an 8th sample, a 9th sample, . . . , a 3836th sample, and a 3837th sample of a 2nd line, a 6th line, a 10th line, . . . , and a 2158th line of the second class image are mapped to regions of 0th to 1919th samples of 584th to 1123rd lines of the fifth sub image. Further, a 2nd sample, a 3rd sample, a 6th sample, a 7th sample, a 10th sample, an 11th sample, . . . , a 3838th sample, and a 3839th sample of the 2nd line, the 6th line, the 10th line, . . . , and the 2158th line of the second class image are mapped to the regions of the 0th to 1919th samples of the 584th to 1123rd lines of the sixth sub image.

Further, a pair of two neighboring pixel samples in a line direction is extracted from the head of each line at intervals of 4 lines starting from a 3rd line of the second class image and alternately mapped to the seventh sub image and the eighth sub image. In other words, a 0th sample, a 1st sample, a 4th sample, a 5th sample, an 8th sample, a 9th sample, . . . , a 3836th sample, and a 3837th sample of a 3rd line, a 7th line, an 11th line, . . . , and a 2159th line of the second class image are mapped to regions of 0th to 1919th samples of 584th to 1123rd lines of the seventh sub image. Further, a 2nd sample, a 3rd sample, a 6th sample, a 7th sample, a 10th sample, an 11th sample, . . . , a 3838th sample, and a 3839th sample of the 3rd line, the 7th line, the 11th line, . . . , and the 2159th line of the second class image are mapped to the regions of the 0th to 1919th samples of the 584th to 1123rd lines of the eighth sub image.

Further, the vertical blanking region is arranged in regions of two lines from a 1124th line to a 1125th line of the first to eighth sub images.

Further, when the UHDTV1 class image (100P-120P) is a 4:2:0 signal, the 2-pixel thinning control unit 21 maps 200h (a 10-bit system) or 800h (a 12-bit system) serving as a default value to a Cr channel. As a result, the 4:2:0 signal is dealt with in the same way as a 4:2:2 signal.

For example, a default value specified in SMPTE 274 is set to the vertical blanking region. The default value is 40h (64) when Y, R, G, and B are 10 bits, 100h (256) when Y, R, G, and B are 12 bits, 200h (512) when Cb and Cr are 10 bits, and 800h (2048) when Cb and Cr are 12 bits.

As described above, every other pair of two neighboring pixel samples of each line is thinned out from the two consecutive frames of the UHDTV1 class image (100P-120P) at intervals of 4 lines and mapped to the first to eighth sub images.

Further, within the first to eighth sub images, a predetermined interval (the vertical blanking region) is arranged between the video data region of the first class image and the video data region of the second class image. Thus, it is possible to arrange a switching point for performing video switching in the vertical blanking region between the video data region of the first class image and the video data region of the second class image as well as the vertical blanking region in the head of each sub image.

For example, when the vertical blanking region is not arranged between the video data region of the first class image and the video data region of the second class image, it is difficult to arrange a switching point between the first class image and the second class image. Thus, video switching can be performed only at a maximum of a frame rate of ½ of the UHDTV1 class image (100P-120P).

On the other hand, in the present embodiment, the vertical blanking region is arranged between the video data region of the first class image and the video data region of the second class image. Thus, video switching can be performed in the same frame units as in the UHDTV1 class image (100P-120P) without damaging a video.

Further, as the vertical blanking region is arranged between the video data region of the that class image and the video data region of the second class image, it is possible to suppress a delay at the time of mapping. This will be described with reference to FIG. 10.

Figure 10:
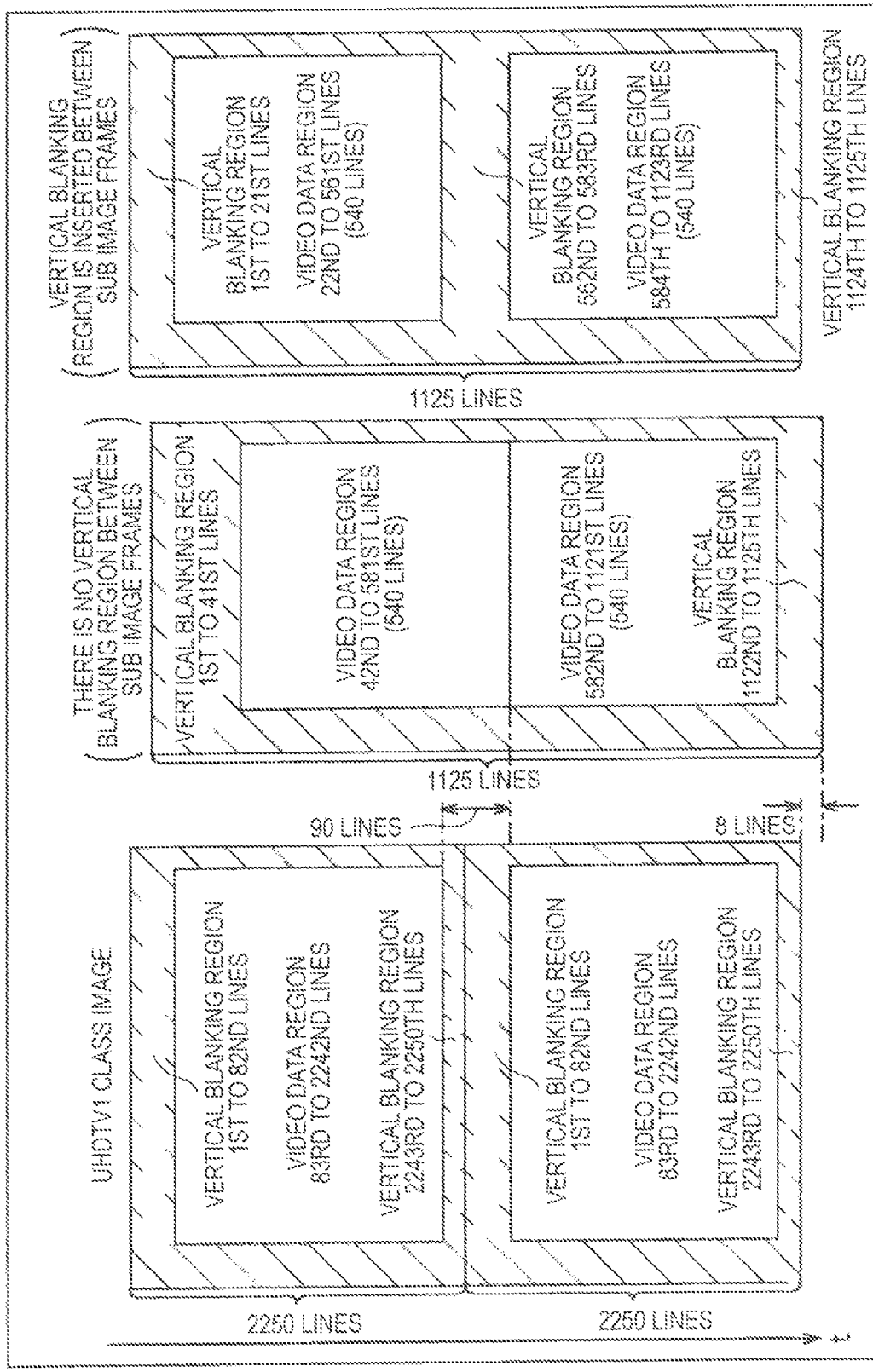
FIG. 10 is a diagram for describing a principle of suppressing a delay at the time of mapping by arranging a vertical blanking region between video data regions of a sub image.

FIG. 10 is a schematic diagram for comparing a case in which the vertical blanking region is inserted into frames with a case in which the vertical blanking region is not inserted into frames when the UHDTV1 class image (100P-120P) of two frames is mapped to the sub images. The vertical blanking regions are assumed to be arranged in first to 82nd lines in the head of the UHDTV1 class image (100P-120P) and 2243rd to 2250th lines in the tail.

For example, as illustrated in the middle of FIG. 10, when no vertical blanking region is inserted between frames, a delay occurs during a period until video data of the second class image is mapped after mapping of the video data region of the first class image. The delay period corresponds to a period until the video data of the second class image starts after the video data region of the first class image ends, that is, 90 lines of the UHDTV1 class image (100P-120P). Thus, a memory for holding pixel samples of 90 lines is necessary.

On the other hand, as illustrated on the right in FIG. 10, when the vertical blanking region is inserted between frames, no delay occurs until the video data of the second class image is mapped after mapping of the video data region of the first class image. Thus, only a memory for holding pixel samples of about 4 lines of the UHDTV1 class image (100P-120P) serving as a mapping processing unit is necessary.

The first to eighth sub images are stored in the RAMs 23-1 to 23-8.

Figure 11:
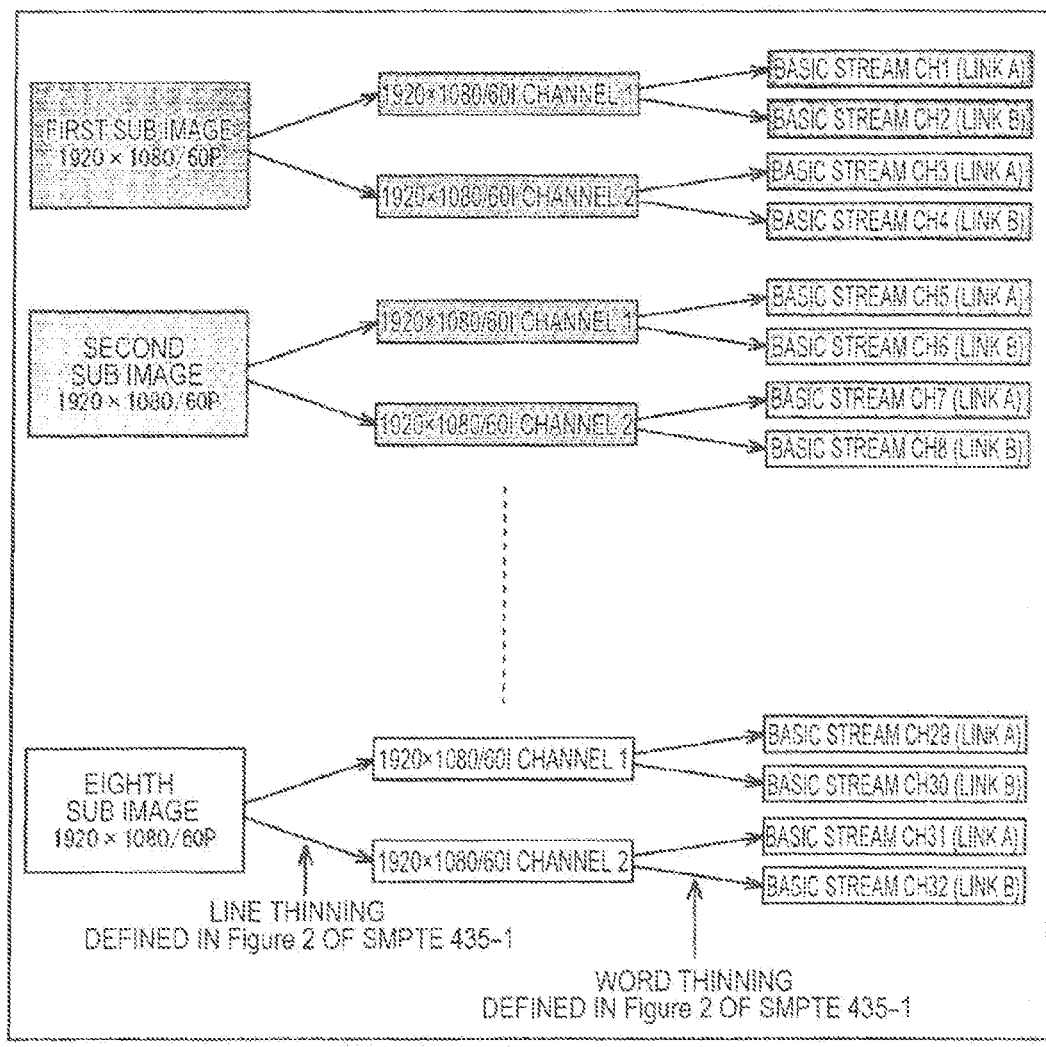
FIG. 11 is an explanatory diagram illustrating an example of dividing first to eighth sub images into a link A and a link B according to a rule of SMPTE 372M by performing word thinning after line thinning according to the first embodiment of the present disclosure.

Subsequently, as illustrated in FIG. 11, line thinning and word thinning of the first to eighth sub images are performed, for example, according to a rule of FIG. 2 of SMPTE 435-1.

Figure 12:
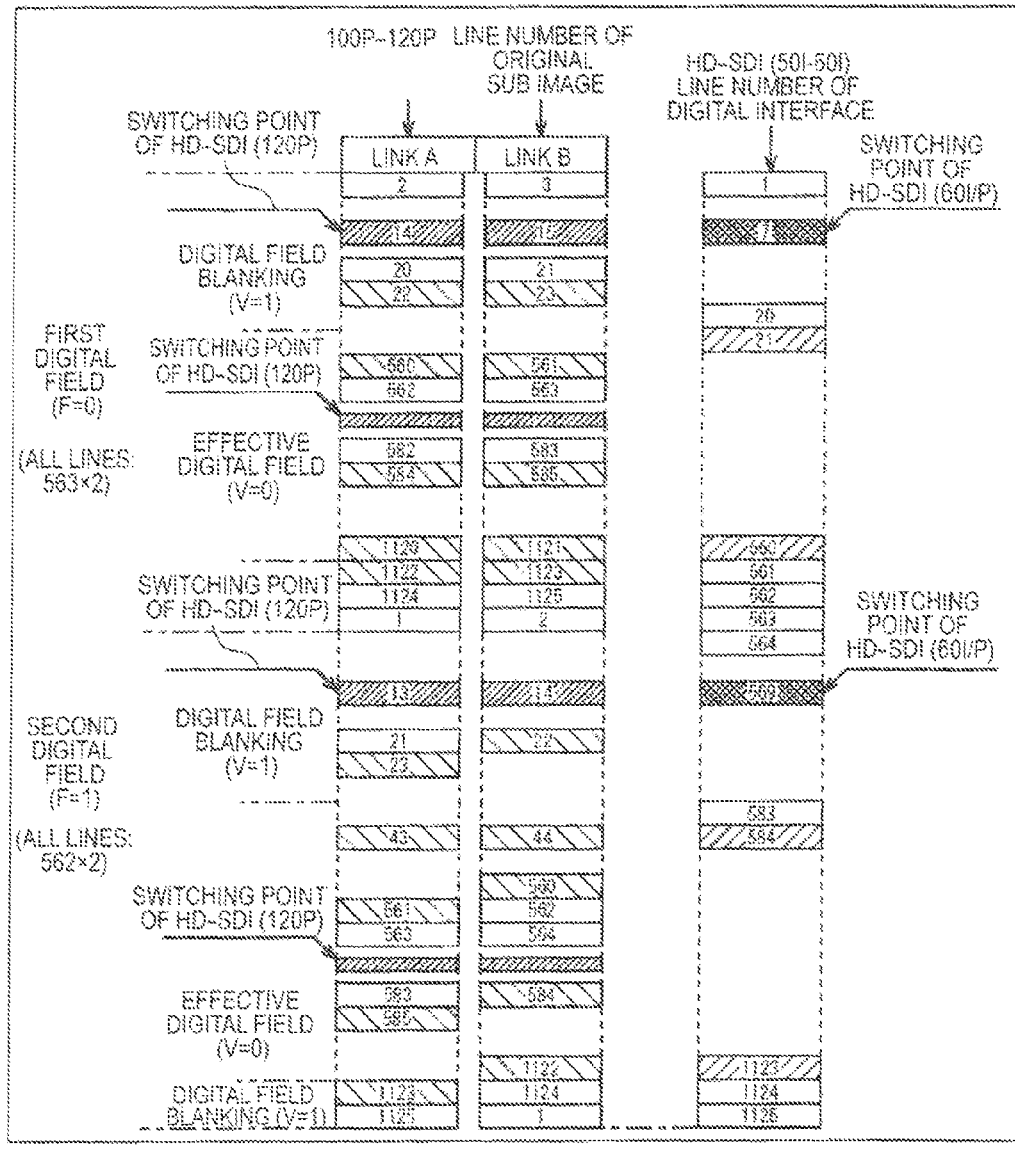
FIG. 12 is a diagram for describing line thinning of a sub image.

Specifically, first, the line thinning control units 24-1 to 24-8 thin out every other line of the first to eighth sub images (the 1920×1080/50P-60P/4:4:4 or 4:2:2/10-bit or 12-bit signal) stored in the RAMs 23-1 to 23-8, for example, according to a scheme specified in FIG. 2 of SMPTE 372 as illustrated in FIG. 12. As a result, interlace signals (1920×1080/50I-60I/4:4:4, 4:2:2, or 4:2:0/10-bit or 12-bit signal) of two channels of a link A and a link B are generated from each sub image. As a result, a sub image serving as a progressive signal is converted into an interlace signal. The 1920×1080/50I-60I/4:4:4, 4:2:2, or 4:2:0/10-bit or 12-bit signal is a signal defined in SMPTE 274M and can be observed by a current measurement device.

Numbers indicated in the link A and the link B on the left in FIG. 12 indicate line numbers of an original sub image illustrated in FIG. 9. Further, line numbers on the right in FIG. 12 indicate line numbers of an interlace signal obtained after line thinning of a sub image.

Here, an example in which, for example, consecutive frames of a frame i and a frame i+1 of the first sub image are separated into interlace signals of two channels of the link A and the link B will be described.

Even-numbered lines of the frame i of the first sub imam are allocated to a range of a 1st line to a 562nd line of the link A. Of these, a video data region (that is, a region to which the pixel samples of the first class image are mapped) of the first half of the frame i of the first sub image is allocated to a range of an 11th line to a 280th line. A video data region (that is, a region to which the pixel samples of the second class image are mapped) of the second half of the frame i of the first sub image is allocated to a range of a 292nd line to a 561st line. The vertical blanking region of the frame i of the first sub image is allocated to a range of the 1st line to a 10th line, a 281st line to a 291st line, and the 562nd line.

Odd-numbered lines of the frame i+1 of the first sub image are allocated to a range of from a 563rd line to a 1125th line of the link A. Of these, a video data region (that is, a region to which the pixel samples of the first class image are mapped) of the first half of the frame i+1 of the first sub image is allocated to a range of a 574th line to an 843rd line. A video data region (that is, a region to which the pixel samples of the second class image are mapped) of the second half of the frame i+1 of the first sub image is allocated to a range of an 855th line to a 1124th line. The vertical blanking region of the frame i+1 of the first sub image is allocated to a range of a 563rd line to a 573rd line, an 844th line to an 854th line, and the 1125th line.

Odd-numbered lines of the frame i of the first sub image are allocated to a range of a 1st line to a 562nd line of the link B. Of these, a video data region (that is, a region to which the pixel samples of the first class image are mapped) of the first half of the frame i of the first sub image is allocated to a range of an 11th line to a 280th line. A video data region (that is, a region to which the pixel samples of the second class image are mapped) of the second half of the frame i of the first sub image is allocated to a range of a 292nd line to a 561st line. The vertical blanking region of the frame i of the first sub image is allocated to a range of the 1st line to a 10th line, a 281st line to a 291st line, and the 562nd line.

Even-numbered lines of the frame i+1 of the first sub image are allocated to a range of from a 563rd line to a 1124th line of the link B. Of these, a video data region (that is, a region to which the pixel samples of the first class image are mapped) of the first half of the frame i+1 of the first sub image is allocated to a range of a 573rd line to an 842nd line. A video data region (that is, a region to which the pixel samples of the second class image are mapped) of the second half of the frame i+1 of the first sub image is allocated to a range of an 854th line to a 1123rd line. The vertical blanking region of the frame i+1 of the first sub image is allocated to a range of a 563rd line to a 572nd line, an 843rd line to an 854th line, and the 1124th line. A 1st line of a frame i+2 of the first sub image is allocated to a 1125th line of the link B.

It is possible to arrange a switching point between the 1st line and the 10th line and between the 562nd line and the 572nd line of the link A and the link B and perform video switching. In addition, it is also possible to arrange a switching point between the 281st line and the 291st line and between the 844th line and the 853rd line of the link A and the link B and perform video switching. As a result, it is possible to perform video switching in the same frame units as in the UHDTV1 class image (100P-120P).

Then, the line thinning control units 24-1 to 24-8 write a 1920×1080/50I-60I signal serving as an interlace signal obtained by thinning every other line of the first to eighth sub images in the RAMs 25-1 to 25-16.

Then, the word thinning control units 26-1 to 26-16 thin out the 1920×1080/50I-60I signal stored in the RAMs 25-1 to 25-16 in units of words. Specifically, the word thinning control units 26-1 to 26-16 perform word thinning in the same scheme as in FIGS. 4, 6, 7, 8, and 9 of SMPTE 372 when the signal obtained by the line thinning is a 10-bit or 12-bit signal of 4:4:4 or a 12-bit signal of 4:2:2. Here, the word thinning control its 26-1 to 26-16 map the 1920×1080/50I-60I signal to the links A and B (HD-SDIs of two channels) as follows.

Figure 13:
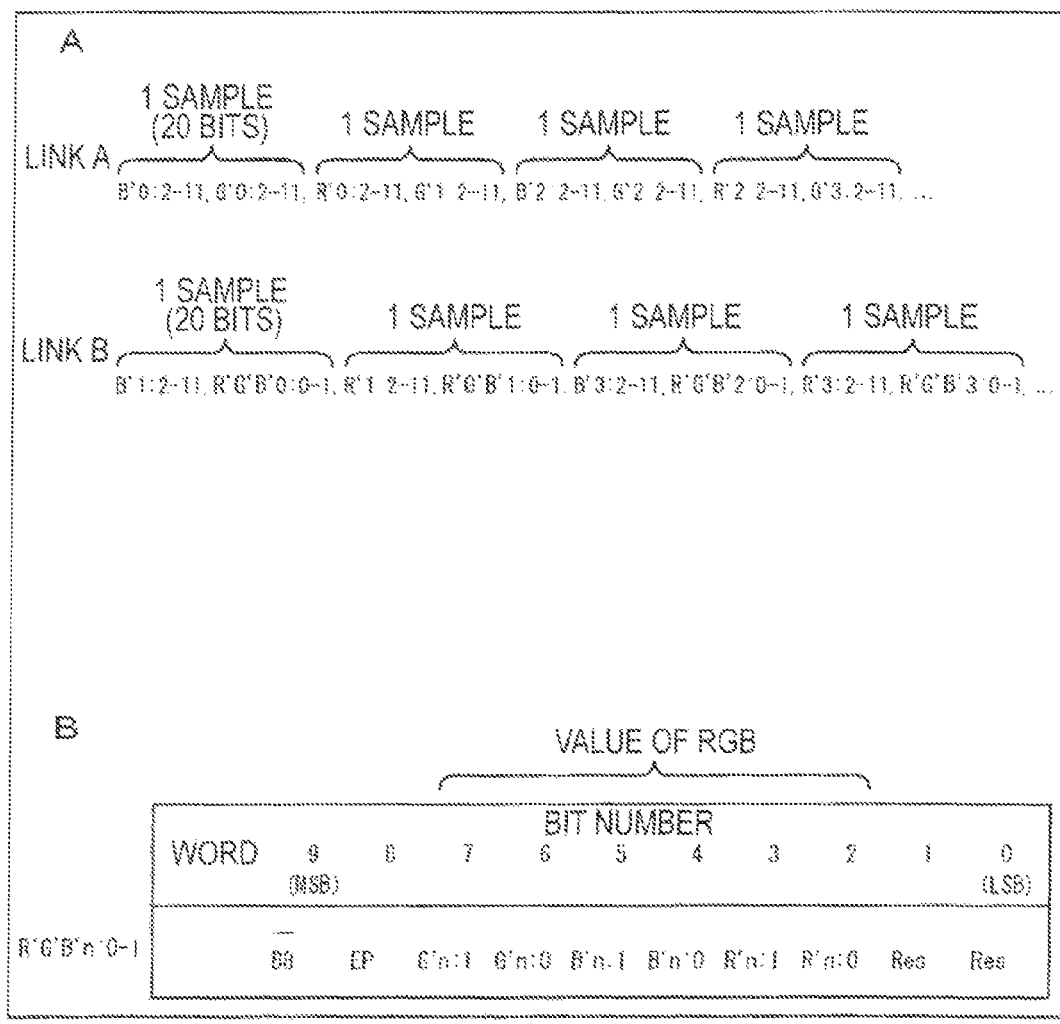
FIG. 13 is an explanatory diagram illustrating exemplary data structures of links A and B according to SMPTE 372.

FIG. 13 illustrates an exemplary data structure of the links A and B according to SMPTE 372. As illustrated in A of FIG. 13, in the link A, one sample is 20 bits, and all bits indicate values of RGB. As illustrated in B of FIG. 13, in the link B, one sample is 20 bits, but only 6 bits of bit numbers 2 to 7 among R'G'B'n:0-1 of 10 bits indicate values of RGB. Thus, the number of bits indicating values of RGB in one sample is 16.

Thus, HD-SDIs of 32 channels are generated from the 1920×1080/50I-60I signals of 16 channels stored in the RAMs 25-1 to 25-16. The HD-SDIs of 32 channels are stored in the RAMs 27-1 to 27-32.

Further, when the signal obtained by the line thinning is the 10-bit signal of 4:2:2, the word thinning control units 26-1 to 26-16 map the 1920×1080/50I-60I signal only to a zinc A without using the link B. Thus, in this case, the HD-SDIs of 16 channels are generated.

Then, the read control units 28-1 to 28-32 read the pixel samples from the RAMs 27-1 to 27-32 according to a reference clock supplied from the clock supply circuit 20. Then, the read control units 28-1 to 28-32 output the HD-SDIs 1 to 32 of 32 channels to a subsequent S/P scrambling 8B/10B unit 12.

Accordingly, the mapping unit 11 generates the HD-SDIs of 32 channels from the UHDTV1 class image (100P-120P). As a result, the UDHTV1 class image (100P-120P) can be transmitted through the HD-SDIs of a total of 32 channels. Further, when the UDHTV1 class image (100P-120P) is the 4:2:2/10-bit signal, the UHDTV1 class image (100P-120P) can be transmitted through the HD-SDIs of 16 channels.

Then, at the stage subsequent to the S/P scrambling 8B/10B unit 12, the HD-SDIs 1 to 32 of 32 channels an multiplexed into a transmission stream of 10.692 Gbps specified in the mode D of 4 channels and transmitted. As this multiplexing scheme, for example, a scheme disclosed in JP 2008-099189A is used.

[Exemplary Configuration of Serial Data of 10.692 Gbps]

Here, an exemplary configuration of one line of serial data of 10.692 Gbps (hereinafter, also referred to as a "10G-SDI") will be described with reference to FIG. 14.

Figure 14:
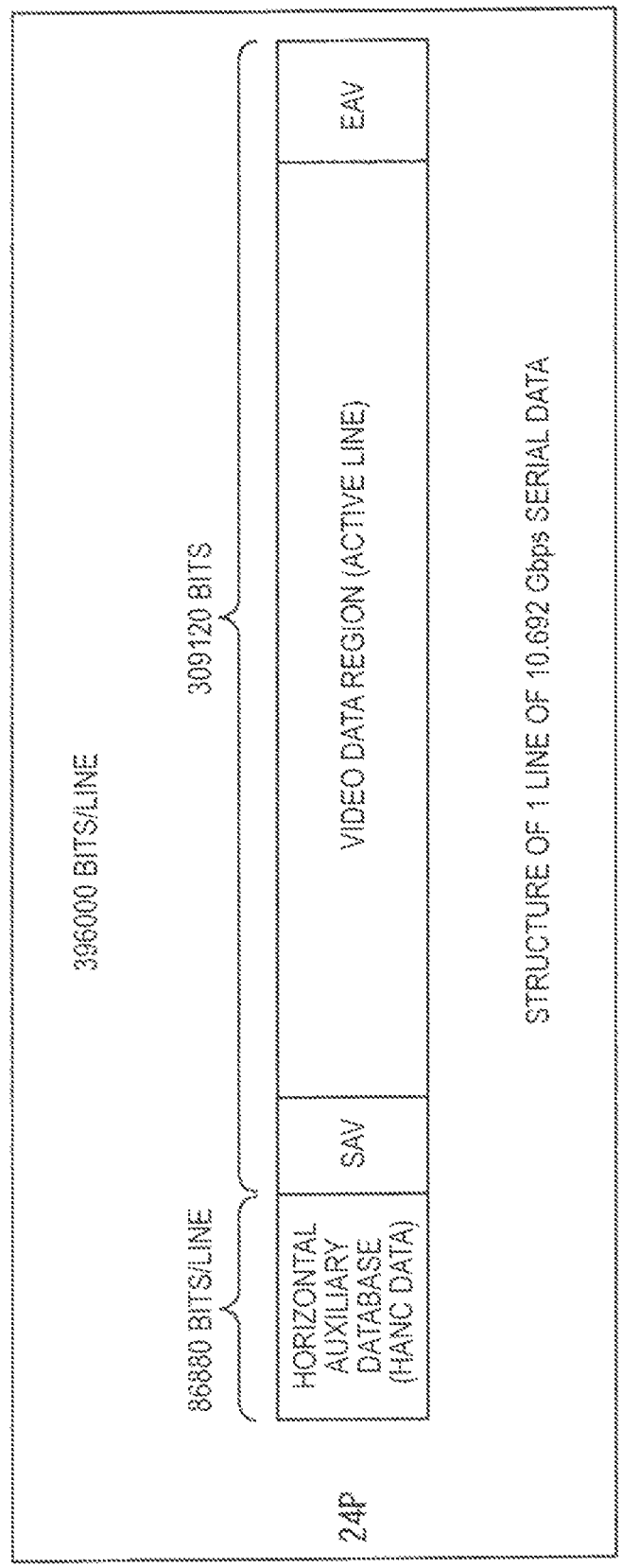
FIG. 14 is an explanatory diagram illustrating an exemplary data structure of one line of 10.692 Gbps serial digital data in the case of 24P.

FIG. 14 illustrates an exemplary data structure of one line of a 10G-SDI when a frame rate is 24P.

In FIG. 14, fields including a line number LN and an error detection code CRC are indicated by an EAV, an active line, and an SAV, and a field including a region of additional data is indicated by a horizontal auxiliary data space. An audio signal is mapped to the horizontal auxiliary data space, and synchronization with an input HD-SDI can be established by configuring the horizontal auxiliary data space by adding supplemental data to the audio signal.

[Description of Mode D]

Next, a method of multiplexing HD-SDIs of a plurality of channels and generating a 10G-SDI, which is specified as the mode D in SMPTE 435-2, will be described with reference to FIG. 15.

Figure 15:
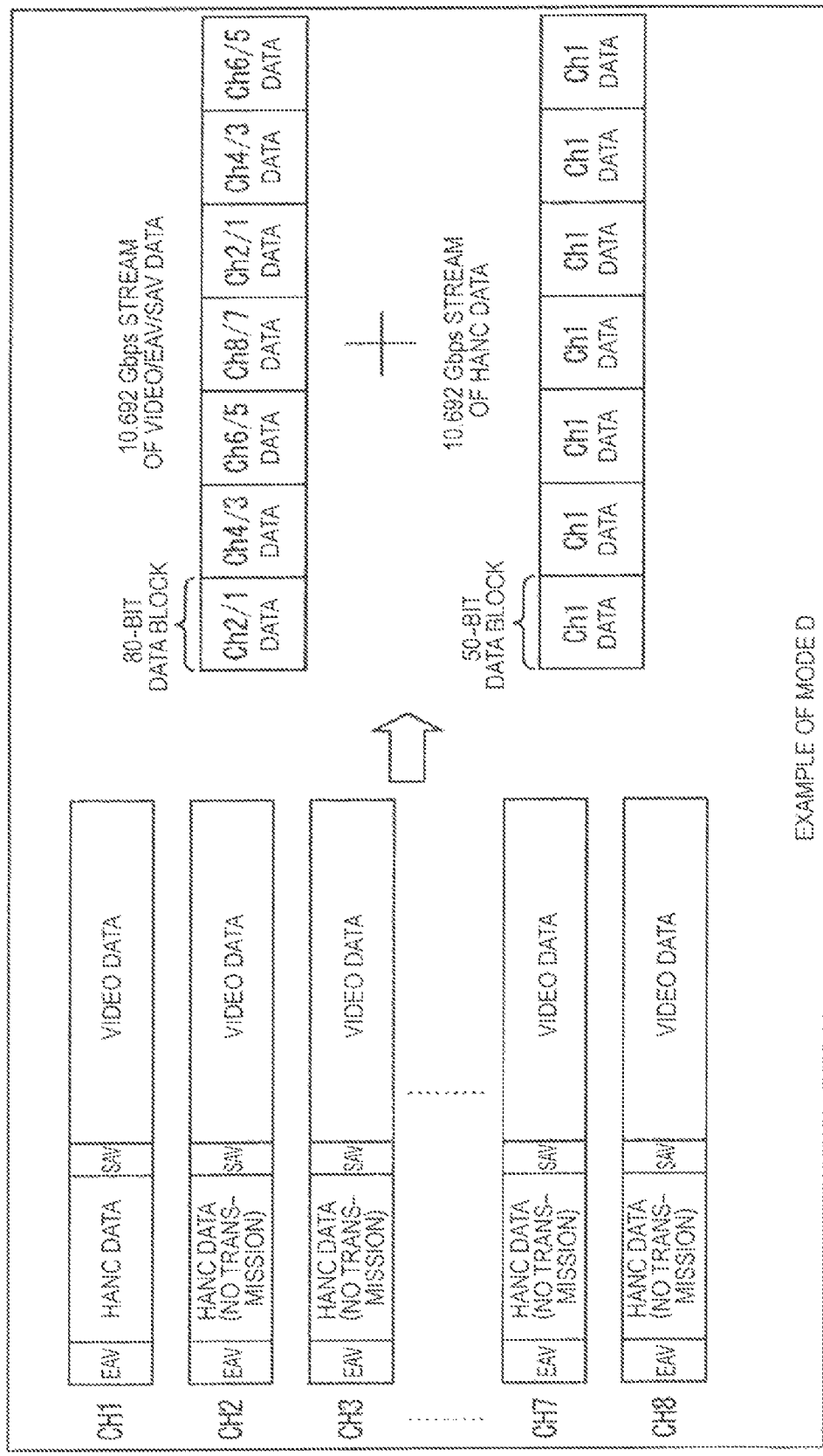
FIG. 15 is an explanatory diagram illustrating an example of a mode D.

FIG. 15 is an explanatory diagram illustrating the mode D.

The mode D is a scheme of multiplexing HD-SDIs of 8 channels (CH1 to CH8), and data is multiplexed into the video data region and the horizontal auxiliary data space of the 10G-SDI. At this time, 40 bits of video/EAV/SAV data of the HD-SDIs of CH1, CH3, CH5, and CR7 is extracted, scrambled, and converted into 40 bits of data. Meanwhile, 32 bits of video/EAV/SAV data of the HD-SDIs of CH2, CH4, CH6, and CH8 is extracted and converted into 40 bits of data by 8B/10B conversion. The respective pieces of data are added, and 80 bits of data is obtained. Encoded data of 8 words (80 bits) is multiplexed into the video data region of the 10G-SDI.

At this time, the 40-bit 8B/10B-converted data block of the even-numbered channels is allocated to a 40-bit data block of the first half among an 80-bit data block. Further, the 40-bit scrambled data block of the odd-numbered channels is allocated to a 40-bit data block of the second half. Thus, the data blocks are multiplexed into one data block, for example, in the order of CH2 and CH1. The order is changed as described above because a content ID identifying a mode to be used is included in the 40-bit 8B/10B-converted data blocks of the even-numbered channels.

Meanwhile, the horizontal auxiliary data space of the HD-SDI of CH1 undergoes 8B/10B conversion, is encoded into a 50-bit data block, and multiplexed into the horizontal auxiliary data space of the 10G-SDI. However, the horizontal auxiliary data spaces of the HD-SDIs of CH2 to CH8 are not transmitted.

[Operation of S/P Scrambling 8B/10B Unit 12 and Subsequent Units]

Next, an operation of the S/P scrambling 8B/10B unit 12 and subsequent units of the broadcasting camera 1 will be described.

The HD-SDIs of CH1 to CH32 mapped by the mapping unit 11 are transferred to the S/P scrambling 8B/10B unit 12 as illustrated in FIG. 6. Then, parallel digital data with a 40-bit width or a 50-bit width that has been scrambled or 8B/10B-converted is written in a FIFO memory (not illustrated) according to a clock of 37.125 MHz received from a PLL 133. Thereafter, the parallel digital data with the 40-bit width or the 50-bit width is read from the FIFO memory without change according to the clock of 83.5312 MHz received from a PLL 133 and transferred to a multiplexing unit 14.

Figure 16:
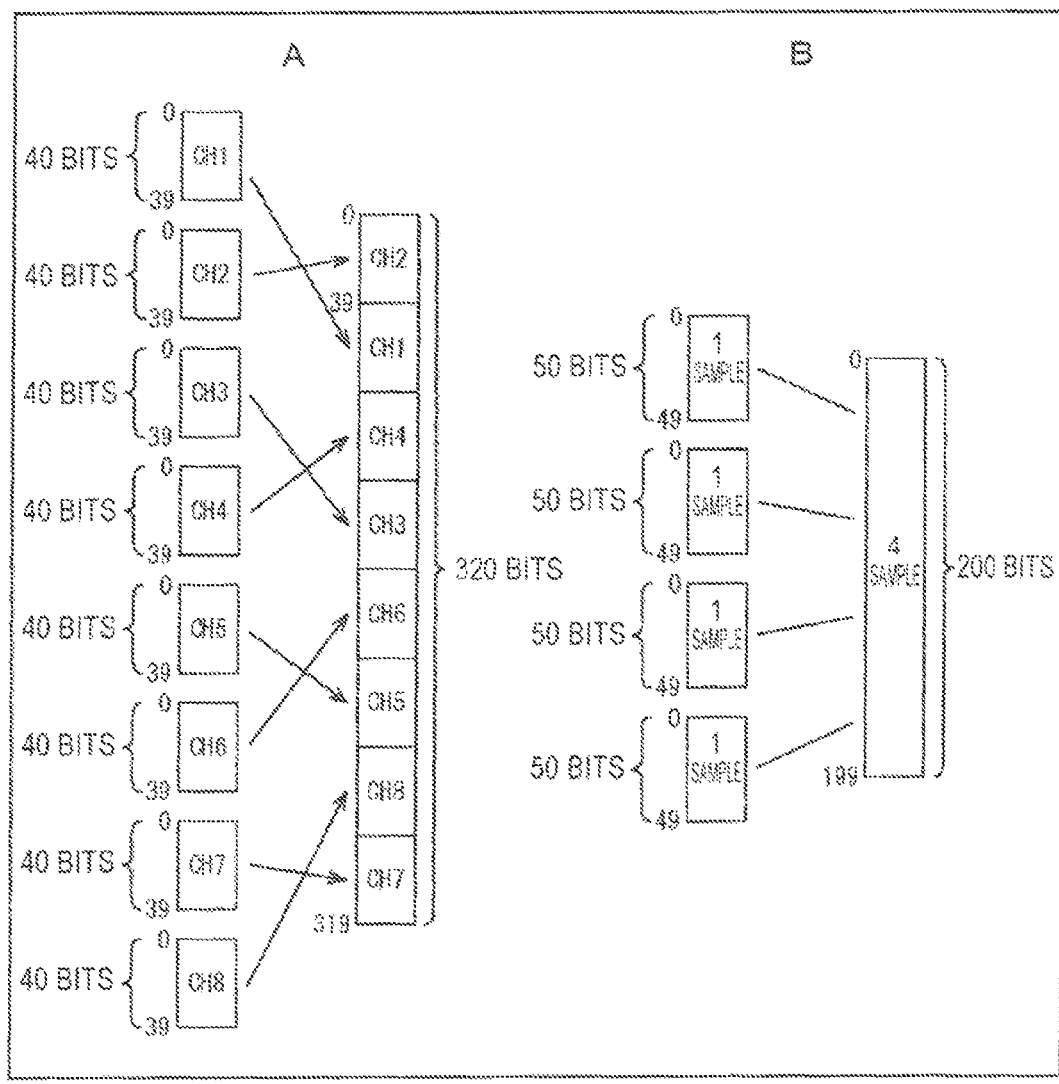
FIG. 16 is an explanatory diagram illustrating an exemplary data multiplexing process performed by a multiplexing unit according to the first embodiment of the present disclosure.

FIG. 16 illustrates an exemplary data multiplexing process performed by the multiplexing unit 14.

A of FIG. 16 illustrates an example in which 40 bits of data of CH1 to CH8 that has been scrambled or 8B/10B-converted is multiplexed into data with a 320-bit width such that orders of pairs of CH1 and CH2, CH3 and CH4, CH5 and CH6, and CH7 and CH8 are changed.

As described above, the 8B/10B-converted data is interposed between pieces of data that have undergone self-synchronizing scrambling at intervals of 40 bits. As a result, it is possible to solve a variation in a mark rate (a rate of 0 and 1) according to a scrambling scheme, instability of transition of 0-1 and 1-0, and prevent the occurrence of a pathological pattern.

B of FIG. 16 illustrates an example in which 4 samples of 50 bits of 8B/10B-converted data with a horizontal blanking interval of CH1 are multiplexed into 4 samples with a 200-bit width.

The parallel digital data with the 320-bit width and the parallel digital data with the 200-bit width multiplexed by the multiplexing unit 14 are transferred to a data length converting unit 15. The data length converting unit 15 is configured using a shift register. Then, the data length converting unit 15 forms parallel digital data with a 256-bit width using data with a 256-bit width obtained by converting the parallel digital data with the 320-bit width and data with a 256-bit width obtained by converting the parallel digital data with the 200-bit width. Further, the data length converting unit 15 converts the parallel digital data with the 256-bit width into data with a 128-bit width.

A multi-channel data forming unit 17 forms parallel digital data with a 64-bit width transferred from the data length converting unit 15 via a FIFO memory 16 as serial digital data of 16 channels, each of which has a bit rate of 668.25 Mbps. The multi-channel data forming unit 17 is, for example, a ten gigabit sixteen bit interface (XSBI: a 16 bit interface used in a 10 Gigabit Ethernet (a registered trademark)). The serial digital data of 16 channels formed by the multi-channel data forming unit 17 is transferred to a multiplexing P/S converting unit 18.

The multiplexing P/S converting unit 18 has a function of a parallel/serial converting unit, multiplexes the serial digital data of 16 channels received from the multi-channel data for unit 17, and performs parallel/serial conversion on the multiplexed parallel digital data. Accordingly, the multiplexing P/S converting unit 18 generates serial digital data (a 10G-SDI) of 10.692 Gbps (=668.25 Mbps×16).

Since a 10G-SDI of one channel is generated from HD-SDIs of 8 channels, 10G-SDIs of 4 channels are generated from the HD-SDIs of 32 channels generated by the mapping unit 11. In other words, the 10G-SDIs of 4 channels are generated for the first to eighth sub images.

The 10G-SDIs of 4 channels generated by the multiplexing P/S converting unit 18 are transferred to a photoelectric conversion unit 19. The photoelectric conversion unit 19 functions as an output control unit that performs control such that the serial digital data having the bit rate of 10.692 Gbps is output to the CCU 2. Further, the photoelectric conversion unit 19 converts the 10G-SDIs of 4 channels generated by the multiplexing unit 14 into optical signals. At this time, the photoelectric conversion unit 19 multiplexes the optical signals obtained by converting the 10G-SDIs of 4 channels, for example, through a DWDM/CWDM wavelength multiplexing transmission technique and then transmits the resulting signal to the CCU 2 via the optical fiber cable 3.

[DWDM/CWDM Wavelength Multiplexing Transmission Technique]

Here, the DWDM/CWDM wavelength multiplexing transmission technique will be described.

A method of multiplexing light of a plurality of wavelengths and transmitting the multiplexed result via a single optical fiber is referred to as wavelength division multiplexing (WDM). WDM is classified into the following three schemes according to a wavelength interval.

(1) 2-Wavelength Multiplexing Scheme

A 2-wavelength multiplexing scheme is a scheme of performing 2-wavelength or 3-wavelength multiplexing on signals having different wavelengths such as 1.3 μm and 1.55 μm and transmitting the multiplexed result via a single optical fiber.

(2) Dense Wavelength Division Multiplexing (DWDM) Scheme

DWDM is a method of multiplexing light with a high density at a light frequency of 25 GHz, 50 GHz, 100 GHz, 200 GHz . . . , particularly, in a band of 1.55 μm, and transmitting the multiplexed result. The interval is an interval of a wavelength of about 0.2 nm, 0.4 nm, or 0.8 nm. A center wavelength and the like have been standardized by the International Telecommunication Union Telecommunication standardization sector (ITU-T). Since the wavelength interval of the DWDM is as narrow as 100 GHz, tens to hundreds of multiplexings can be performed, and ultra high capacity communication can be performed. However, since an oscillation wavelength width has to be sufficiently narrower than the wavelength interval of 100 GHz, and it is necessary to control the temperature of a semiconductor laser so that the center wavelength conforms to the ITU-T standard, a device is expensive, and power consumption of a system is high.

(3) Coarse Wavelength Division Multiplexing (CWDM) Scheme

CWDM is a wavelength multiplexing technique in which a wavelength interval is 10 nm to 20 nm which is greater than in DWDM by one or more digits. Since the wavelength interval is relatively large, an oscillation wavelength width of a semiconductor laser need not be as narrow as that in DWDM, and it is unnecessary to control the temperature of the semiconductor laser. Thus, it is possible to reduce a price and power consumption of a system. This technique is effectively applicable to a system whose capacity is not as large as that in DWDM. As exemplary center frequencies, currently, in the case of a 4-channel configuration, for example, 1.511 μm, 1.531 μm, 1.551 μm, and 1.571 μm are commonly applied, and in the case of an 8-channel configuration, for example, 1.471 μm, 1.491 μm, 1.511 μm, 1.531 μm, 1.551 μm, 1.571 μm, 1.591 μm, and 1.611 μm are applied.

As described above, using the broadcasting camera 1 of the present example, the UHDTV1 class image (100P-120P) input from the image sensor can be transmitted as the serial digital data. In other words, the UHDTV1 class image (100P-120P) is converted into the HD-SDIs of CH1 to CH32, and the HD-SDIs of CH1 to CH32 are further converted into the 10G-SDIs of 4 channels and output.

The HD-SDIs of 32 channels may be output from the broadcasting camera 1 without change. Further, serial digital data (hereinafter referred to as a "3G-SDI") of 3 Gbps of 16 channels may be generated from the HD-SDIs of 32 channels, for example, according to a standard such as SMPTE 425, and output.

Further, when the UHDTV1 class image (100P-120P) is the 4:2:2/10-bit signal, the HD-SDIs of 16 channels are generated from the UHDTV1 class image (100P-120P). Thus, in this case, the UHDTV1 class image (100P-120P) can be transmitted through the HD-SDIs of 16 channels, the 3G-SDIs of 8 channels, or the 10G-SDIs of 4 channels.

The UHDTV1 class image (100P-120P) is not just transmitted from each of the broadcasting cameras 1 to the CCU 2. In other words, the return videos (the video signals for displaying videos being captured by the other broadcasting cameras 1) are transmitted from the CCU 2 to the broadcasting cameras 1 via the optical fiber cables 3. Since the return video is generated using a known technique (for example, by performing 8-bit/10-bit encoding on each of HD-SDI signals of 2 channels, then multiplexing, and performing conversion into serial digital data), a description of a circuit configuration for that is omitted.

[Internal Configuration and Exemplary Operation of CCU]

Next, an exemplary internal configuration of the CCU 2 will be described.

Figure 17:
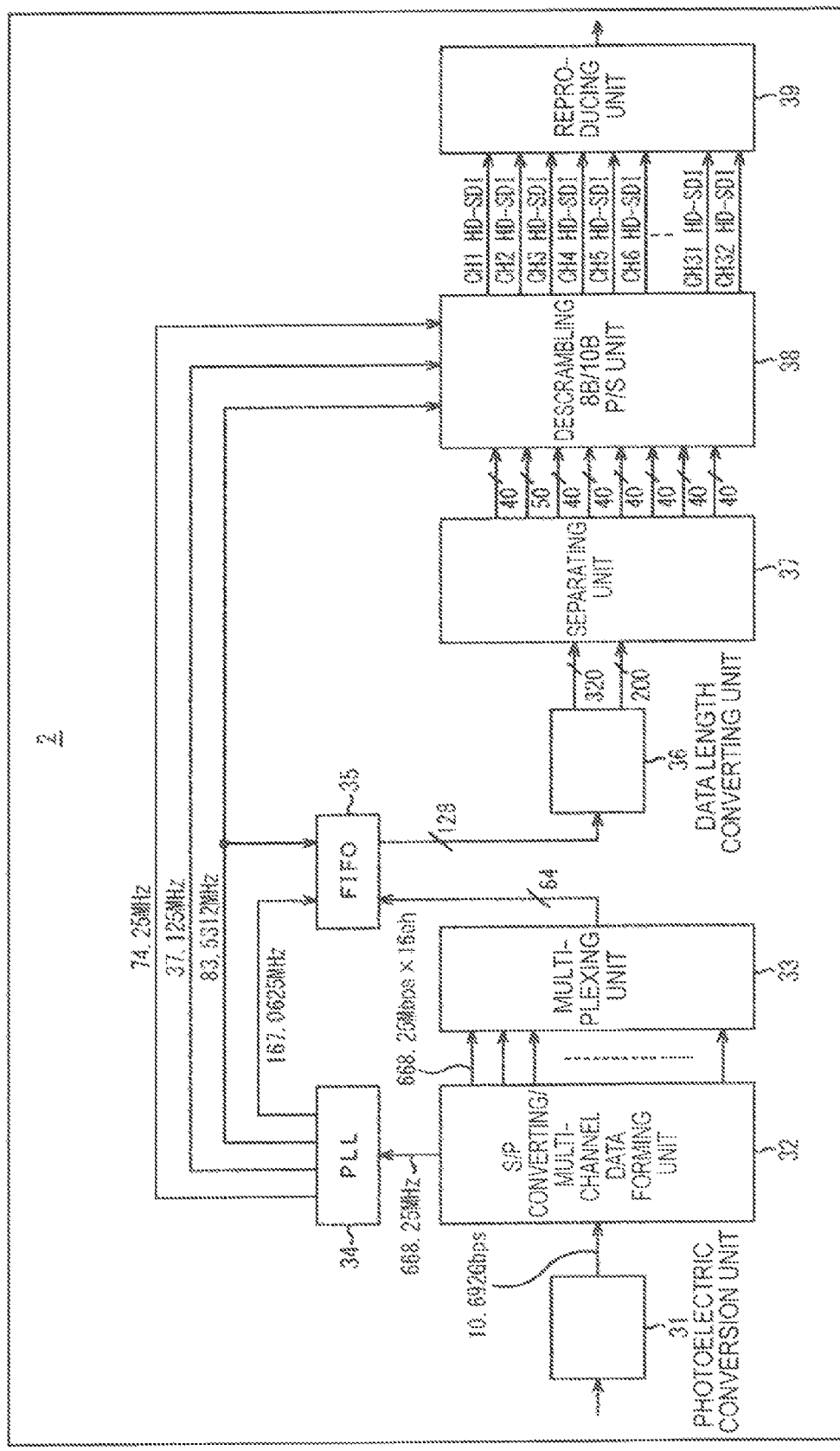
FIG. 17 is a block diagram illustrating an exemplary internal configuration of a signal receiving device in a circuit configuration of a CCU according to the first embodiment of the present disclosure.

FIG. 17 is a block diagram illustrating a portion related to the present embodiment in a circuit configuration of the CCU 2. The CCU 2 includes a plurality of sets of circuits that correspond to the broadcasting cameras 1 in a one-to-one manner.

The 10G-SDIs of 4 channels transmitted from the broadcasting camera 1 via the optical fiber cable 3 are converted into an electric signal through a photoelectric conversion unit 31 and then transferred to an S/P converting/multi-channel data forming unit 32. The S/P converting/multi-channel data forming unit 32 is, for example, an XSBI.

Then, the S/P converting/multi-channel data forming unit 32 receives the 10G-SDIs of 4 channels.

The S/P converting/multi-channel data forming unit 32 performs serial/parallel conversion on the received 10G-SDIs of 4 channels. Then, the S/P converting/multi-channel data forming unit 32 forms serial digital data of 16 channels having a bit rate of 668.25 Mbps from all parallel digital data that has undergone the serial/parallel conversion, and extracts a clock of 668.25 MHz.

The serial digital data of 16 channels formed by the S/P converting/multi-channel data forming unit 32 is transferred to a multiplexing unit 33. Further, the clock of 668.25 MHz extracted by the S/P converting/multi-channel data forming unit 32 is transferred to a PLL 34.

The multiplexing unit 33 multiplexes the serial digital data of 16 channels received from the S/P converting/multi-channel data forming unit 32, and transfers parallel digital data with a 64-bit width to a FIFO memory 35.

The PLL 34 transfers a clock of 167.0625 MHz obtained by dividing the clock of 668.25 MHz received from the S/P converting/multi-channel data forming unit 32 by 4 to the FIFO memory 35 as a write clock.

The PLL 34 transfers a clock of 83.5312 MHz obtained by dividing the clock of 668.25 MHz received from the S/P converting/multi-channel data forming unit 32 by 8 to the FIFO memory 35 as a read clock. The PLL 34 transfers the clock of 83.5312 MHz to a FIFO memory in a descrambling 8B/10B P/S unit 38 which will be described later as the write clock.

The PLL 34 transfers a clock of 37.125 MHz obtained by dividing the clock of 668.25 MHz received from the S/P converting/multi-channel data forming unit 32 by 18 to the FIFO memory in the descrambling 8B/10B P/S unit 38 as the read clock. The PLL 34 transfers the clock of 37.125 MHz to the FIFO memory in the descrambling 8B/10B P/S unit 38 as the write clock.

The PLL 34 transfers a clock of 74.25 MHz obtained by dividing the clock of 668.25 MHz received from the S/P converting/multi-channel data forcing unit 32 by 9 to the FIFO memory in the descrambling 8B/10B P/S unit 38 as the read clock.

The parallel digital data with the 64-bit width received from the multiplexing unit 33 is written in the FIFO memory 35 according to the clock of 167.0625 MHz received from the PLL 34. The parallel digital data written in the FIFO memory 35 is read as parallel digital data with a 128-bit width according to the clock of 83.5312 MHz received from the PLL 34 and then transferred to a data length converting unit 36.

The data length converting unit 36 is configured using a shift register, and converts the parallel digital data with the 128-bit width into data with a 256-bit width. Then, the data length converting unit 36 detects K28.5 inserted into a timing reference signal SAV or EAV. Through this operation, the data length converting unit 36 determines each line period, and data of the timing reference signal SAV, the active line, the timing reference signal EAV, the line number LN, and the error detection code CRC into data with a 320-bit width. Further, the data length converting unit 36 converts data (8B/10B-converted data of the horizontal auxiliary data space of CH1) of the horizontal auxiliary data space into data with a 200-bit width. The parallel digital data with the 320-bit width and the parallel digital data with the 200-bit width whose data length has been converted by the data length converting unit 36 are transferred to a separating unit 37.

The separating unit 37 separates the parallel digital data with the 320-bit width received from the data length converting unit 36 into 40-bit data of CH1 to CH8 which do not undergo multiplexing performed by the multiplexing unit 14 in the broadcasting camera 1. The parallel digital data includes data of the timing reference signal SAV, the active line, the timing reference signal EAV, the line number LN, and the error detection code CRC. Then, the separating unit 37 transfers the parallel digital data with the 40-bit width of CH1 to CH8 to the descrambling 8B/10B P/S unit 38.

Since the parallel digital data with the 40-bit width of CH1 to CH8 is generated for each of the 10G-SDIs of 4 channels, parallel digital data of a total of 32 channels is transferred to the descrambling 8B/10B P/S unit 38.

Further, the separating unit 37 separates the parallel digital data with the 200-bit width received from the data length converting unit 36 into 50-bit data that does not undergo multiplexing performed by the multiplexing unit 14. The parallel digital data includes data of the horizontal auxiliary data space of CH1 that has undergone 8B/10B encoding. Then, the separating unit 37 transfers the parallel digital data with the 50-bit width to the descrambling 8B/10B P/S unit 38.

Since the parallel digital data with the 50-bit width of CH1 is generated for each of the 10G-SDIs of 4 channels, parallel digital data of a total of 4 channels is transferred to the descrambling 8B/10B P/S unit 38.

The descrambling 8B/10B P/S unit 38 is configured with 32 blocks that correspond to CH1 to CH32 in a one-to-one manner. In other words, the descrambling 8B/10B P/S unit 38 includes blocks for CH1, CR3, CH5, . . . , and CH31 serving as the link A, descrambles the input parallel digital data, performs conversion into serial digital data, and outputs the serial digital data. The descrambling 8B/10B P/S unit 38 includes blocks for CH2, CH4, CR6, CH8, . . . , and CH32 serving as the link B, and decodes the input parallel digital data by 8B/10B. Then, the descrambling 8B/10B P/S unit 38 performs conversion into the serial digital data, and outputs the serial digital data.

A reproducing unit 39 performs a process reverse to the process of the mapping unit 11 in the broadcasting camera 1 on the HD-SDIs of CH1 to CH32 (the link A and the link B) transferred from the descrambling 8B/10B P/S unit 38 according to the ride of SMPTE 435. Through this process, the reproducing unit 39 reproduces an HDTV1 class image (100P-120P).

At this time, the reproducing unit 39 reproduces the first to eighth sub images from the HD-SDIs 1 to 32 received by the S/P converting/multi-channel data forming unit 32 by sequentially performing processes of word multiplexing and line multiplexing. Then, the reproducing unit 39 extracts the pixel samples from the first to eighth sub images 2 pixels at a time, and sequentially multiplexes the extracted pixel samples in the first and second frames of the UHDTV1 class image (100P-120P).

The HDTV1 class image (100P-120P) reproduced by the reproducing unit 39 is output from the CCU 2 and transferred, for example, to a VTR (not illustrated) or the like.

In the present example, the CCU 2 performs signal processing of a side of receiving the serial digital data generated by the broadcasting camera 1. In the signal receiving device and the signal reception method, the parallel digital data is generated from the 10G-SDI, and the parallel digital data is separated into data of the respective channels of the link A and the link R.

Self-synchronizing descrambling is performed on the separated data of the link A, but all register values in a descrambler right before the timing reference signal SAV are set to 0, and so decoding starts. Further, the self-synchronizing descrambling is performed even on data of at least several bits subsequent to the error detection code CRC. Thus, only data of the timing reference signal SAV, the active line, the timing reference signal EAV, the line number LN, and the error detection code CRC undergoes the self-synchronizing descrambling. Thus, although the self-synchronizing scrambling is not performed on data of the horizontal auxiliary data space, it is possible to reduce original data by performing an accurate calculation in view of an increase in digits of a descrambler serving as a multiplying circuit.

Meanwhile, for the separated data of the link B, data of the respective samples of the link B are formed from RGB bits obtained by 8-bit/10-bit decoding. Then, the parallel digital data of the link A that has undergone the self-synchronizing descrambling and the parallel digital data of the link B that has formed the respective samples undergo parallel/serial conversion. Then, the mapped HD-SDI signals of CH1 to CH32 are reproduced.

Figure 18:
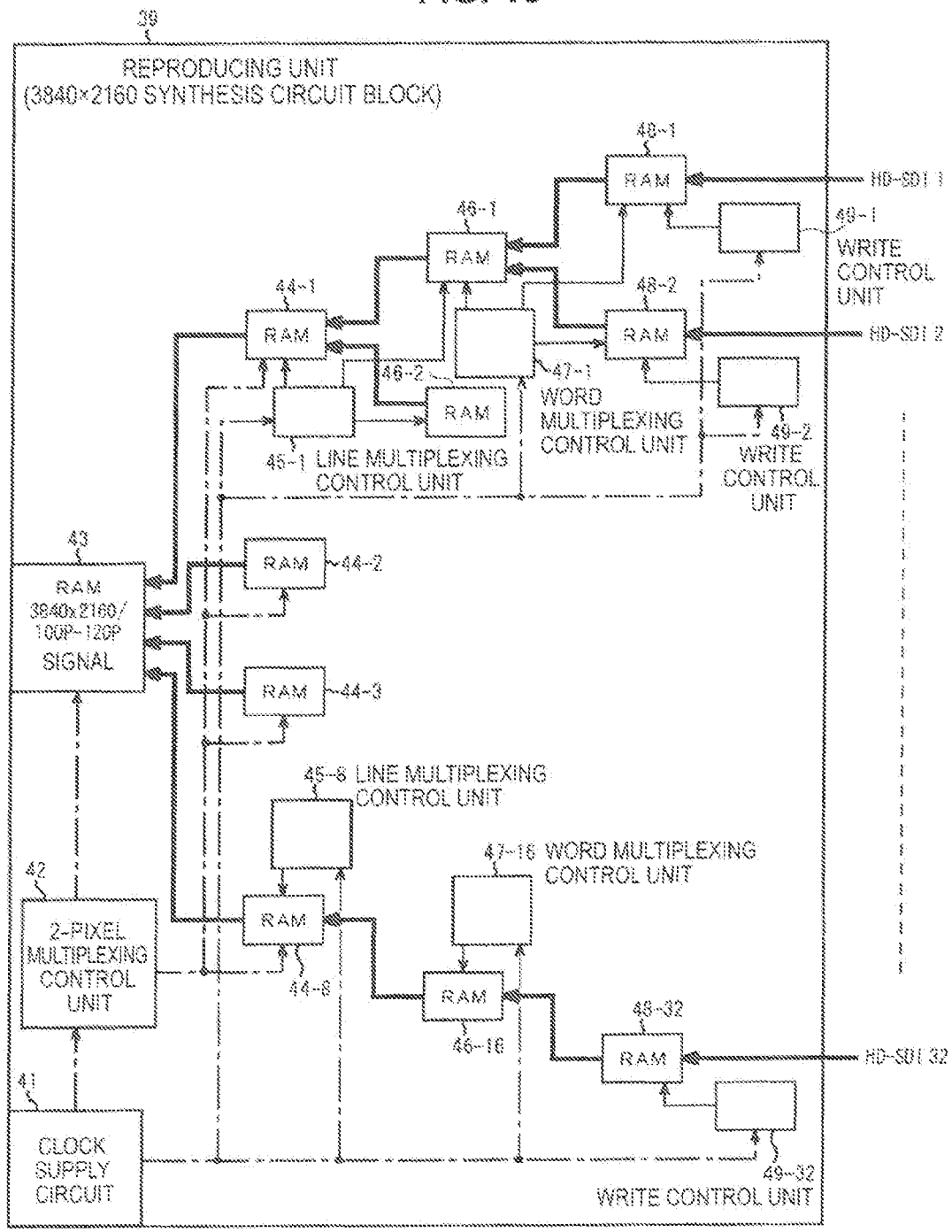
FIG. 18 is a block diagram illustrating an exemplary internal configuration of a reproducing unit according to the first embodiment of the present disclosure.

FIG. 18 illustrates an exemplary internal configuration of the reproducing unit 39.

The reproducing unit 39 is a block that performs inverse conversion of the process that the mapping unit 11 has performed on the pixel samples.

The reproducing unit 39 includes a clock supply circuit 41 that supplies clocks to respective units. The clock supply circuit 41 supplies clocks to a 2-pixel multiplexing control unit 42, line multiplexing control units 45-1 to 45-8, word multiplexing control units 47-1 to 47-16, and write control units 49-1 to 49-32. As the respective units are synchronized with the clocks, reading or writing of the pixel sample is controlled.

The reproducing unit 39 includes RAMs 48-1 to 48-32 that store the HD-SDIs 1 to 32 of 32 channels. As described above, each of the HD-SDIs 1 to 32 configures the 1920× 1080/50I-60I signal. As the HD-SDIs 1 to 32, CH1, CH3, CH5, CH7, . . . , and CH31 serving as the link A and CH2, CH4, CH6, CH8, . . . , and CH32 serving as the link B which are input from the descrambling 8B/10B P/S unit 38 are used.

The write control its 49-1 to 49-32 perform write control according to the clock supplied from the clock supply circuit 41 such that the input HD-SDIs 1 to 32 of 32 channels are stored in the RAMs 48-1 to 48-32.

The reproducing unit 39 further includes the word multiplexing control units 47-1 to 47-16 that control word multiplexing (deinterleaving) and RAMs 46-1 to 46-16 that write data multiplexed by the word multiplexing control units 47-1 to 47-16. The reproducing unit 39 further includes the line multiplexing control its 45-1 to 45-8 that control line multiplexing and RAMs 44-1 to 44-8 that write data multiplexed by the line multiplexing control units 45-1 to 45-8.

The word multiplexing control units 47-1 to 47-16 read the HD-SDIs of 32 channels from the RAMs 48-1 to 48-32. Then, the word multiplexing control its 47-1 to 47-16 perform a word multiplexing process serving as inverse conversion of the word thinning of the word thinning control units 26-1 to 26-16 of the mapping unit 11 on the read pixel samples of the HD-SDIs of 32 channels. The word multiplexing process is performed according to FIGS. 3, 5, 7, 8, and 9 of SMPTE 372. As a result, the 1920×1080/50I-60I/ 4:4:4, 4:2:2, or 4:2:0/10-bit or 12-bit signals of 16 channels are generated from the HD-SDIs of 32 channels. The word multiplexing control units 47-1 to 47-16 cause the 1920×

1080/50I-60I/4:4:4, 4:2:2, or 4:2:0/10-bit or 12-bit signal of 16 channels to be stored in the RAMs 46-1 to 46-16.

The line multiplexing control units 45-1 to 45-8 read the 1920×1080/50I-60I/4:4:4, 4:2:2, or 4:2:0/10-bit or 12-bit signals of 16 channels from the RAMs 46-1 to 46-16. Then, the line multiplexing control units 45-1 to 45-8 perform a line multiplexing process serving as inverse conversion of the line thinning of the line thinning control units 24-1 to 24-8 of the mapping unit 11 on the read signals. As a result, the first to eighth sub images are generated from the 1920×1080/50I-60I/4:4:4, 4:2:2, or 4:2:0/10-bit or 12-bit signals of 16 channels. Then, the line multiplexing control units 45-1 to 45-8 cause the first to eighth sub images to be stored in the RAMs 44-1 to 44-8.

The 2-pixel multiplexing control unit 42 reads the first to eighth sub images from the RAMs 44-1 to 44-8. Then, the 2-pixel multiplexing control unit 42 performs a 2-pixel multiplexing control process sewing as inverse conversion of the 2-pixel thinning of the 2-pixel thinning control unit 21 of the mapping unit 11 on the read first to eighth sub images, and reproduces the UHDTV1 class image (100P-120P) of 2 frames.

Specifically, the 2-pixel multiplexing control unit 42 extracts pixel samples of a 2i-th sample and a (2i+1)-th sample (i=0 to 959) of a (g+22)-th line (g=0 to 539) of a (2h+j+1)-th (h=0 to 3, j=0 to 1) sub image, and multiplexes the extracted pixel samples into a (4i+2j)-th sample and a (4i+2j+1)-th sample of a (4g+h)-th line of the first class image.

For example, a 0th sample, a 1st sample, a 2nd sample, a 3rd sample, a 4th sample, . . . , a 1918th sample, and a 1919th sample of a 22nd line of the first sub image are multiplexed into a 0th sample, a 1st sample, a 4th sample, a 5th sample, . . . , a 3836th sample, and a 3837th sample of a 0th line of the first class image. A 0th sample, a 1st sample, a 2nd sample, a 3rd sample, a 4th sample, . . . , a 1918th sample, and a 1919th sample of a 23rd line of the first sub image are multiplexed into a 0th sample, a 1st sample, a 4th sample, a 5th sample, . . . , a 3836th sample, and a 3837th sample of a 4th line of the first class image. Subsequently, a 0th sample, a 1st sample, a 2nd sample, a 3rd sample, a 4th sample, . . . , a 1918th sample, and a 1919th sample of a 561st line of the first sub image are similarly multiplexed into a 0th sample, a 1st sample, a 4th sample, a 5th sample, . . . , a 3836th sample, and a 3837th sample of a 2156th line of the first class image.

A 0th sample, a 1st sample, a 2nd sample, a 3rd sample, a 4th sample, . . . , a 1918th sample, and a 1919th sample of a 22nd line of the second sub image are multiplexed into a 2nd sample, a 3rd sample, a 6th sample, a 7th sample, . . . , a 3838th sample, and a 3839th sample of a 0th line of the first class image. A 0th sample, a 1st sample, a 2nd sample, a 3rd sample, a 4th sample, . . . , a 1918th sample, and a 1919th sample of a 23rd line of the second sub image are multiplexed into a 2nd sample, a 3rd sample, a 6th sample, a 7th sample, . . . , a 3838th sample, and a 3839th sample of a 4th line of the first class image. Subsequently, a 0th sample, a 1st sample, a 2nd sample, a 3rd sample, a 4th sample, . . . , a 1918th sample, and a 1919th sample of a 561st line of the second sub image are similarly multiplexed into a 2nd sample, a 3rd sample, a 6th sample, a 7th sample, . . . , a 3836th sample, and a 3837th sample of a 2156th line of the first class image.

A 0th sample, a 1st sample, a 2nd sample, a 3rd sample, a 4th sample, . . . , a 1918th sample, and a 1919th sample of a 22nd line of the third sub image are multiplexed into a 0th sample, a 1st sample, a 4th sample, a 5th sample, . . . , a 3836th sample, and a 3837th sample of a 1st line of the first class image. A 0th sample, a 1st sample, a 2nd sample, a 3rd sample, a 4th sample, . . . , a 1918th sample, and a 1919th sample of a 23rd line of the third sub image are multiplexed into a 0th sample, a 1st sample, a 4th sample, a 5th sample, . . . , a 3836th sample, and a 3837th sample of a 5th line of the first class image. Subsequently, a 0th sample, a 1st sample, a 2nd sample, a 3rd sample, a 4th sample, . . . , a 1918th sample, and a 1919th sample of a 561st line of the third sub image are similarly multiplexed into a 0th sample, a 1st sample, a 4th sample, a 5th sample, . . . , a 3836th sample, and a 3837th sample of a 2157th line of the first class image.

A 0th sample, a 1st sample, a 2nd sample, a 3rd sample, a 4th sample, . . . , a 1918th sample, and a 1919th sample of a 22nd line of the fourth sub image are multiplexed into a 2nd sample, a 3rd sample, a 6th sample, a 7th sample, . . . , a 3838th sample, and a 3839th sample of a 1st line of the first class image. A 0th sample, a 1st sample, a 2nd sample, a 3rd sample, a 4th sample, . . . , a 1918th sample, and a 1919th sample of a 23rd line of the fourth sub image are multiplexed into a 2nd sample, a 3rd sample, a 6th sample, a 7th sample, . . . , a 3838th sample, and a 3839th sample of a 5th line of the first class image. Subsequently, a 0th sample, a 1st sample, a 2nd sample, a 3rd sample, a 4th sample, . . . , a 1918th sample, and a 1919th sample of a 561st line of the fourth sub image are similarly multiplexed into a 2nd sample, a 3rd sample, a 6th sample, a 7th sample, . . . , a 3836th sample, and a 3837th sample of a 2157th line of the first class image.

For example, a 0th sample, a 1st sample, a 2nd sample, a 3rd sample, a 4th sample, . . . , a 1918th sample, and a 1919th sample of a 22nd line of the fifth sub image are multiplexed into a 0th sample, a 1st sample, a 4th sample, a 5th sample, . . . , a 3836th sample, and a 3837th sample of a 2nd line of the first class image. A 0th sample, a 1st sample, a 2nd sample, a 3rd sample, a 4th sample, . . . , a 1918th sample, and a 1919th sample of a 23rd line of the fifth sub image are multiplexed into a 0th sample, a 1st sample, a 4th sample, a 5th sample, . . . , a 3836th sample, and a 3837th sample of a 6th line of the first class image. Subsequently, a 0th sample, a 1st sample, a 2nd sample, a 3rd sample, a 4th sample, . . . , a 1918th sample, and a 1919th sample of a 561st line of the fifth sub image are similarly multiplexed into a 0th sample, a 1st sample, a 4th sample, a 5th sample, . . . , a 3836th sample, and a 3837th sample of a 2158th line of the first class image.

A 0th sample, a 1st sample, a 2nd sample, a 3rd sample, a 4th sample, . . . , a 1918th sample, and a 1919th sample of a 22nd line of the sixth sub image are multiplexed into a 2nd sample, a 3rd sample, a 6th sample, a 7th sample, . . . , a 3838th sample, and a 3839th sample of a 2nd line of the first class image. A 0th sample, a 1st sample, a 2nd sample, a 3rd sample, a 4th sample, . . . , a 1918th sample, and a 1919th sample of a 23rd line of the sixth sub image are multiplexed into a 2nd sample, a 3rd sample, a 6th sample, a 7th sample, . . . , a 3838th sample, and a 3839th sample of a 6th line of the first class image. Subsequently, a 0th sample, a 1st sample, a 2nd sample, a 3rd sample, a 4th sample, . . . , a 1918th sample, and a 1919th sample of a 561st line of the sixth sub image are similarly multiplexed into a 2nd sample, a 3rd sample, a 6th sample, a 7th sample, . . . , a 3836th sample, and a 3837th sample of a 2158th line of the first class image.

For example, a 0th sample, a 1st sample, a 2nd sample, a 3rd sample, a 4th sample, . . . , a 1918th sample, and a 1919th sample of a 22nd line of the seventh sub image are multiplexed into a 0th sample, a 1st sample, a 4th sample, a 5th sample, . . . , a 3836th sample, and a 3837th sample of a 3rd line of the first class image. A 0th sample, a 1st sample, a 2nd sample, a 3rd sample, a 4th sample, . . . , a 1918th sample, and a 1919th sample of a 23rd line of the seventh sub image are multiplexed into a 0th sample, a 1st sample, a 4th sample, a 5th sample, . . . , a 3836th sample, and a 3837th sample of a 7th line of the first class image. Subsequently, a 0th sample, a 1st sample, a 2nd sample, a 3rd sample, a 4th sample, . . . , a 1918th sample, and a 1919th sample of a 561st line of the seventh sub image are similarly multiplexed into a 0th sample, a 1st sample, a 4th sample, a 5th sample, . . . , a 3836th sample, and a 3837th sample of a 2159th line of the first class image.

A 0th sample, a 1st sample, a 2nd sample, a 3rd sample, a 4th sample, . . . , 1918th sample, and a 1919th sample of a 22nd line of the eighth sub image are multiplexed into a 2nd sample, a 3rd sample, a 6th sample, a 7th sample, . . . , a 3838th sample, and a 3839th sample of a 3rd line of the first class image. A 0th sample, a 1st sample, a 2nd sample, a 3rd sample, a 4th sample, . . . , a 1918th sample, and a 1919th sample of a 23rd line of the eighth sub image are multiplexed into a 2nd sample, a 3rd sample, a 6th sample, a 7th sample, . . . , a 3838th sample, and a 3839th sample of a 7th line of the first class image. Subsequently, a 0th sample, a 1st sample, a 2nd sample, a 3rd sample, a 4th sample, . . . , 1918th sample, and a 1919th sample of a 561st line of the eighth sub image are similarly multiplexed into a 2nd sample, a 3rd sample, a 6th sample, a 7th sample, . . . , a 3836th sample, and a 3837th sample of a 2159th line of the first class image.

Further, pixel samples of a 2i-th sample and a (2i+1)-th sample (i=0 to 959) of a (g+584)-th line (g=0 to 539) of a (2h+j+1)-th (h=0 to 3, j=0 to 1) sub image are multiplexed into a (4i+2j)-th sample and a (4i+2j+1)-th sample of a (4g+h)-th line of the second class image. Through this operation, similarly to the first class image, the second class image is reproduced.

Then, the reproduced first and second class images (that is, the UHDTV1 class image (100P-120P) of 2 frames) are stored in a RAM 43.

In FIG. 18, the example of performing the three-step multiplexing process of the 2-pixel multiplexing, the line multiplexing, and the word multiplexing using three types of memories (the RAMs 44-1 to 44-8, the RAMs 46-1 to 46-16, and the RAM 46-1 to 46-32) is illustrated, but two or more of the three types of memories may be used in common.

As described above, according to the first embodiment, it is possible to suppress a capacity of a memory and a transmission delay necessary for the thinning process until the HD-SDIs of 32 channels are generated from the UHDTV1 class image (100P-120P). Further, it is possible to transmit and receive the UHDTV1 class image (100P-120P) using the SDI format of the related art. Moreover, when the UHDTV1 class image (100P-120P) is serially transmitted, video switching can be performed in the same frame units as in the original UHDTV1 class image (100P-120P).

3. Second Embodiment

Example of Transmitting UHDTV2
7680×4320/100P, 119.88, 120P/4:4:4, 4:2:2, or
4:2:0/10-Bit or 12-Bit Signal Next, a second embodiment of the present disclosure will be described with reference to FIGS. 19 to 21.

In the second embodiment, transmission of a 7680×4320/100P-120P/4:4:4, 4:2:2, or 4:2:0/10-bit or 12-bit signal is performed. In other words, transmission of a video signal in which m×n is 7680×4320, a-b is 100P-120P, and r:g:b is 4:4:4, 4:2:2, or 4:2:0 is performed. A frame rate of this signal is twice that of the 7680×4320/50P-60P/4:4:4, 4:2:2, or 4:2:0/10-bit or 12-bit signal of UHDTV2 specified in SMPTE 2036-1.

Compared with a video signal of UHDTV2 specified in SMPTE 2036-1, this signal differs in a color gamut (colorimetry) but is the same in a digital signal format such as an inhibition code.

Hereinafter, the 7680×4320/100P-120P/4:4:4, 4:2:2, or 4:2:0/10-bit or 12-bit signal is also referred to as a "UHDTV2 class image (100P-120P)."

The second embodiment differs from the first embodiment in a configuration and a process of the mapping unit 11 of the broadcasting camera 1 and the reproducing unit 39 of the CCU 2.

[Internal Configuration of Mapping Unit]

Figure 19:
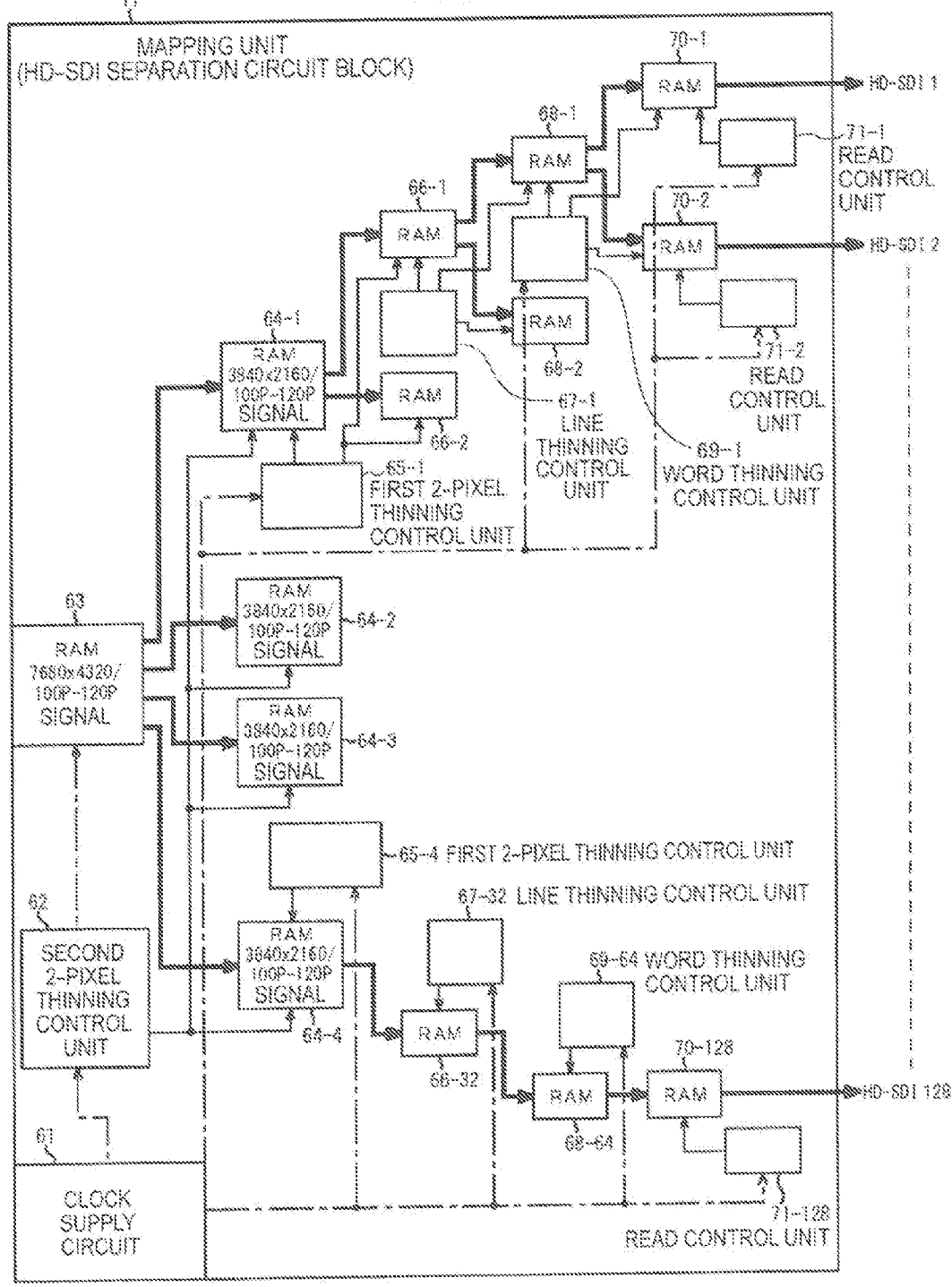
FIG. 19 is a block diagram illustrating an exemplary internal configuration of a mapping unit according to a second embodiment of the present disclosure.

FIG. 19 illustrates an exemplary internal configuration of the mapping unit 11.

The mapping unit 11 includes a clock supply circuit 61 that supplies a clock to respective units and a RAM 63 that stores a 7680×4320/100P-120P video signal (a UHDTV2 class image (100P-120P)). The mapping unit 11 further includes a second 2-pixel thinning control unit 62 that controls 2-pixel thinning (interleaving) of reading the pixel samples from the UHDTV2 class image (100P-120P) stored in the RAM 63 2 pixels at a time. The pixel samples that have undergone the 2-pixel thinning are stored in RAMs 64-1 to 64-4 as first to fourth UHDTV1 class images (100P-120P) serving as the 3840×2160/100P-120P/4:4:4, 4:2:2, or 4:2:0110-bit or 12-bit signal.

The mapping unit 11 further includes first 2-pixel thinning control units 65-1 to 65-4 that control 2-pixel thinning (interleaving) of the first to fourth UHDTV1 class images (100P-120P) stored in the RAMs 64-1 to 64-4. The first 2-pixel thinning control units 65-1 to 65-4 perform an operation similar to that of the 2-pixel thinning control unit 21 according to the first embodiment. Thus, the first 2-pixel thinning control units 65-1 to 65-4 generate first to eighth sub images from the first to fourth UHDTV1 class images (100P-120P), and store the first to eighth sub images in RAMs 66-1 to 66-32.

The mapping unit 11 further includes line thinning control units 67-1 to 67-32 that control line thinning of the sub images stored in the RAMs 66-1 to 66-32. The line thinning control units 67-1 to 67-32 perform an operation similar to that of the line thinning control units 24-1 to 24-8 according to the first embodiment. The mapping unit 11 further includes RAMs 68-1 to 68-64 that store lines thinned by the line thinning control units 67-1 to 67-32.

The mapping unit 11 further includes word thinning control units 69-1 to 69-64 that control word thinning of data stored in the RAMs 68-1 to 68-64. The word thinning control units 69-1 to 69-64 perform an operation similar to that of the word thinning control units 26-1 to 26-16 according to the first embodiment. The mapping unit 11 further includes RAMs 70-1 to 70-128 that write data thinned by the word thinning control units 69-1 to 69-64.

The mapping unit 11 includes read control units 71-1 to 71-128 that output the pixel samples of data read from the RAMs 70-1 to 70-128 as HD-SDIs of 128 channels.

In FIG. 19, a block that generates an HD-SDI 1 is illustrated, but blocks that generate HD-SDIs 2 to 128 have a similar exemplary configuration, and thus illustration and a detailed description thereof are omitted.

[Exemplary Operation of Mapping Unit]

Next, an exemplary operation of the mapping unit 11 will be described.

The clock supply circuit 61 supplies clocks to the second 2-pixel thinning control unit 62, the first 2-pixel thinning control units 65-1 to 65-4, the line thinning control units 67-1 to 67-32, the word thinning control units 69-1 to 69-64, and the read control units 71-1 to 71-128. The clocks are used for reading or writing of a pixel sample, and the respective units are synchronized by the clocks.

The UHDTV2 class image (100P-120P) input from an image sensor (not illustrated) is stored in the RAM 63.

Figure 20:
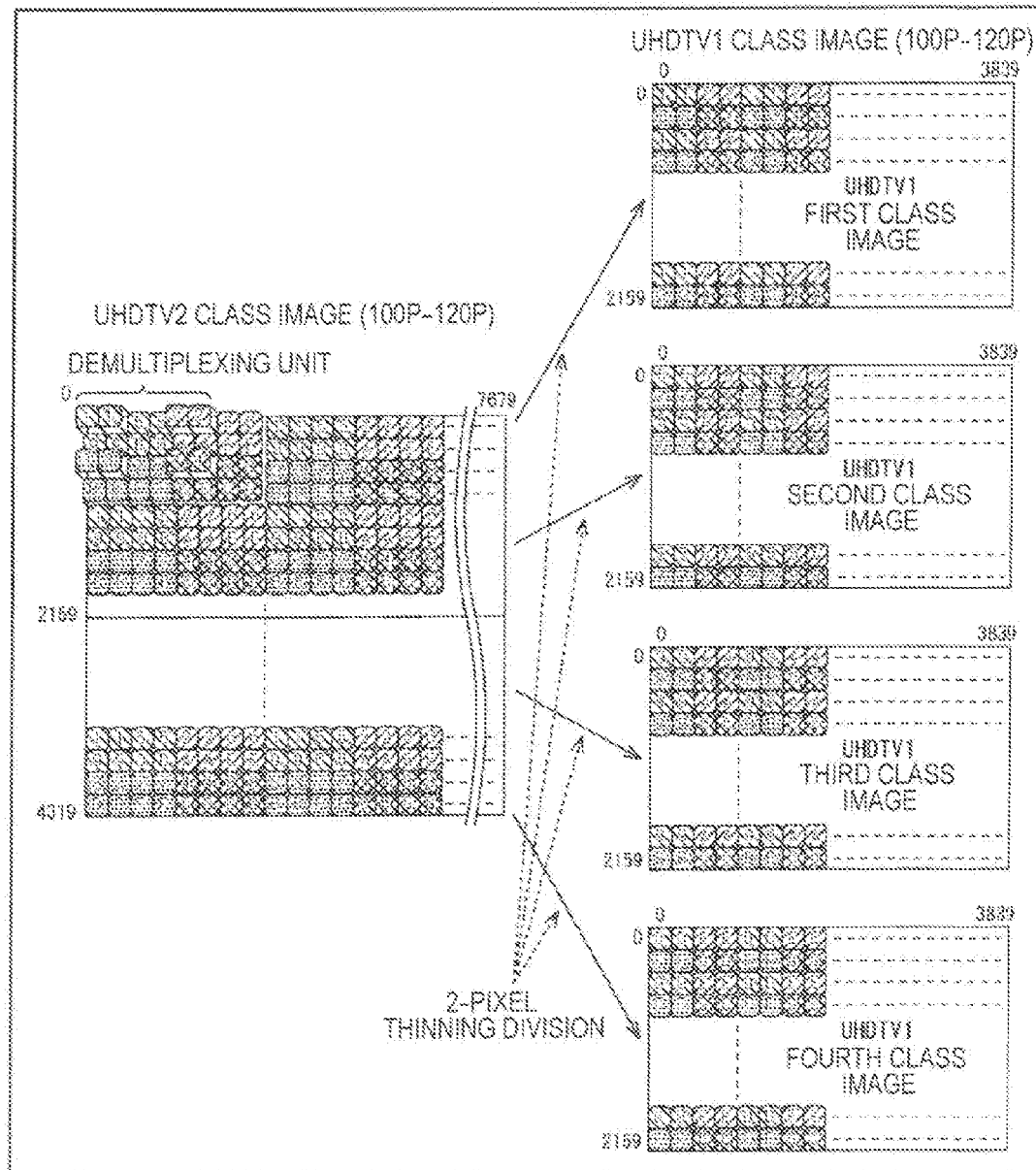
FIG. 20 is an explanatory diagram illustrating a processing image in which a mapping unit according to the second embodiment of the present disclosure maps pixel samples included, in a UHDTV2 class image to a UHDTV1 class image.

The second 2-pixel thinning control unit 62 maps the pixel samples of the UHDTV2 class image (100P-120P) to the first to fourth UHDTV1 class images (100P-120P), for example, according to the rule of FIG. 4 of SMPTE 2036-3 as illustrated in FIG. 20. Specifically, the second 2-pixel thinning control unit 62 thins out every other pair of two neighboring pixel samples of each line from the UHDTV2 class image (100P-120P) for every other line, and maps every other pair of two neighboring pixel samples to the first to fourth UHDTV1 class images (100P-120P).

As illustrated in FIG. 20, a sample number and a line number of the UHDTV2 class image (100P-120P) start from 0. Thus, there are a total of 4320 lines from a 0th line to a 4319th line, each of which includes a total of 7680 samples from a 0th sample to a 7679th sample in an effective region of the UHDTV2 class image (100P-120P). Hereinafter, a 0th line, a 2nd line, a 4th line, . . . , of the UHDTV2 class image (100P-120P) are referred to as "even-numbered lines," and a 1st line, a 3rd line, a 5th line, . . . are referred to as "odd-numbered lines."

Pixel samples of a 4j-th sample and a (4j+1)-th sample (j=0 to 1919) of a 2i-th line (i=0 to 2159) serving as the even-numbered line of the UHDTV2 class image (100P-120P) are mapped to a 2i-th sample and a (2j+1)-th sample of an i-th line of the first UHDTV1 class image (100P-120P). Thus, the first UHDTV1 class image (100P-120P) is a video signal in which the pixel samples of the 4j-th sample and the (4j+1)-th sample (j=0 to 1919) of the even-numbered line of the UHDTV2 class image (100P-120P) are thinned and arranged in an original order.

Further, pixel samples of a (4j+2)-th sample and a (4j+3)-th sample (j1=0 to 1919) of the 2i-th line (i=0 to 2159) serving as the even-numbered line of the UHDTV2 class image (100P-120P) are mapped to the 2j-th sample and the (2j+1)-th sample of the i-th line of the second UHDTV1 class image (100P-120P). Thus, the second UHDTV1 class image (100P-120P) is a video signal in which the pixel samples of the (4j+2)-th sample and the (4j+3)-th sample (j=0 to 1919) of the even-numbered line of the UHDTV2 class image (100P-120P) are thinned out and arranged in an original order.

Pixel samples of a 4j-th sample and a (4j+1)-th sample (j=0 to 1919) of a (2i+1)-th line (j=0 to 2159) serving as the odd-numbered line of the UHDTV2 class image (100P-120P) are mapped to a 2j-th sample and a (2j+1)-th sample of an i-th line of the third UHDTV1 class image (100P-120P). Thus, the third UHDTV1 class image (100P-120P) is a video signal in which the pixel samples of the 4j-th sample and the (4j+1)-th sample (j=0 to 1919) of the odd-numbered line of the UHDTV2 class image (100P-120P) are thinned and arranged in an original order.

Further, pixel samples of a (4j+2)-th sample and a (4j+3)-th sample (j=0 to 1919) of the (2i+1)-th line to 2159) serving as the odd-numbered line of the UHDTV2 class image (100P-120P) are mapped to the 2j-th sample and the (2j+1)-th sample of the i-th line of the fourth UHDTV1 class image (100P-120P). Thus, the fourth UHDTV1 class image (100P-120P) is a video signal in which the pixel samples of the (4j+2)-th sample and the (4j+3)-th sample (j=0 to 1919) of the even-numbered line of the UHDTV2 class image (100P-120P) are thinned out and arranged in an original order.

Subsequently, for the first to fourth UHDTV1 class images (100P-120P), similarly to the first embodiment, the mapping process, the line thinning process, and the word thinning process are performed on the sub images, and the HD-SDIs of 128 channels are generated. The generated HD-SDIs of 128 channels are supplied from the mapping unit 11 to the S/P scrambling 8B/10B unit 12. Then, through a process similar to that of the first embodiment, the 10G-SDIs of 16 channels are generated from the HD-SDIs of 128 channels, and then the 10G-SDIs of 16 channels are transmitted from the broadcasting camera 1 to the CCU 2.

Further, when the 10G-SDIs of 16 channels are transmitted via a single optical fiber, the CWDM/DWDM wavelength multiplexing technique may be used.

The HD-SDIs of 128 channels may be transmitted without change or the HD-SDIs of 128 channels may be multiplexed, and the 3G-SDIs of 64 channels may be transmitted.

In FIG. 19, the example of performing the four-step thinning process of the first 2-pixel thinning, the second 2-pixel thinning, the line thinning, and the word thinning using four types of memories (the RAMs 64-1 to 64-4, the RAMs 66-1 to 66-32, the RAMs 68-1 to 68-64, and the RAMs 70-1 to 70-128) is illustrated, but two or more of the four types of memories may be used in common.

[Internal Configuration of Reproducing Unit]

Figure 21:
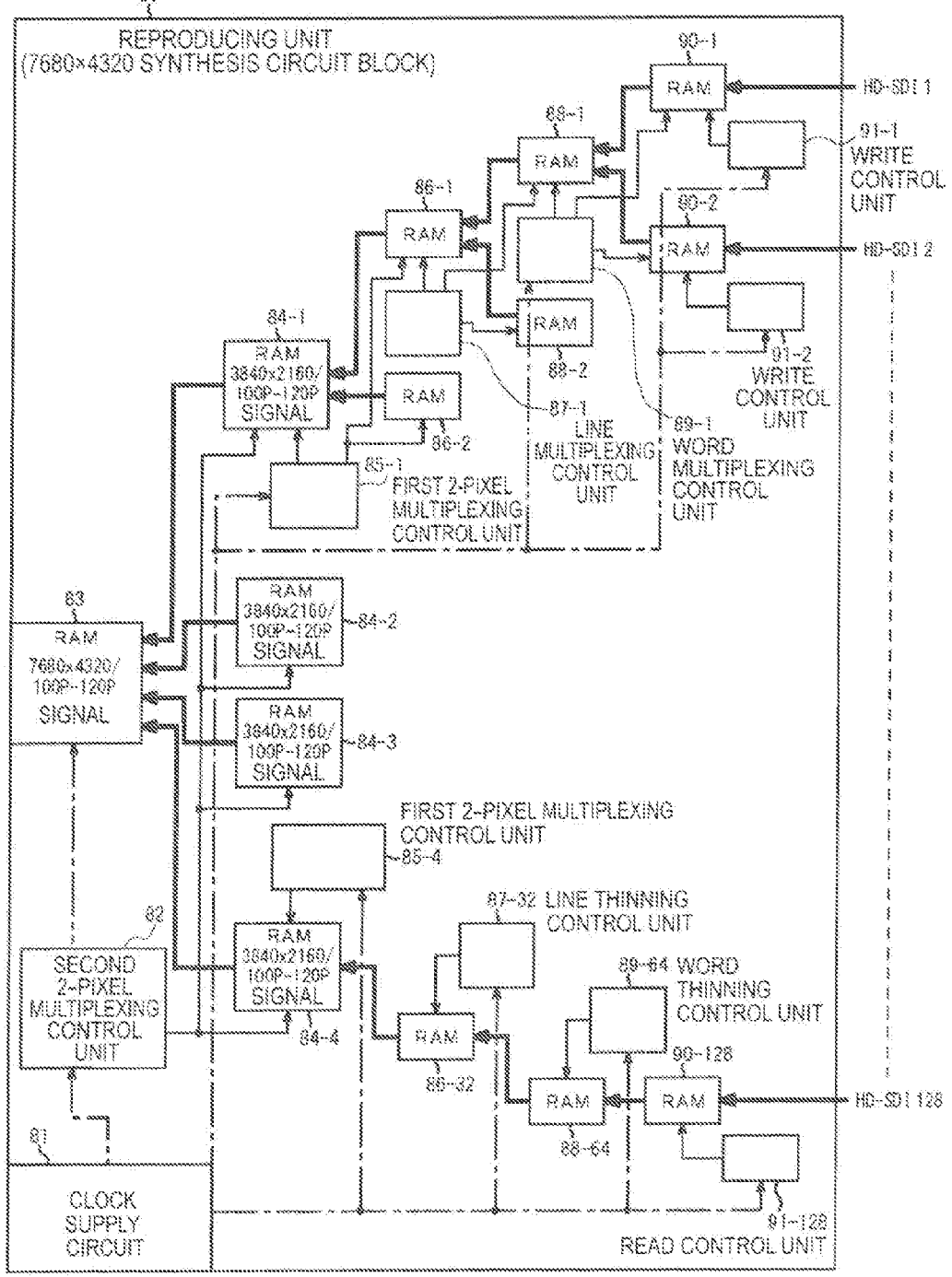
FIG. 21 is a block diagram illustrating an exemplary internal configuration of a reproducing unit according to the second embodiment of the present disclosure.

FIG. 21 illustrates an exemplary internal configuration of the reproducing unit 39.

The reproducing unit 39 is a block that performs inverse conversion of the process that the mapping unit 11 of FIG. 19 has performed on the pixel samples.

The reproducing unit 39 includes a clock supply circuit 81 that supplies clocks to respective units. The clock supply circuit 81 supplies clocks to a second 2-pixel multiplexing control unit 82, first 2-pixel multiplexing control units 85-1 to 85-4, line multiplexing control units 87-1 to 87-32, word multiplexing control units 89-1 to 89-64, and write control units 91-1 to 91-128. As the respective units are synchronized with the clocks, reading or writing of the pixel sample is controlled.

The reproducing unit 39 includes RAMs 90-1 to 90-128 that store the HD-SDIs 1 to 128 of 128 channels. As described above, each of the HD-SDIs 1 to 128 configures the 1920×1080/50I-60I signal. As the HD-SDIs 1 to 128, CH1, CH3, CB5, CH7, . . . , and CH127 serving as the link A and CH2, CH4, CH6, CH8, . . . , and CH128 serving as the link B which are input from the descrambling 8B/10B P/S unit 38 are used.

The write control units 91-1 to 91-128 perform write control according to the clock supplied from the clock supply circuit 81 such that the input HD-SDIs of 128 channels 1 to 128 are stored in the RAMs 90-1 to 90-128.

The reproducing unit 39 further includes the word multiplexing control units 89-1 to 89-64 that control word multiplexing (deinterleaving). The word multiplexing control units 89-1 to 89-64 perform an operation similar to that of the word multiplexing control units 47-1 to 47-16 according to the first embodiment. The reproducing unit 39 further includes RAMs 88-1 to 88-64 that write data multiplexed by the word multiplexing control units 89-1 to 89-64.

The reproducing unit 39 further includes the line multiplexing control units 87-1 to 87-32 that control line multiplexing. The line multiplexing control units 87-1 to 87-32 perform an operation similar to that of the line multiplexing control units 45-1 to 45-8 according to the first embodiment. The reproducing unit 39 further includes RAMs 86-1 to 86-32 that write data multiplexed by the line multiplexing control units 87-1 to 87-32.

The reproducing unit 39 further includes the first 2-pixel multiplexing control units 85-1 to 85-4 that control multiplexing of 2 pixel samples extracted from the RAMs 86-1 to 86-32. The first 2-pixel multiplexing control units 85-1 to 85-4 perform an operation similar to that of the 2-pixel multiplexing control unit 42 of the first embodiment. The reproducing unit 39 further includes RAMs 84-1 to 84-4 that store the first to fourth UHDTV1 class images (100P-120P) generated by the first 2-pixel multiplexing control units 85-1 to 85-4.

The reproducing unit 39 further includes the second 2-pixel multiplexing control unit 82 that multiplexes the pixel samples of the first to fourth UHDTV1 class images (100P-120P) stored in the RAMs 84-1 to 84-4 into the UHDTV2 class image (100P-120P). The reproducing unit 39 further includes a RAM 83 that stores the pixel samples multiplexed into the UHDTV2 class image (100P-120P).

[Exemplary Operation of Reproducing Unit]

Next, an exemplary operation of the reproducing unit 39 will be described.

Through a process similar to that of the first embodiment, the word multiplexing and the line multiplexing are performed on the HD-SDIs 1 to 128, and thus the first to 32nd sub images are generated. Further, through a process similar to that of the first embodiment, the 2-pixel multiplexing is performed on the first to 32nd sub images, and thus the first to fourth UHDTV1 class images (100P-120P) are generated and then stored in the RAMs 84-1 to 84-4.

The second 2-pixel multiplexing control unit 82 reads the first to fourth UHDTV1 class images (100P-120P) from the RAMs 84-1 to 84-4. Then, the second 2-pixel multiplexing control unit 82 performs 2-pixel multiplexing serving as inverse conversion of the 2-pixel thinning of the second 2-pixel thinning control unit 62 of the mapping unit 11 on the read first to fourth UHDTV1 class images (100P-120P), and reproduces the UHDTV2 class image (100P-120P).

Specifically, pixel samples of a 2j-th sample and a (2j+1)-th sample (j=0 to 1919) of an i-th line (i=0 to 2159) of the first UHDTV1 class image (100P-120P) are mapped to a 4j-th sample and a (4j+1)-th sample (j=0 to 1919) of a 2i-th line (i=0 to 2159) serving as the even-numbered line of the UHDTV2 class image (100P-120P).

Specifically, pixel samples of a 2j-th sample and a (2j+1)-th sample (j=0 to 1919) of an i-th line (i=0 to 2159) of the second UHDTV1 class image (100P-120P) are mapped to a (4j+2)-th sample and a (4j+3)-th sample (j=0 to 1919) of a 2i-th line (i=0 to 2159) serving as the even-numbered line of the UHDTV2 class image (100P-120P).

Pixel samples of a 2j-th sample and a (2j+1)-th sample (j=0 to 1919) of an i-th line (i=0 to 2159) of the third UHDTV1 class image (100P-120P) are mapped to a 4j-th sample and a (4j+1)-th sample (j=0 to 1919) of a (2i+1)-th line (i=0 to 2159) serving as the odd-numbered line of the UHDTV2 class image (100P-120P).

Specifically, pixel samples of a 2j-th sample and a (2j+1)-th sample (j=0 to 1919) of an i-th line (i=0 to 2159) of the fourth UHDTV1 class image (100P-120P) are mapped to a (4j+2)-th sample and a (4j+3)-th sample (j=0 to 1919) of a (2i+1)-th line (i=0 to 2159) serving as the odd-numbered line of the UHDTV2 class image (100P-120P).

The reproduced UHDTV2 class image (100P-120P) is stored in the RAM 83. The UHDTV2 class image (100P-120P) is timely transferred to a VTR or the like to be reproduced.

In FIG. 21, the example of performing the four-step multiplexing process of the first 2-pixel multiplexing, the second 2-pixel multiplexing, the line multiplexing, and the word multiplexing using four types of memories (the RAMs 84-1 to 84-4, the RAMs 86-1 to 86-32, the RAMs 88-1 to 88-64, and the RAMs 90-1 to 90-128) is illustrated, but two or more of the four types of memories may be used in common.

As described above, according to the second embodiment, it is possible to suppress a capacity of a memory and a transmission delay necessary for the thinning process until the HD-SDIs of 128 channels are generated from the UHDTV2 class image (100P-120P). Further, it is possible to transmit and receive the UHDTV2 class image (100P-120P) using the SDI format of the related art. Moreover, when the UHDTV2 class image (100P-120P) is serially transmitted, video switching can be performed in the same frame units as in the original UHDTV2 class image (100P-120P).

4. Third Embodiment

Example of Transmitting 3840×2160/(50P-60P)×N/4:4:4, 4:2:2, or 4:2:0/10-Bit or 12-Bit Signal Next, a third embodiment of the present disclosure will be described with reference to FIGS. 22 to 23.

In the third embodiment, transmission of a 3840×2160/(50P-60P)×N (N is an integer of 2 or more)/4:4:4, 4:2:2, or 4:2:0/10-bit or 12-bit signal is performed. In other words, transmission of a video signal in which m×n is 3840×2160, a-b is (50P-60P)×N, and r:g:b is 4:4:4, 4:2:2, or 4:2:0 is performed. A frame rate of this signal is N times as high as that of a 3840×2160/50P-60P/4:4:4, 4:2:2, or 4:2:0/10-bit or 12-bit signal specified in SMPTE 2036-1 and 100P-120P or more.

Compared with a video signal of UHDTV1 specified in SMPTE 2036-1, this signal differs in a color gamut (colorimetry) but is the same in a digital signal format such as an inhibition code.

Hereinafter, the 3840×2160/(50P-60P)×N/4:4:4, 4:2:2, or 4:2:0/10-bit or 12-bit signal is also referred to as a "UHDTV1 class image (50P-60P)×N."

The third embodiment differs from the first embodiment in a process of mapping the UHDTV1 class image into the sib images and a process of reproducing the UHDTV1 class image from the sub images which is inverse conversion thereof when N is 3 or more. The first embodiment is an example in which N=2 is set in the third embodiment.

Figure 22:
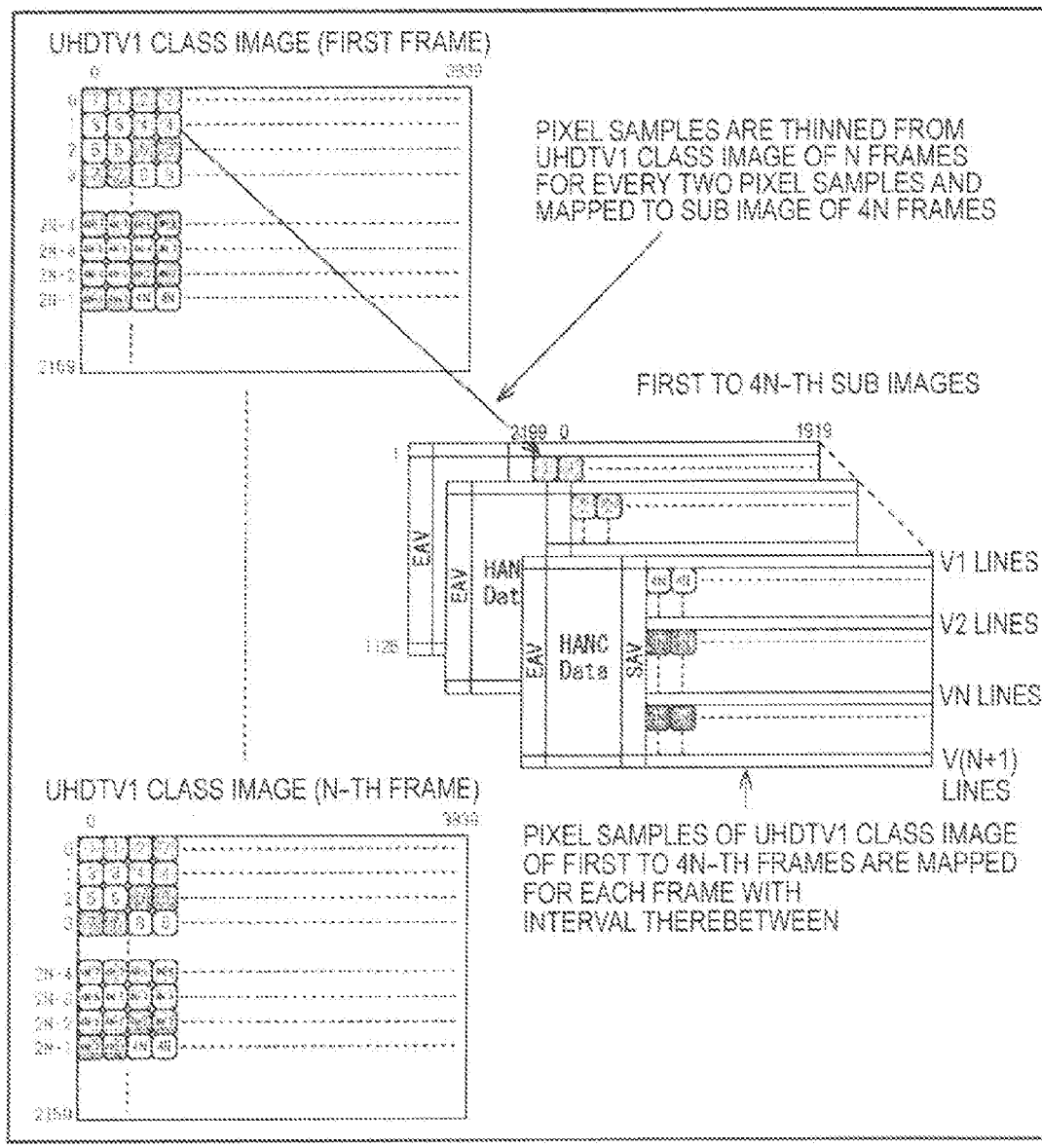
FIG. 22 is an explanatory diagram illustrating a processing image in which a mapping unit according to a third embodiment of the present disclosure maps pixel samples included in a UHDTV1 class image to first to 4N-th sub images.

Specifically, as illustrated in FIG. 22, every other pair of two neighboring pixel samples of each line is thinned out from N consecutive frames of the UHDTV1 class image ((50P-60P)×N) (in units of N frames) at intervals of 2N lines and mapped to first to 4N-th sub images.

Here, a method of mapping pixel samples from N consecutive frames of the UHDTV1 class image ((50P-60P)×N) to the first to 4N-th sub images will be described in detail with further reference to FIG. 23.

Figure 23:
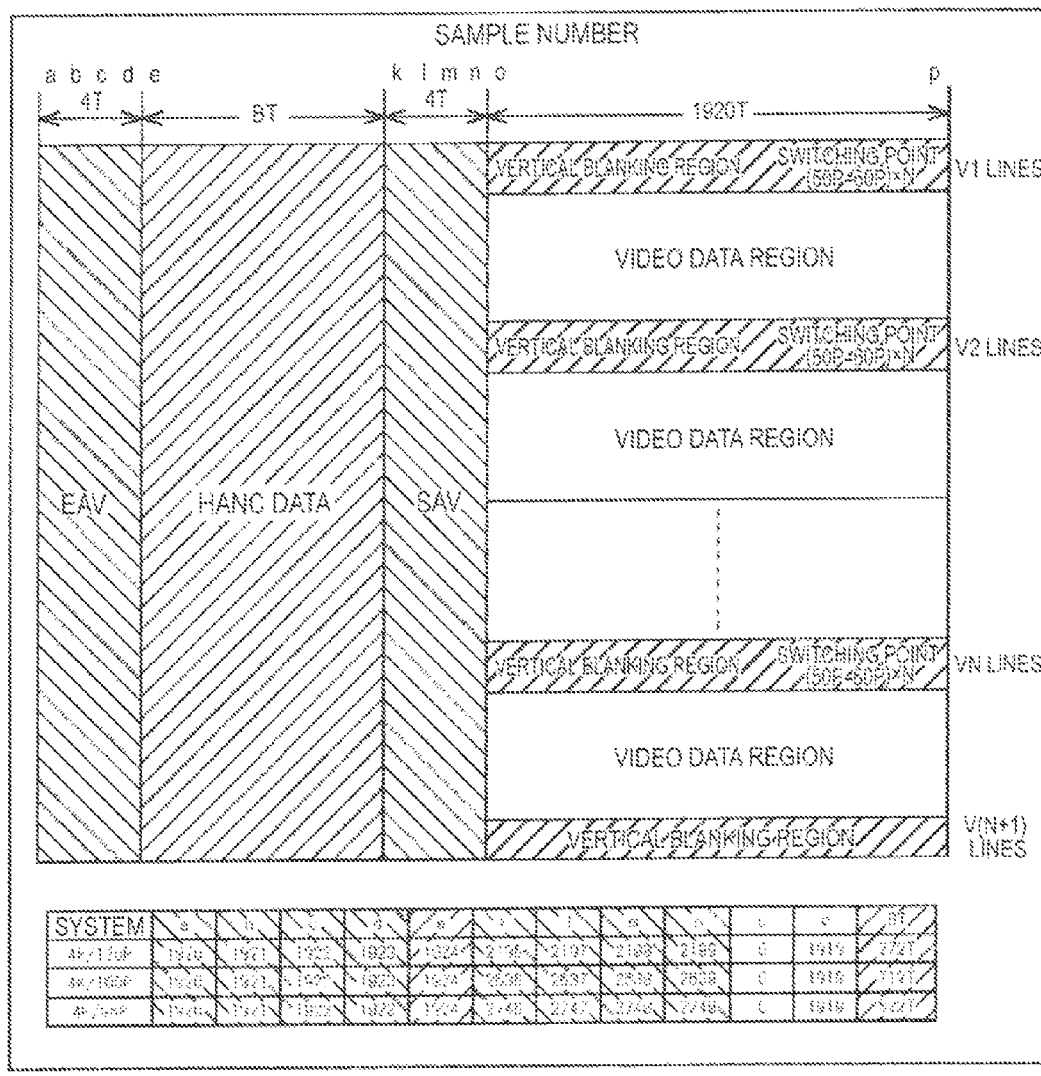
FIG. 23 is a diagram illustrating a second example of a sub image format.

FIG. 23 is a similar diagram to FIG. 9 and illustrates an exemplary format of each sub image. A format of a sub image of FIG. 23 differs from that of FIG. 9 in an arrangement of the vertical blanking region and the video data region.

First, the vertical blanking region is arranged in a region of a V1 line in the head of the first to 4N-th sub images.

Then, pixel samples of a (4i+2j)-th sample and a (4i+2j+1)-th sample (i=0 to 959, j=0 to 1) of a (2Ng+h)-th line (g=0 to M (=(2160)/2N−1), h=0 to 2N−1) of the first class image are mapped to a 2i-th sample and a (2i+1)-th sample of a (g+V1+1)-th line of a (2h+j+1)-th sub image.

Then, the vertical blanking region is arranged in a region of a V2 line subsequent to a region to which the pixel samples of the first class image of the first to first to 4N-th sub images are mapped.

Then, pixel samples of a (4i+2j)-th sample and a (4i+2j+1)-th sample (i=0 to 959, j=0 to 1) of a (2Ng+h)-th line (g=0 to M, h=0 to 2N−1) of the second class image are mapped to a 2i-th sample and a (2i+1)-th sample of a (g+(M+1)+V1+V2+1)-th line of a (2h+j+1)-th sub image.

Subsequently, similar mapping is performed on third to N-th class images. Then, pixel samples of a (4i+2j)-th sample and a (4i+2j+1)-th sample (i=0 to 959, j=0 to 1) of a (2Ng+h)-th line (g=0 to M, h=0 to 2N−1) of the N-th class image are mapped to a 2i-th sample and a (2i+i)-th sample of a (g+(N−1)×(M+1)+V1+V2+V3+ . . . +VN+1)-th line of the (2h+j+1)-th sub image.

Finally, the vertical blanking region is arranged in a region of a V(N+1) line subsequent to a region to which the pixel samples of the N-th class image of the first to first to 4N-th sub images are mapped.

Each of V1, V2, V3, . . . , and VN is set to approximately 45/N lines (a digital after the decimal point is rounded up or down), and V1+V2+V3+ . . . +VN+V(N+1) is set to be 45 lines.

As described above, every other pair of two neighboring pixel samples of each line is thinned out from the N consecutive frames of the UHDTV1 class image (50P-60P)×N at intervals of 2N lines and mapped to the first to 4N-th sub images.

Further, in the first to 4N-th sub images, a predetermined interval (the vertical blanking region) is arranged between the video data regions corresponding to the respective frames of the UHDTV1 class image ((50P-60P)×N). Thus, in each sub image, it is possible to set a switching point between frames of the UHDTV1 class image ((50P-60P)×N) and perform video switching in the same frame units as in the UHDTV1 class image ((50P'60P)×N).

Thereafter, similarly to the first embodiment, the line thinning and the word thinning are performed on the first to fourth sub images. As a result, HD-SDIs of 16N channels are generated. Further, similarly to the first embodiment, 10G-SDIs of 2N channels are generated from the HD-SDIs of 16N channels. Then, the 10G-SDIs of 2N channels are transmitted from the broadcasting camera 1 to the CCU 2.

Further, when the 10G-SDIs of 2N channels are transmitted via a single optical fiber, the CWDM/DWDM wavelength multiplexing technique may be used.

The HD-SDIs of 16N channels may be transmitted without change or the HD-SDIs of 16N channels may be multiplexed, and the 3G-SDIs of 8N channels may be transmitted.

In the CCU 2, through a process similar to that of the first embodiment, the HD-SDIs of 16N channels are generated from the 10G-SDIs of 2N channels, and the first to 4N-th sub images are further generated.

Then, by performing inverse conversion of the above process, the UHDTV1 class images ((50P-60P)×N) of N frames are reproduced from the first to 4N-th sub images.

As described above, according to the third embodiment, it is possible to suppress a capacity of a memory and a transmission delay necessary for the thinning process until the HD-SDIs of 16N channels are generated from the UHDTV1 class image ((50P-60P)×N). Further, it is possible to transmit and receive the UHDTV1 class image ((50P-60P)×N) using the SDI format of the related art. Moreover, when the UHDTV1 class image ((50P-60P)×N) is serially transmitted, video switching can be performed in the same frame units as in the original UHDTV1 class image ((50P-60P)×N).

5. Fourth Embodiment

Example of Transmitting UHDTV2,
7680×4320/(50P-60P)×N/4:4:4, or 4:2:0/10-Bit or 12-Bit Signal Next, a fourth embodiment of the present disclosure will be described with reference to FIG. 24.

In the fourth embodiment, transmission of a 7680×4320/(50P-60P)×N (N is an integer of 2 or more)/4:4:4, 4:2:2, or 4:2:0/10-bit or 12-bit signal is performed. In other words, transmission of a video signal in which m×n is 7680×4320, a-b is (50P-60P)×N, and r:g:b is 4:4:4, 4:2:2, or 4:2:0 is performed. A frame rate of this signal is then N times as high as that of a 7680×4320/50P-60P/4:4:4, 4:2:2, or 4:10/10-bit or 12-bit signal specified in SMPTE 2036-1 and 100P-120P or more.

Compared with a video signal of UHDTV2 specified in SMPTE 2036-1, this signal differs in a color gamut (colorimetry) but is the same in a digital signal format such as an inhibition code.

Hereinafter, the 7680×4320/(50P-60P)×N/4:4:4, 4:2:2, or 4:2:0/10-bit or 12-bit signal is referred to as a "UHDTV2 class image (50P-60P)×N."

The fourth embodiment differs from the second embodiment in a process of mapping the UHDTV1 class image into the sub images and a process of reproducing the UHDTV1 class image from the sub images which is inverse conversion thereof when N is 3 or more. The second embodiment is an example in which N−2 is set in the fourth embodiment.

Figure 24:
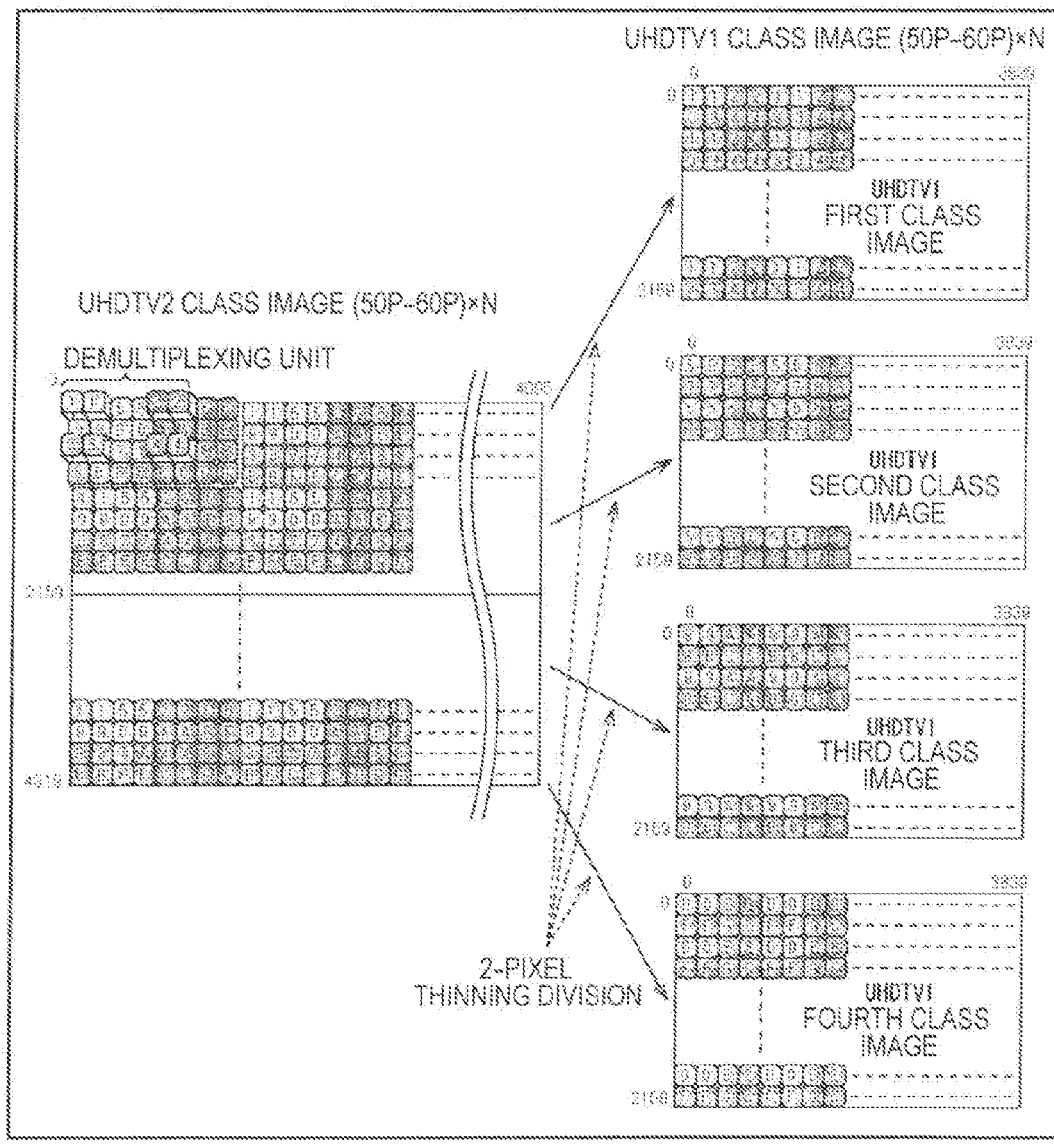
FIG. 24 is an explanatory diagram illustrating a processing image in which a mapping unit according to a fourth embodiment of the present disclosure maps pixel samples included in a UHDTV2 class image having a frame rate that is N times 50P-60P to a UHDTV1 class image having a frame rate that is N times 50P-60P.

Specifically, as illustrated in FIG. 24, a UHDTV2 class image ((50P-60P)×N) is mapped to the first to fourth UHDTV1 class images ((50P-60P)×N) through a process similar to that of the second embodiment.

Then, through a process similar to that of the third embodiment, the first to fourth UHDTV1 class images ((50P-60P)×N) are generated from the first to 16N-th sub images, and HD-SDIs of 64N channels are generated. Further, similarly to the first embodiment, 10G-SDIs of 8N channels are generated from the HD-SDIs of 64N channels. Then, the 10G-SDIs of 8N channels are transmitted from the broadcasting camera 1 to the CCU 2.

Further, when the 10G-SDIs of 8N channels are transmitted via a single optical fiber, the CWDM/DWDM wavelength multiplexing technique may be used.

The HD-SDIs of 64N channels may be transmitted without change or the HD-SDIs of 64N channels may be multiplexed, and the 3G-SDIs of 32N channels may be transmitted.

In the CCU 2, through a process similar to that of the first embodiment, the HD-SDIs of 64N channels are generated from the 10G-SDIs of 8N channels. Further, through a process similar to that of the third embodiment, the first to 16N-th sub images are generated from the HD-SDIs of 64N channels, and the first to fourth UHDTV1 class images ((50P-60P)×N) are farther generated. Then, through a process similar to that of the second embodiment, the UHDTV2 class image ((50P-60P)×N) are reproduced from the first to fourth UHDTV1 class images ((50P-60P)×N).

As described above, according to the fourth embodiment, it is possible to suppress a capacity of a memory and a transmission delay necessary for the thinning process until the HD-SDIs of 64N channels are generated from the UHDTV2 class image ((50P-60P)×N). Further, it is possible to transmit and receive the UHDTV2 class image ((50P-60P)×N) using the SDI format of the related art. Moreover, when the UHDTV2 class image ((50P-60P)×N) is serially transmitted, video switching can be performed in the same frame units as in the original UHDTV2 class image ((50P-60P)×N).

6. Fifth Embodiment

Example of Transmitting 4096×2160/96P-120P/4:4:4 or 4:2:2/10-Bit or 12-Bit Signal Next, a fifth embodiment of the present disclosure will be described with reference to FIGS. 25 to 27.

In the fifth embodiment, transmission of a 4096×2160/96P-120P/4:4:4 or 4:2:2/10-bit or 12-bit signal is performed. In other words, transmission of a video signal in which m×n is 4096×2160, a-b is 96P-120P, and r:g:b is 4:4:4 or 4:2:2 is performed. Thus, a frame rate of this signal is twice as high as the 4096×2160/50P-60P/4:4:4 or 4:2:2/10-bit or 12-bit signal specified in SMPTE 2048-1.

Compared with a video signal specified in SMPTE 2048-1, this signal differs in a color gamut (colorimetry) but is the same in a digital signal format such as an inhibition code.

[Exemplary Operation of Broadcasting Camera]

First, an exemplary operation of the broadcasting camera 1 will be described with reference to FIGS. 25 to 27.

Through a process similar to that of the first embodiment, the mapping unit 11 generates the HD-SDIs of 32 channels from the 4096×2160/96P-120P/4:4:4 or 4:2:2/10-bit or 12-bit signal.

Figure 25:
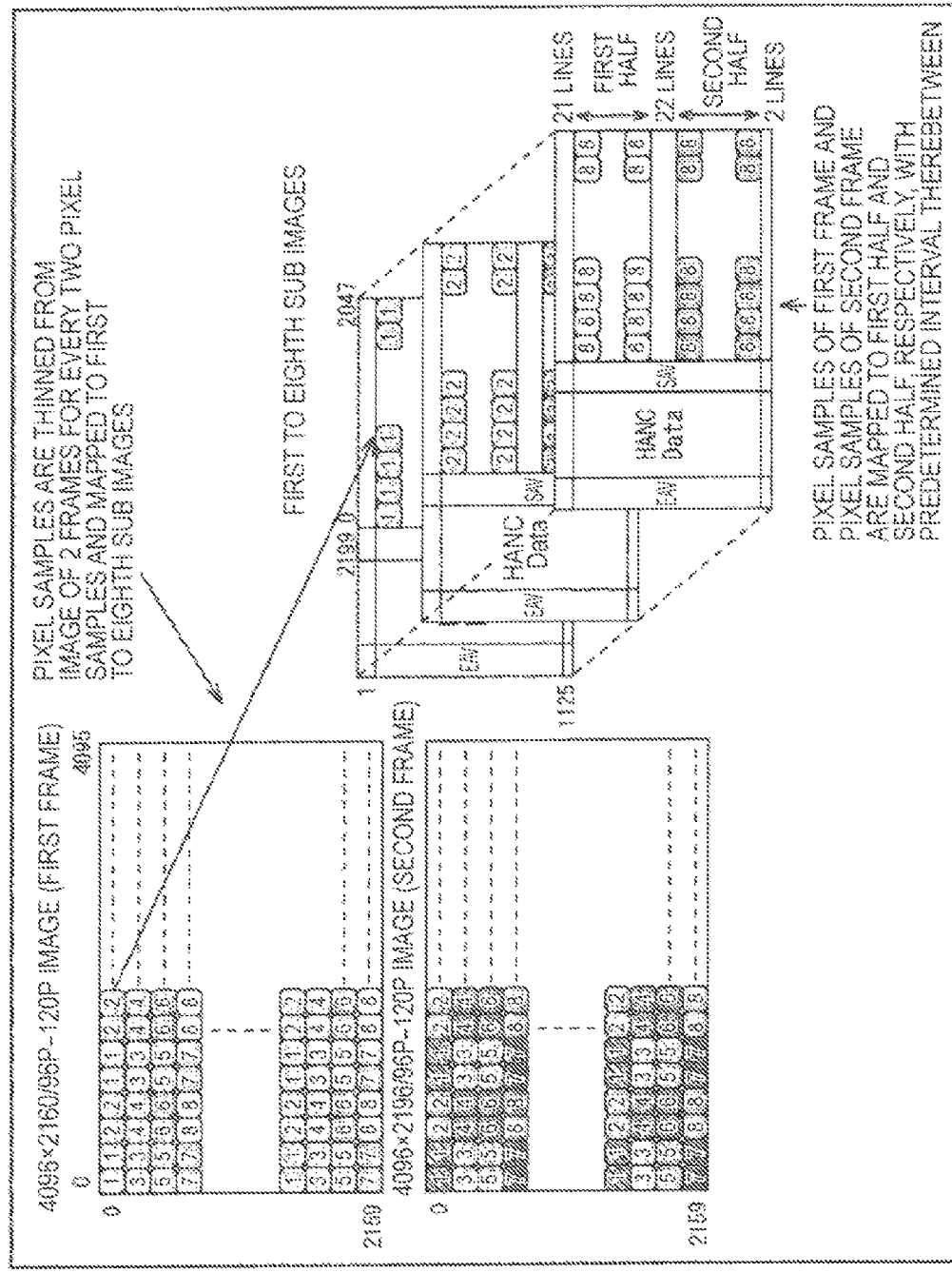
FIG. 25 an explanatory diagram illustrating a processing image in which a mapping unit according to a fifth embodiment of the present disclosure maps pixel samples included in a 4096×2160 class image having a frame rate of 96P-120P to first to eighth sub images.

Specifically, as illustrated in FIG. 25, the 4096×2160/96P-120P/4:4:4 or 4:2:2/10-bit or 12-bit signal is mapped to the first to eighth sub images. The first to eighth sub images are a 2048×1080/96P-60P/4:4:4 or 4:12/10-bit or 12-bit signal. Thus, in the first to eighth sub images, m'×n' is 2048×1080, a'-b' is 48P-60P, and r':g':b' is 4:4:4 or 4:2:2.

The first to eighth sub images in the fifth embodiment differ from the first to eighth sub images in the first embodiment in the number of samples per line. However, similar mapping to that of the first embodiment is performed except that the number of samples per line differs. In other words, every other pair of two neighboring pixel samples of each line is thinned out from two consecutive frames of a 2048×1080/96P-60P/4:4:4, 4:2:2, or 4:2:0/10-bit or 12-bit signal (in units of two frames) at intervals of 4 lines and mapped to the first to eighth sub images. Rather, the vertical blanking region of 22 lines is arranged between the video data region of the first frame and the video data region of the second frame, in addition to 21 lines in the head and 2 lines in the tail of each sub image.

As a result, similarly to the first embodiment, video switching can be performed in the same frame units as in the 2048×1080/96P-60P/4:4:4, 4:2:2, or 4:2:0/10-bit or 12-bit signal. In addition, a mapping process delay can be suppressed.

Figure 26:
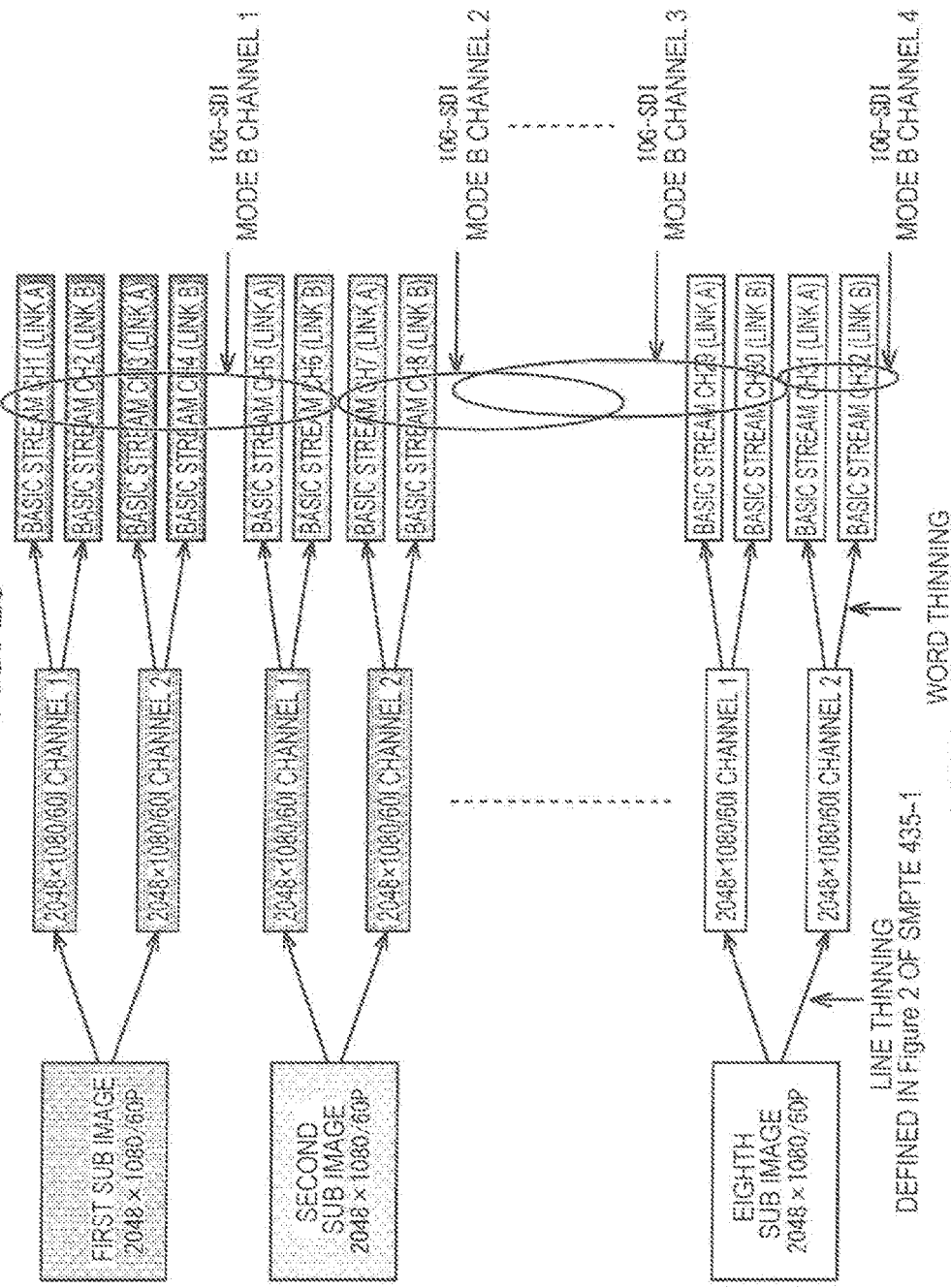
FIG. 26 is a diagram illustrating an example of a mode B.

Further, as illustrated in FIG. 26, similarly to the first embodiment, the line thinning and the word thinning are performed on the first to eighth sub images. As a result, HD-SDIs of 4 channels are generated from each sub image, and HD-SDIs of a total of 32 channels are generated. Further, when the 4096×2160/96P-120P/the 4:2:2/10-bit signal is transmitted, the HD-SDIs of a total of 16 channels are generated.

Then, the HD-SDIs of 32 channels are multiplexed according to a rule of a mode B of SMPTE 435-2.

Figure 27:
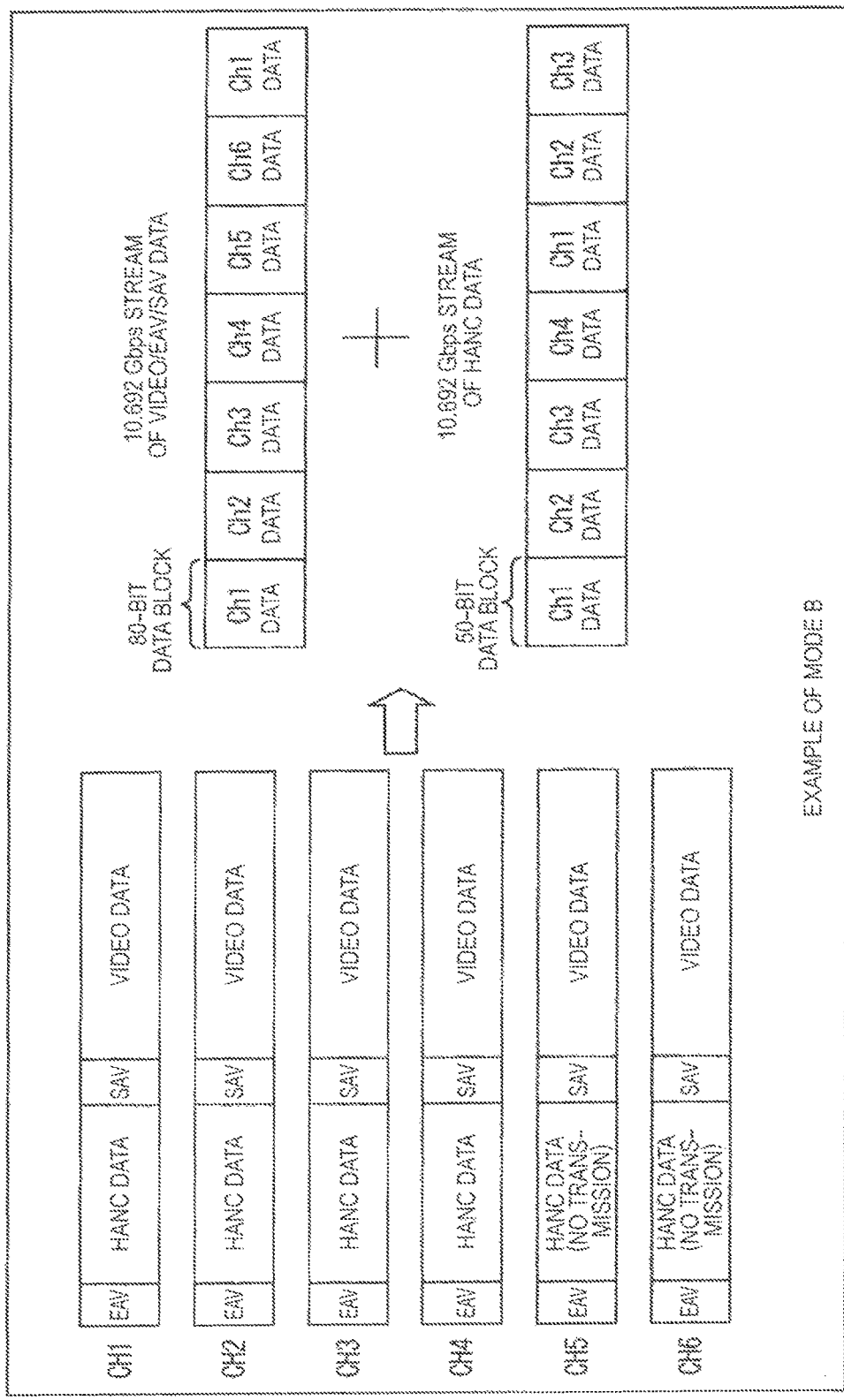
FIG. 27 is an explanatory diagram illustrating an example in which a mapping unit according to a fifth embodiment of the present disclosure performs line thinning and word thinning on first to eighth sub images to be mapped to a mode B.

FIG. 27 is an explanatory diagram illustrating the mode B.

In the mode D of the first to the fourth embodiment, the HD-SDIs of 8 channels (CH1 to CH8) are multiplexed, whereas in the mode B, HD-SDIs of 6 channels (CH1 to CH6) are multiplexed.

Specifically, in the mode B, data is multiplexed into each of the video data region and the horizontal auxiliary data space of the 10G-SDI. Video/EAV/SAV data of 4 words included in the HD-SDIs of 6 channels (CH1 to CR6) is converted into a data block of 5 words (50 bit) by 8B/10B conversion and multiplexed into the video data region of the 10G-SDI in the order of channels from the head of the SAV.

Meanwhile, the horizontal auxiliary data spaces of the HD-SDIs of 4 channels (CH1 to CH4) are converted into a data block of 50 bits by 8B/10B conversion and multiplexed into the horizontal auxiliary data space of the 10G-SDI in the order of channels. However, the horizontal auxiliary data spaces of the HD-SDIs of CH5 and CH6 are not transmitted.

Then, a 10G-SDI of the mode B of a channel 1 is generated from HD-SDIs 1 to 6. A 10G-SDI of the mode B of a channel 2 is generated from HD-SDIs 7 to 12. A 10G-SDI of the mode B of a channel 3 is generated from HD-SDIs 13 to 18. A 10G-SDI of the mode B of a channel 4 is generated from HD-SDIs 19 to 24. A 10G-SDI of the mode B of a channel 5 is generated from HD-SDIs 25 to 30. A 10G-SDI of the mode B of a channel 6 is generated from HD-SDIs 31 and 32.

Then, the 10G-SDIs of 6 channels are transmitted from the broadcasting camera 1 to the CCU 2.

Further, when the 10G-SDIs of 6 channels are transmitted via a single optical fiber, the CWDM/DWDM wavelength multiplexing technique may be used.

The HD-SDIs of 32 channels may be transmitted without change or the HD-SDIs of 32 channels may be multiplexed, and the 3G-SDIs of 16 channels may be transmitted.

[Exemplary Operation of CCU]

Meanwhile, the CCU 2 performs a process reverse to that of the broadcasting camera 1, and reproduces the 4096×2160/96P-120P/4:4:4 or 4:2:2/10-bit or 12-bit signal. In other words, the HD-SDIs of 32 channels are generated from the 10G-SDIs of the mode B of 6 channels. Through a process similar to that of the first embodiment, the word multiplexing and the line multiplexing are performed on the HD-SDIs of 32 channels, and the first to eighth sub images are generated. Then, through a process similar to that of the first embodiment, the 2-pixel multiplexing is performed on the first to eighth sub images, and the 4096×2160/96P-120P/4:4:4 or 4:2:2/1.0-bit or 12-bit signal is reproduced.

As described above, according to the fifth embodiment, it is possible to suppress a capacity of a memory and a transmission delay necessary for the thinning process until the HD-SDIs of 32 channels are generated from the 4096×2160/96P-120P/4:4:4 or 4:2:2/10-bit or 12-bit signal. Further, it is possible to transmit and receive the 4096×2160/

96P-120P/4:4:4 or 4:2:2/10-bit or 12-bit signal using the SDI format of the related art. Moreover, when the 4096×2160/96P-120P/4:4:4 or 4:2:2/10-bit or 12-bit signal is serially transmitted, video switching can be performed in the same frame units as in the original 4096×2160/96P-120P/4:4:4 or 4:2:2/10-bit or 12-bit signal.

According to the transmission systems 10 of the lint to fifth embodiments described above, it is possible to transmit a video of an ultra high resolution (an ultra large capacity) which is four times to 16 times as high as a current HD (1920×1080).

Further, according to the mapping methods of the first to fifth embodiments, it is possible to reduce a necessary memory capacity and a processing delay. Furthermore, it is possible to observe the 3840×2160/(50P-60P)×N, 7680×4320/(50P-60P)×N, and 4096×2160/96P-120P signals through a current measurement device by thinning out the 3840×2160/(50P-60P)×N, 7680×4320/(50P-60P)×N, and 4096×2160/96P-120P signals in units of pixels or in its of times and converting them into the 1920×1080/50I-60I signal specified in SMPTE 274M. Moreover, since the mapping methods conform to the various current SMPTE mapping standards, the mapping methods are methods that are likely to be approved in standardization of SMPTE in the future.

In addition, according to the first to fifth embodiments, the following effects can be obtained.

(1) In ITU and SMPTE, 3540×2160 and 7680×4320/100P-120P signals serving as a next generation video signal are under review. A 4096×2160/96P-120P signal, a 3840×2160 or 7680×4320/(50P-60P)×N signal, and a 4096×2160/(48P-60P)×N signal exceeding that signal are also under review. Further, it is possible to transmit a video signal through a multi-channel 10G interface using a scheme disclosed in Japanese Patent No. 4645638.

(2) In the current HD video standard SMPTE 274 and the 2048×1080 and 4096×2160 digital cinematography production image format FS/709 S2048-1,2, the are only rules of up to 60P. It is widely considered that it will be difficult to improve SMPTE 274 and add 120P in the future in a situation in which HD devices have been developed, widely spread, and sold as products. Thus, a method of mapping a future high frame signal having a frame rate of an integer multiple of 50P-60P to a 1920×1080/50I-60I signal and 2048×1080/48I-60I signal of multiple channels specified in current SMPTE 274 and SMPTE 2048-2 has been reviewed.

Further, a scheme of transmitting a 3840×2160 or 7680×4320/50P-60P signal through a multi-channel 10G-SDI has been standardized as SMPTE 2036-3. Further, a scheme of transmitting a 4096×2160/48P-60P signal through a multi-channel 10G-SDI has been standardized as SMPTE 2048-3. SMPTE 2036-3 and SMPTE 2048-3 employ the same scheme as the 2-pixel sample thinning scheme (Japanese Patent No. 4645638) according to the above embodiments, and thus the scheme according to the above embodiments is likely to be standardized by SMPTE in the future.

(3) A 4 k or 8 k signal is thinned out for every two pixel samples, and thus it is possible to observe a video of an entire screen using a current HD monitor or a waveform monitor and observe an 8 k signal using a future 4 k monitor or the like. Therefore, it is effectively applicable to trouble analysis, for example, when video devices are developed.

(4) In a sub image generated from a video signal of N frames, the vertical blanking region is arranged between the video data regions corresponding to the respective frames, and thus video switching can be performed in the same frame units as in an original video signal. Moreover, the vertical blanking region is arranged, and thus it is possible to suppress a delay when a pixel sample is mapped to a sub image and reduce a necessary memory capacity.

(5) In addition, a transmission standard used in the past can be used without establishing a new transmission standard, and thus convenience is improved.

7. Modified Examples

Computer Configuration Example

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 28:
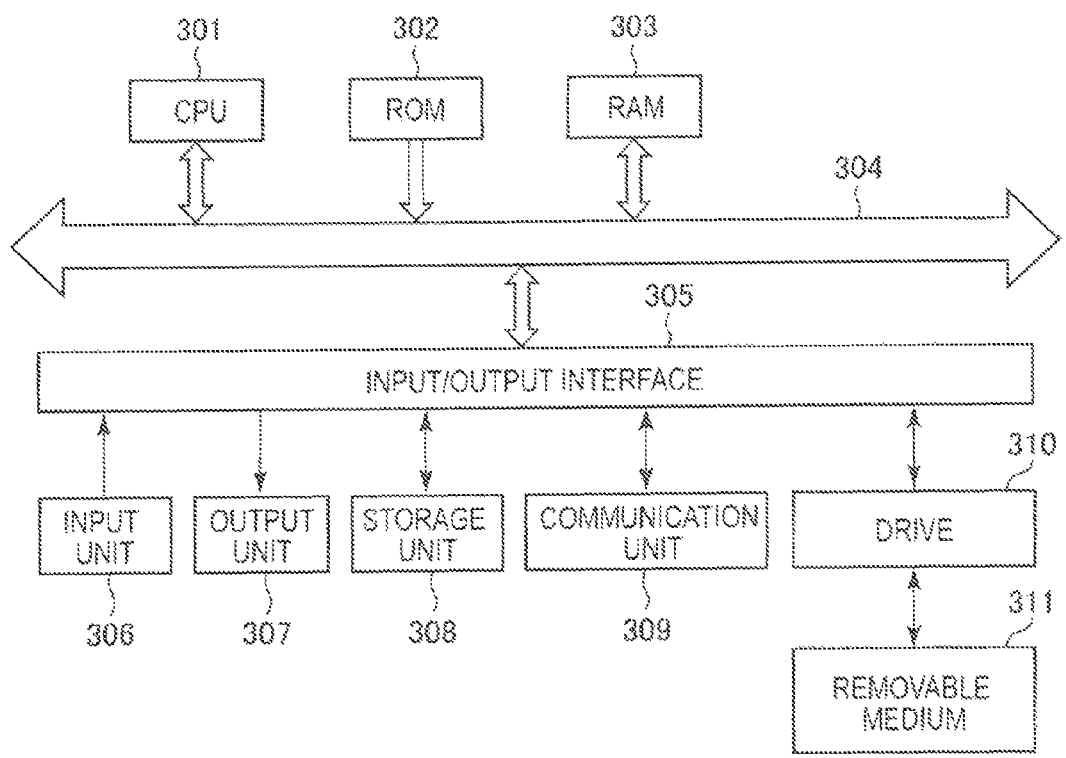
FIG. 28 is a block diagram illustrating an exemplary configuration of a computer.

FIG. 28 is a block diagram showing an example configuration of the hardware of a computer that executes the series of processes described earlier according to a program.

In a computer, a CPU (Central Processing Unit) 301, a ROM (Read Only Memory) 302, and a RAM (Random Access Memory) 303 are mutually connected by a bus 304.

An input/output interface 305 is also connected to the bus 304. An input unit 306, an output unit 307, a storage it 308, a communication unit 309, and a drive 310 are connected to the input/output interface 305.

The input unit 306 is configured from a keyboard, a mouse, a microphone or the like. The output unit 307 configured from a display, a speaker or the like. The storage unit 308 is configured from a hard disk, a non-volatile memory or the like. The communication unit 309 is configured from a network interface or the like. The drive 310 drives a removable medium 311 such as a magnetic disk, an optical disk, a magneto-optical disk, a semiconductor memory or the like.

In the computer configured as described above, as one example the CPU 301 loads a program stored in the storage unit 308 via the input/output interface 305 and the bus 304 into the RAM 303 and executes the program to carry out the series of processes described earlier.

As one example, the program executed by the computer (the CPU 301) may be provided by being recorded on the removable medium 311 as a packaged medium or the like. The program can also be provided via a wired or wireless transfer medium, such as a local area network, the Internet, or a digital satellite broadcast.

In the computer, by loading the removable medium 311 into the drive 310, the program can be installed into the storage unit 308 via the input/output interface 305. It is also possible to receive the program from a wired or wireless transfer medium using the communication unit 309 and install the program into the storage unit 308. As another alternative, the program can be installed in advance into the ROM 302 or the storage unit 308.

Note that the program executed by the computer may be a program in which processes are carried out in a time series in the order described in this specification or may be a program in which processes are carried out in parallel or at necessary timing, such as when the processes are called.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

Additionally, the present technology may also be configured below.

(1)

A signal processing device, including:

a first pixel thinning control unit configured to thin out every other pair of two neighboring pixel samples of each line from N consecutive frames of a first video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines, map the thinned every other pair of two neighboring pixel samples to first to 4N-th sub images including an m'×n' (m' indicating m' samples and n' indicating n' lines are positive integers)/48P-60P/r':g':b' (r', g', and b' are a signal ratio in the case of a predetermined signal transmission scheme)/10-bit or 12-bit signal, and arrange a vertical blanking region between two of N regions in which pixel samples of respective frames of the first video signal are mapped in each sub image.

(2)

The signal processing device according to (1), wherein the first video signal is a 3840×2160/(50P-60P)×N/4:4:4, 4:2:2, or 4:2:0/10-bit or 12-bit signal.

(3)

The signal processing device according to (2), wherein N is 2, and wherein the first pixel thinning control unit arranges the vertical blanking region of 21 lines in a head of the sub image, the vertical blanking region of 2 lines in a tail of the sub image, and the vertical blanking region of 22 lines between a region in which pixel samples of a first frame of the video signal are mapped and a region in which pixel samples of a second frame are mapped.

(4)

The signal processing device according to (2) or (3), further including:

a second pixel thinning control unit configured to thin out every other pair of two neighboring pixel samples of each line from a second video signal including a 7680×4320/(50P-60P)×N/4:4:4, 4:2:2, or 4:2:0/10-bit or 12-bit signal for every other line and map the thinned every other pair of two neighboring pixel samples to the four first video signals.

(5)

The signal processing device according to any of (1) to (4), further including:

a line thinning control unit configured to perform conversion into an interlace signal by performing line thinning of the first to 4N-th sub images; and a word thinning control unit configured to generate serial digital data specified in a format of HD-SDIs of 16N channels by performing word thinning of the interlace signal.

(6)

The signal processing device according to (5), further including:

a multiplexing unit configured to generate serial digital data specified in a format of a 10.692 Gbps SDI of 2N channels by multiplexing the serial digital data of the 16N channels.

(7)

The signal processing device according to (5), further including:

a multiplexing unit configured to generate serial digital data specified in a format of a 3 Gbps SDI of 8N channels by multiplexing the serial digital data of the 16N channels.

(8)

The signal processing device according to any of (5) to (7), further including:

an output control unit configured to control an output of the serial digital data.

(9)

A signal processing method, including:

a pixel thinning control step of thinning out every other pair of two neighboring pixel samples of each line from N consecutive frames of a video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines, mapping the thinned every other pair of two neighboring pixel samples to first to 4N-th sub images including an m'×n' (m' indicating m' samples and n' indicating if lines are positive integers)/48P-60P/r':g':b' (r', g', and b' are a signal ratio in the case of a predetermined signal transmission scheme)/10-bit or 12-bit signal, and arranging a vertical blanking region between two of N regions in which pixel samples of respective frames of the video signal are mapped in each sub image.

(10)

A program causing a computer to execute a process including:

a pixel thinning control step of thinning out every other pair of two neighboring pixel samples of each line from N consecutive frames of a video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines, mapping the thinned every other pair of two neighboring pixel samples to first to 4N-th sub images including an m'×n' (m' indicating m' samples and n' indicating n' lines are positive integers)/48P-60P/r':g':b' (r', g', and b' are a signal ratio in the case of a predetermined signal transmission scheme)/10-bit or 12-bit signal, and arranging a vertical blanking region between two of N regions in which pixel samples of respective frames of the video signal are mapped in each sub image.

(11)

A signal processing device, including:

a pixel multiplexing unit configured to reproduce a video signal of N frames by extracting pixel samples from first to 4N-th sub images in which a vertical blanking region is arranged between two of N regions in which the pixel samples of respective frames of the video signal are mapped and multiplexing the extracted pixel samples, the first to 4N-th sub images being generated by thinning out every other pair of two neighboring pixel samples of each line from the N consecutive frames of the video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines and mapping the thinned every other pair of two neighboring pixel samples and including an m'×m' (m' indicating m' samples and n' indicating n' lines are positive integers)/48P-60P/r':g':b' (r', g', and b' are a signal ratio in the case of a predetermined signal transmission scheme)/10-bit or 12-bit signal.

(12)

A signal processing method, including:

a pixel multiplexing step of reproducing a video signal of N frames by extracting pixel samples from first to 4N-th sub images in which a vertical blanking region is arranged between two of N regions in which the pixel samples of respective frames of the video signal are mapped and multiplexing the extracted pixel samples, the first to 4N-th sub images being generated by thinning out every other pair of two neighboring pixel samples of each line from the N consecutive frames of the video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines and mapping the thinned every other pair of two neighboring pixel samples and including an m'×n' (m' indicating m' samples and n' indicating n' lines are positive integers)/48P-60P/r':g':b' (r', g', and b' are a signal ratio in the case of a predetermined signal transmission scheme)/10-bit or 12-bit signal.

(13)

A program causing a computer to execute a process including:

a pixel multiplexing step of reproducing a video signal of N frames by extracting pixel samples from first to 4N-th sub images in which a vertical blanking region is arranged between two of N regions in which the pixel samples of respective frames of the video signal are mapped and multiplexing the extracted pixel samples, the first to 4N-th sub images being generated by thinning out every other pair of two neighboring pixel samples of each line from the N consecutive frames of the video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines and mapping the thinned every other pair of two neighboring pixel samples and including an m'×n' (m' indicating m' samples and n' indicating n' lines are positive integers)/48P-60P/r':g':b' (r', g', and b' are a signal ratio in the case of a predetermined signal transmission scheme)/10-bit or 12-bit signal.

(14)

A signal transmission system, including:

a signal transmitting device including a first pixel thinning control unit configured to thin out every other pair of two neighboring pixel samples of each line from N consecutive frames of a video signal including an m×n (m indicating m samples and n indicating n lines are positive integers)/(48P-60P)×N (N is an integer of 2 or more)/r:g:b (r, g, and b are a signal ratio in the case of a predetermined signal transmission scheme)/10-bit or 12-bit signal in which the number of pixels per frame exceeds the number of pixels specified in an HD format at intervals of 2N lines, map the thinned every other pair of two neighboring pixel samples to first to 4N-th sub images including an m'×n' (m' indicating m' samples and n' indicating n' lines are positive integers)/48P-60P/r':g';b' (r', g', and b' are a signal ratio in the case of a predetermined signal transmission scheme)/10-bit or 12-bit signal, and arrange a vertical blanking region between two of N regions in which pixel samples of respective frames of the video signal are mapped in each sub image; and a signal transmitting device including a pixel multiplexing unit configured to reproduce the video signal of the N frames by extracting the pixel samples from the first to 4N-th sub images and multiplexing the extracted pixel samples.

REFERENCE SIGNS LIST

1 broadcasting camera
2 CCU
3 optical fiber cable
10 signal transmission system
11 mapping unit
12 S/P scrambling 8B/10B unit
14 multiplexing unit
15 data length converting unit
17 multi-channel data forming unit
18 multiplexing P/S converting unit
19 photoelectric conversion unit
21 2-pixel thinning control unit
24-1 to 24-8 line thinning control unit
26-1 to 26-16 word thinning control unit
28-1 to 28-32 read control unit
31 photoelectric conversion unit
32 S/P converting/multi-channel data forming unit
33 multiplexing unit
36 data length converting unit
37 separating unit
38 descrambling 8B/10B P/S unit
39 reproducing unit
42 2-pixel multiplexing control unit
45-1 to 45-8 line multiplexing control unit
47-1 to 47-16 word multiplexing control unit
49-1 to 49-32 write control unit
62 second 2-pixel thinning control unit
65-1 to 65-4 first 2-pixel thinning control unit
67-1 to 67-32 line thinning control unit
69-1 to 69-64 word thinning control unit
71-1 to 71-128 read control min
82 second 2-pixel multiplexing control unit
85-1 to 85-4 first 2-pixel multiplexing control unit
87-1 to 87-32 line multiplexing control unit
89-1 to 89-64 word multiplexing control unit
91-1 to 91-128 write control unit

The invention claimed is:

1. A signal processing device, comprising:
a first pixel thinning control unit configured to:
thin out every other pair of two neighboring pixel samples of each line from N consecutive frames of a first video signal, wherein the first video signal includes an m*n (m indicating m samples and n indicating n lines are positive integers)/(48P-60P)*N (N is an integer of 2 or more)/r:g:b (r, g, and b are a signal ratio in the case of a determined signal transmission scheme)/10-bit or 12-bit signal in which the number of pixels per frame exceeds the number of pixels specified in an HD format at intervals of 2N lines;
map the thinned every other pair of two neighboring pixel samples to first to 4N-th sub images including an m'*n' (m' indicating m' samples and n' indicating n' lines are positive integers)/48P-60P/r':g':b' (r', g', and b' are a signal ratio in the case of a determined signal transmission scheme)/10-bit or 12-bit signal; and
arrange a vertical blanking region between two of N regions in which pixel samples of respective frames of the first video signal are mapped in each sub image.

2. The signal processing device according to claim 1, wherein the first video signal is a 3840*2160/(50P-60P)*N/4:4:4, 4:2:2, or 4:2:0/10-bit or 12-bit signal.

3. The signal processing device according to claim 2, wherein N is 2, and
wherein the first pixel thinning control unit is configured to arrange the vertical blanking region of 21 lines in a head of the sub image, the vertical blanking region of 2 lines in a tail of the sub image, and the vertical blanking region of 22 lines between a region in which pixel samples of a first frame of the video signal are mapped and a region in which pixel samples of a second frame are mapped.

4. The signal processing device according to claim 2, further comprising:
a second pixel thinning control unit configured to:
thin out every other pair of two neighboring pixel samples of each line from a second video signal including a 7680*4320/(50P-60P)*N/4:4:4, 4:2:2, or 4:2:0/10-bit or 12-bit signal for every other line; and
map the thinned every other pair of two neighboring pixel samples to the four first video signals.

5. The signal processing device according to claim 1, further comprising:
a line thinning control unit configured to convert into an interlace signal based on line thinning of the first to 4N-th sub images; and
a word thinning control unit configured to generate serial digital data specified in a format of HD-SDIs of 16N channels based on word thinning of the interlace signal.

6. The signal processing device according to claim 5, further comprising a multiplexing unit configured to multiplex serial digital data of the 16N channels to generate the serial digital data specified in format of a 10.692 Gbps SDI of 2N channels.

7. The signal processing device according to claim 5, further comprising a multiplexing unit configured to multiplex serial digital data of the 16N channels to generate the serial digital data specified in a format of a 3 Gbps SDI of 8N channels.

8. The signal processing device according to claim 5, further comprising an output control unit configured to control an output of the serial digital data.

9. A signal processing method, comprising:
thinning out every other pair of two neighboring pixel samples of each line from N consecutive frames of a video signal including an m*n (m indicating m samples and n indicating n lines are positive integers)/(48P-60P)*N (N is an integer of 2 or more)/r:g:b (r, g, and b are a signal ratio in the case of a determined signal transmission scheme)/10-bit or 12-bit signal in which the number of pixels per frame exceeds the number of pixels specified in an HD format at intervals of 2N lines;
mapping the thinned every other pair of two neighboring pixel samples to first to 4N-th sub images including an m'*n' (m' indicating m' samples and n' indicating n' lines are positive integers)/48P-60P/r':g':b' (r', g', and b' are a signal ratio in the case of a determined signal transmission scheme)/10-bit or 12-bit signal; and
arranging a vertical blanking region between two of N regions in which pixel samples of respective frames of the video signal are mapped in each sub image.

10. A non-transitory computer-readable storage medium, having stored thereon computer-executable instructions for causing a computer to execute operations, comprising:
thinning out every other pair of two neighboring pixel samples of each line from N consecutive frames of a video signal including an m*n (m indicating m samples and n indicating n lines are positive integers)/(48P-60P)*N (N is an integer of 2 or more)/r:g:b (r, g, and b are a signal ratio in the case of a determined signal transmission scheme)/10-bit or 12-bit signal in which the number of pixels per frame exceeds the number of pixels specified in an HD format at intervals of 2N lines;
mapping the thinned every other pair of two neighboring pixel samples to first to 4N-th sub images including an m'*n' (m' indicating m' samples and n' indicating n' lines are positive integers)/48P-60P/r':g':b' (r', g', and b' are a signal ratio in the case of a determined signal transmission scheme)/10-bit or 12-bit signal; and
arranging a vertical blanking region between two of N regions in which pixel samples of respective frames of the video signal are mapped in each sub image.

11. A signal processing device, comprising:
a pixel multiplexing unit configured to:
extract pixel samples from first to 4N-th sub images in which a vertical blanking region is arranged between two of N regions in which the pixel samples of respective frames of a video signal are mapped and multiplex the extracted pixel samples to reproduce the video signal, wherein every other pair of two neighboring pixel samples of each line from the N consecutive frames of the video signal is thinned out to generate the first to 4N-th sub images, wherein the video signal includes an m*n (m indicating m samples and n indicating n lines are positive integers)/(48P-60P)*N (N is an integer of 2 or more)/r:g:b (r, g, and b are a signal ratio in the case of a determined signal transmission scheme)/10-bit or 12-bit signal in which the number of pixels per frame exceeds the number of pixels specified in an HD format at intervals of 2N lines; and
map the thinned every other pair of two neighboring pixel samples and including m'*n' (m' indicating m' samples and n' indicating n' lines are positive integers)/48P-60P/r':g':b' (r', g', and b' are a signal ratio in the case of a determined signal transmission scheme)/10-bit or 12-bit signal.

12. A signal processing method, comprising:
reproducing a video signal of N frames by extracting pixel samples from first to 4N-th sub images in which a vertical blanking region is arranged between two of N regions in which the pixel samples of respective frames at the video signal are mapped and multiplexing the extracted pixel samples, the first to 4N-th sub images being generated by thinning out every other pair of two neighboring pixel samples of each line from the N consecutive frames of the video signal including an m*n (m indicating m samples and n indicating n lines are positive integers)/(48P-60P)*N (N is an integer of 2 or more)/r:g:b (r, g, and b are a signal ratio in the case of a determined signal transmission scheme)/10-bit or 12-bit signal in which the number of pixels per frame exceeds the number of pixels specified in an HD format at intervals of 2N lines; and
mapping the thinned every other pair of two neighboring pixel samples and including an m'*n' (m' indicating m' samples and n' indicating n' lines are positive integers)/ 48P-60P/r':g':b' (r', g', and b' are a signal ratio in the case of a determined signal transmission scheme)/10-bit or 12-bit signal.

13. A non-transitory computer-readable storage medium, having stored thereon computer-executable instructions for causing a computer to execute operations, comprising:
reproducing a video signal of N frames by extracting pixel samples from first to 4N-th sub images in which a vertical blanking region is arranged between two of N regions in which the pixel samples of respective frames at the video signal are mapped and multiplexing the extracted pixel samples, the first to 4N-th sub images being generated by thinning out every other pair of two neighboring pixel samples of each line from the N consecutive frames of the video signal including an m*n (m indicating m samples and n indicating n lines are positive integers)/(48P-60P)*N (N is an integer of 2 or more)/r:g:b (r, g, and b are a signal ratio in the case of a determined signal transmission scheme)/10-bit or 12-bit signal in which the number of pixels per frame exceeds the number at pixels specified in an HD format at intervals of 2N lines; and
mapping the thinned every other pair of two neighboring pixel samples and including an m'*n' (m' indicating m' samples and n' indicating n' lines are positive integers)/ 48P-60P/r':g':b' (r', g', and b' are a signal ratio in the case of a determined signal transmission scheme)/10-bit or 12-bit signal.

14. A signal transmission system, comprising:
a signal transmitting device including a first pixel thinning control unit configured to:
thin out every other pair of two neighboring pixel samples of each line from N consecutive frames of a video signal, wherein the video signal includes an m*n (m indicating m samples and n indicating n lines are positive integers)/(40-60P)*N (N is an integer of 2 or more)/r:g:b (r, g, and b are a signal ratio in the case of a determined signal transmission scheme)/10-bit or 12-bit signal in which the number of pixels per frame exceeds the number of pixels specified in an HD format at intervals of 2N lines;
map the thinned every other pair of two neighboring pixel samples to first to 4N-th sub images including-an m'*n' (m' indicating m' samples and n' indicating n' lines are positive integers)/48P-60P/r':g':b' (r', g', and b' are a signal ratio in the case of a determined signal transmission scheme)/10-bit or 12-bit signal; and
arrange a vertical blanking region between two of N regions in which pixel samples of respective frames of the video signal are mapped in each sub image; and
a signal transmitting device including a pixel multiplexing unit configured to extract the pixel samples from the first to 4N-th sub images and multiplex the extracted pixel samples to reproduce the video signal.

* * * * *